United States Patent
Akiike et al.

(10) Patent No.: US 8,304,031 B2
(45) Date of Patent: *Nov. 6, 2012

(54) LIQUID CRYSTAL ALIGNING AGENT, LIQUID CRYSTAL ALIGNMENT FILM AND LIQUID CRYSTAL DISPLAY DEVICE

(75) Inventors: Toshiyuki Akiike, Tokyo (JP); Tsutomu Kumagai, Tokyo (JP)

(73) Assignee: JSR Corporation, Tokyo (JP)

( * ) Notice: Subject to any disclaimer, the term of this patent is extended or adjusted under 35 U.S.C. 154(b) by 166 days.

This patent is subject to a terminal disclaimer.

(21) Appl. No.: 12/674,057

(22) PCT Filed: Aug. 20, 2008

(86) PCT No.: PCT/JP2008/065229
§ 371 (c)(1),
(2), (4) Date: Apr. 22, 2010

(87) PCT Pub. No.: WO2009/025386
PCT Pub. Date: Feb. 26, 2009

(65) Prior Publication Data
US 2011/0105700 A1 May 5, 2011

(30) Foreign Application Priority Data
Aug. 21, 2007 (JP) .................. 2007-215144
Nov. 13, 2007 (JP) .................. 2007-294227

(51) Int. Cl.
*G02F 1/1337* (2006.01)
*C08F 2/48* (2006.01)
(52) U.S. Cl. ...... 427/489; 427/515; 428/1.23; 428/1.26; 428/447; 525/431; 525/477
(58) Field of Classification Search .................. None
See application file for complete search history.

(56) References Cited

U.S. PATENT DOCUMENTS

| | | | | |
|---|---|---|---|---|
| 4,554,369 A | * | 11/1985 | Hill et al. ............... | 556/418 |
| 5,494,815 A | * | 2/1996 | von Gentzkow et al. ..... | 435/174 |
| 2004/0209008 A1 | | 10/2004 | Liang et al. | |
| 2006/0188456 A1 | | 8/2006 | Ferenz et al. | |
| 2007/0098921 A1 | | 5/2007 | Liang et al. | |
| 2008/0272334 A1 | | 11/2008 | Liang et al. | |
| 2011/0068301 A1 | * | 3/2011 | Akiike et al. ............... | 252/299.4 |

FOREIGN PATENT DOCUMENTS

| | | |
|---|---|---|
| GB | 2 307 240 A | 5/1997 |
| JP | 56-91277 | 7/1981 |
| JP | 63-291922 | 11/1988 |
| JP | 1-120528 | 5/1989 |
| JP | 6-287453 | 10/1994 |
| JP | 9-211468 | 8/1997 |
| JP | 9-278890 | 10/1997 |
| JP | 9-297313 | 11/1997 |
| JP | 10-251646 | 9/1998 |
| JP | 11-2815 | 1/1999 |
| JP | 11-152475 | 6/1999 |
| JP | 11-181127 | 7/1999 |
| JP | 2000-144136 | 5/2000 |
| JP | 2000-281724 | 10/2000 |
| JP | 2000-319510 | 11/2000 |
| JP | 2002-250924 | 9/2002 |
| JP | 2003-114437 | 4/2003 |
| JP | 2003-520878 | 7/2003 |
| JP | 2003-307736 | 10/2003 |
| JP | 2004-83810 | 3/2004 |
| JP | 2004-163646 | 6/2004 |
| JP | 2006-519414 | 8/2006 |
| JP | 2009-249326 A | * 10/2009 |

OTHER PUBLICATIONS

"Synthesis and Properties of Photoreactive Polysiloxanes Containing Pendant Functional Groups" authored by Coqueret et al. and published in Pure & Appl. Chem (1990) 62(8), 1603-1614.*
U.S. Appl. No. 12/674,537, filed Feb. 22, 2010, Akiike, et al.
U.S. Appl. No. 12/674,479, filed Feb. 22, 2010, Akiike, et al.
Vladimir Chigrinov, et al., "Azo-Dye Aligning Layers for Liquid-Crystal Cells", Journal of the SID Nov. 3, 2003, pp. 579-583.
Jia Liu, et al., "Novel Photoalignment Materials for Liquid Crystals Based on Modified Polysiloxane", Japanese Journal of Applied Physics, vol. 39, Part 1, No. 3A, Mar. 2000, pp. 1221-1224.
Extended European Search Report issued Mar. 28, 2011, in Patent Application No. 08792755.4.
Science of Sol-Gel Method, pp. 154-161, 1988, published by Agne Shofusya, w/partial English translation (p. 157, line 11 to p. 160, line 6 from the bottom).
Preliminary Examination Report issued Apr. 12, 2012, in International application No. PCT/JP2008/065229.

* cited by examiner

*Primary Examiner* — Marc Zimmer
(74) *Attorney, Agent, or Firm* — Oblon, Spivak, McClelland, Maier & Neustadt, L.L.P.

(57) ABSTRACT

The present invention relates to a liquid crystal aligning agent containing a radiation sensitive polyorganosiloxane which is obtained by reacting at least one selected from the group consisting of a polyorganosiloxane having a recurring unit represented by the following formula (1), a hydrolysate thereof and a condensate of the hydrolysis with a cinnamic acid derivative having at least one group selected from the group consisting of a carboxyl group, a hydroxyl group, —SH, —NCO, —NHR (R is a hydrogen atom or an alkyl group having 1 to 6 carbon atoms), —CH=CH$_2$ and —SO$_2$Cl:

$$\left[ \begin{array}{c} X^1 \\ | \\ Si-O \\ | \\ Y^1 \end{array} \right] \quad (1)$$

(in the formula (1), $X^1$ is a monovalent organic group having an epoxy group, and $Y^1$ is a hydroxyl group, an alkoxyl group having 1 to 10 carbon atoms, an alkyl group having 1 to 20 carbon atoms or an aryl group having 6 to 20 carbon atoms).

10 Claims, No Drawings

LIQUID CRYSTAL ALIGNING AGENT, LIQUID CRYSTAL ALIGNMENT FILM AND LIQUID CRYSTAL DISPLAY DEVICE

TECHNICAL FIELD

The present invention relates to a liquid crystal aligning agent, a method of forming a liquid crystal alignment film and a liquid crystal display device.

BACKGROUND OF THE ART

There has been known a liquid crystal display device having a liquid crystal cell such as a TN (Twisted Nematic) or STN (Super Twisted Nematic) liquid crystal cell which has a sandwich structure that nematic liquid crystals having positive dielectric anisotropy are sandwiched between substrates with a transparent electrode having a liquid crystal alignment film so that the long axes of liquid crystal molecules can be twisted at 0 to 360° continuously between the substrates as required or IPS (In Plane Switching) liquid crystal cell (refer to JP-A 56-91277 and JP-A 1-120528).

In this liquid crystal cell, in order to align the liquid crystal molecules in a predetermined direction with respect to the surface of the substrate, a liquid crystal alignment film must be formed on the surface of the substrate. This liquid crystal alignment film is usually formed by rubbing the surface of an organic film formed on the surface of the substrate with a cloth material such as rayon in one direction (rubbing method). However, since dust or static electricity is apt to be generated in the process when the liquid crystal alignment film is formed by rubbing, dust adheres to the surface of the alignment film, thereby causing a display failure. Particularly in the case of a substrate having a TFT (Thin Film Transistor) device, the circuit destruction of the TFT device is caused by the generated static electricity, thereby reducing the yield. Further, in a liquid crystal display device which will become fine and finer in the future, as the surface of the substrate becomes uneven along with the increasing density of pixels, uniform rubbing is becoming difficult.

As alternative means of aligning liquid crystals in the liquid crystal cell, there is known an optical aligning method for providing liquid crystal alignability by applying polarized or non-polarized radiation to a photosensitive thin film made of polyvinyl cinnamate, polyimide or azobenzene derivative formed on the surface of the substrate. According to this method, uniform liquid crystal alignment can be realized without generating static electricity and dust (refer to JP-A 6-287453, JP-A 10-251646, JP-A 11-2815, JP-A 11-152475, JP-A 2000-144136, JP-A 2000-319510, JP-A 2000-281724, JP-A 9-297313, JP-A 2003-307736, JP-A 2004-163646 and JP-A 2002-250924).

In a TN (Twisted Nematic) or STN (Super Twisted Nematic) liquid crystal cell, the liquid crystal alignment film must have a pretilt angle for aligning liquid crystal molecules at a predetermined angle with respect to the surface of the substrate. When the liquid crystal alignment film is to be formed by the optical aligning method, the pretilt angle is generally provided by inclining the direction of radiation applied to the surface of the substrate from the normal of the substrate.

As an operation mode of a liquid crystal display device different from the above liquid crystal display devices, there is known a homeotropic alignment mode for aligning liquid crystal molecules having negative dielectric anisotropy in a direction perpendicular to the substrate. In this operation mode, the liquid crystal molecules must be tilted from the normal direction of the substrate toward one direction within the plane of the substrate when the liquid crystal molecules are tilted in a direction parallel to the substrate by applying voltage between the substrates. As means for this, there are proposed a method in which projections are formed on the surface of the substrate, a method in which stripes are formed on a transparent electrode and a method in which liquid crystal molecules are slightly pretilted from the normal direction of the substrate toward one direction within the plane of the substrate by using a rubbed alignment film.

It is known that the above optical aligning method is useful for controlling the tilt direction of the liquid crystal molecules in the liquid crystal cell of a homeotropic alignment mode. That is, it is known that the inclination direction of the liquid crystal molecules at the time of applying voltage can be uniformly controlled by using a homeotropic alignment film provided with alignment control capability and pretilt angle generating capability by the optical aligning method (refer to JP-A 2003-307736, JP-A 2004-163646, JP-A 2004-83810, JP-A 9-211468 and JP-A 2003-114437).

The liquid crystal alignment film manufactured by the above optical aligning method can be effectively used in various types of liquid crystal display devices. However, the optical alignment film of the prior art has a problem that the dose of radiation required to obtain a large pretilt angle is large. For example, it is reported that 10,000 J/m² or more of radiation whose optical axis is inclined from the normal of the substrate must be applied to obtain a sufficiently large pretilt angle when liquid crystal alignability is to be provided to a thin film containing an azobenzene derivative by the optical aligning method (refer to JP-A 2002-250924, JP-A 2004-83810 and J. of the SID 11/3, 2003, p. 579).

DISCLOSURE OF THE INVENTION

It is an object of the present invention to provide a liquid crystal aligning agent which provides a liquid crystal alignment film having high liquid crystal alignability with a small dose of radiation by applying polarized or non-polarized radiation thereto without rubbing, a method of forming the liquid crystal alignment film, and a liquid crystal display device having excellent properties such as display properties and reliability.

According to the present invention, firstly, the above objects of the present invention are attained by a liquid crystal aligning agent containing a radiation sensitive polyorganosiloxane which is obtained by reacting at least one selected from the group consisting of a polyorganosiloxane having a recurring unit represented by the following formula (1), a hydrolysate thereof and a condensate of the hydrolysis with a cinnamic acid derivative having at least one group selected from the group consisting of a carboxyl group, a hydroxyl group, —SH, —NCO, —NHR (R is a hydrogen atom or an alkyl group having 1 to 6 carbon atoms), —CH=CH₂ and —SO₂Cl:

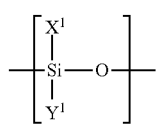

(1)

(in the formula (1), $X^1$ is a monovalent organic group having an epoxy group, and $Y^1$ is a hydroxyl group, an alkoxyl group having 1 to 10 carbon atoms, an alkyl group having 1 to 20 carbon atoms or an aryl group having 6 to 20 carbon atoms).

Secondly, the above objects of the present invention are attained by a method of forming a liquid crystal alignment film by applying the above liquid crystal aligning agent on a substrate to form a coating film and applying radiation to the coating film.

Thirdly, the above objects of the present invention are attained by a liquid crystal display device comprising a liquid crystal alignment film formed from the above liquid crystal aligning agent.

In the fourth place, the above objects of the present invention are attained by a radiation sensitive polyorganosiloxane obtained by reacting at least one selected from the group consisting of a polyorganosiloxane having a recurring unit represented by the above formula (1), a hydrolysate thereof and a condensate of the hydrolysate with a cinnamic acid derivative having at least one group selected from the group consisting of a carboxyl group, a hydroxyl group, —SH, —NCO, —NHR (R is a hydrogen atom or an alkyl group having 1 to 6 carbon atoms), —CH═CH$_2$ and —SO$_2$Cl.

BEST MODE FOR CARRYING OUT THE INVENTION

The liquid crystal aligning agent of the present invention contains a radiation sensitive polyorganosiloxane obtained by reacting at least one selected from the group consisting of a polyorganosiloxane having a recurring unit represented by the above formula (1) (to be referred to as "polyorganosiloxane having an epoxy group" hereinafter), a hydrolysate thereof and a condensate of the hydrolysate with a cinnamic acid derivative having at least one group selected from the group consisting of a carboxyl group, a hydroxyl group, —SH, —NCO, —NHR (R is a hydrogen atom or an alkyl group having 1 to 6 carbon atoms), —CH═CH$_2$ and —SO$_2$Cl. In the present invention, part of the above cinnamic acid derivative may be substituted by a compound represented by the following formula (5) as long as the effect of the present invention is not impaired:

$$R^{15}—R^{16}—R^{17} \quad (5)$$

(in the formula (5), $R^{15}$ is an alkyl group or alkoxyl group having 4 to 20 carbon atoms, or a monovalent organic group having 3 to 40 carbon atoms containing an alicyclic group, with the proviso that some or all of the hydrogen atoms of the alkyl group or alkoxy group may be substituted by a fluorine atom, $R^{16}$ is a single bond or a phenylene group, with the proviso that when $R^{15}$ is an alkoxyl group, $R^{16}$ is a phenylene group, and $R^{17}$ is at least one group selected from the group consisting of a carboxyl group, a hydroxyl group, —SH, —NCO, —NHR (R is a hydrogen atom or an alkyl group having 1 to 6 carbon atoms), —CH═CH$_2$ and —SO$_2$Cl).

<Radiation Sensitive Polyorganosiloxane>

[Polyorganosiloxane Having an Epoxy Group]

$X^1$ in the above formula (1) is preferably a group represented by the following formula ($X^1$-1) or ($X^1$-2):

($X^1$-1)

-continued

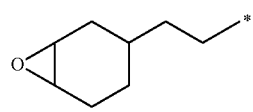
($X^1$-2)

(in the above formulas, "" denotes a bond).

Examples of the alkoxyl group having 1 to 10 carbon atoms represented by $Y^1$ include methoxyl group and ethoxyl group; examples of the alkyl group having 1 to 20 carbon atoms include methyl group, ethyl group, n-propyl group, n-butyl group, n-pentyl group, n-hexyl group, n-heptyl group, n-octyl group, n-nonyl group, n-decyl group, n-lauryl group, n-dodecyl group, n-tridecyl group, n-tetradecyl group, n-pentadecyl group, n-hexadecyl group, n-heptadecyl group, n-octadecyl group, n-nonadecyl group and n-eicosyl group; and examples of the aryl group having 6 to 20 carbon atoms include phenyl group.

The polyorganosiloxane having an epoxy group has a weight average molecular weight in terms of polystyrene measured by gel permeation chromatography (GPC) of preferably 500 to 100,000, more preferably 1,000 to 10,000, much more preferably 1,000 to 5,000.

The polyorganosiloxane having an epoxy group can be synthesized by preferably hydrolyzing or hydrolyzing/condensing a silane compound having an epoxy group, or a mixture of a silane compound having an epoxy group and another silane compound preferably in the presence of a suitable organic solvent, water and a catalyst.

Examples of the above silane compound having an epoxy group include 3-glycidyloxypropyl trimethoxysilane, 3-glycidyloxypropyl triethoxysilane, 3-glycidyloxypropylmethyl dimethoxysilane, 3-glycidyloxypropylmethyl diethoxysilane, 3-glycidyloxypropyldimethyl methoxysilane, 3-glycidyloxypropyldimethyl ethoxysilane, 2-(3,4-epoxycyclohexyl)ethyl trimethoxysilane and 2-(3,4-epoxycyclohexyl)ethyl triethoxysilane.

Examples of the another silane compound include silane compounds having one silicon atom such as tetrachlorosilane, tetramethoxysilane, tetraethoxysilane, tetra-n-propoxysilane, tetra-i-propoxysilane, tetra-n-butoxysilane, tetra-sec-butoxysilane, trichlorosilane, trimethoxysilane, triethoxysilane, tri-n-propoxysilane, tri-i-propoxysilane, tri-n-butoxysilane, tri-sec-butoxysilane, fluorotrichlorosilane, fluorotrimethoxysilane, fluorotriethoxysilane, fluorotri-n-propoxysilane, fluorotri-i-propoxysilane, fluorotri-n-butoxysilane, fluorotri-sec-butoxysilane, methyl trichlorosilane, methyl trimethoxysilane, methyl triethoxysilane, methyl tri-n-propoxysilane, methyl tri-i-propoxysilane, methyl tri-n-butoxysilane, methyl tri-sec-butoxysilane, 2-(trifluoromethyl)ethyl trichlorosilane, 2-(trifluoromethyl)ethyl trimethoxysilane, 2-(trifluoromethyl)ethyl triethoxysilane, 2-(trifluoromethyl)ethyl tri-n-propoxysilane, 2-(trifluoromethyl)ethyl tri-i-propoxysilane, 2-(trifluoromethyl)ethyl tri-n-butoxysilane, 2-(trifluoromethyl)ethyl tri-sec-butoxysilane, 2-(perfluoro-n-hexyl)ethyl trichlorosilane, 2-(perfluoro-n-hexyl)ethyl trimethoxysilane, 2-(perfluoro-n-hexyl)ethyl triethoxysilane, 2-(perfluoro-n-hexyl)ethyl tri-n-propoxysilane, 2-(perfluoro-n-hexyl)ethyl tri-i-propoxysilane, 2-(perfluoro-n-hexyl)ethyl tri-n-butoxysilane, 2-(perfluoro-n-hexyl)ethyl tri-sec-butoxysilane, 2-(perfluoro-n-octyl)ethyl trichlorosilane, 2-(perfluoro-n-octyl) ethyl trimethoxysilane, 2-(perfluoro-n-octyl)ethyl triethoxysilane, 2-(perfluoro-n-octyl)ethyl tri-n-propoxysilane, 2-(perfluoro-n-octyl)ethyl tri-i-propoxysilane, 2-(perfluoron-octyl)ethyl tri-n-butoxysilane, 2-(perfluoro-n-octyl)ethyl tri-sec-butoxysilane, hydroxymethyl trichlorosilane, hydroxymethyl trimethoxysilane, hydroxyethyl trimethoxysilane, hydroxymethyl tri-n-propoxysilane, hydroxymethyl tri-i-propoxysilane, hydroxymethyl tri-n-butoxysilane, hydroxymethyl tri-sec-butoxysilane, 3-(meth)acryloxypropyl trichlorosilane, 3-(meth)acryloxypropyl trimethoxysilane, 3-(meth)acryloxypropyl triethoxysilane, 3-(meth)acryloxypropyl tri-n-propoxysilane, 3-(meth)acryloxypropyl tri-i-propoxysilane, 3-(meth)acryloxypropyl tri-n-butoxysilane, 3-(meth)acryloxypropyl tri-sec-butoxysilane, 3-mercaptopropyl trichlorosilane, 3-mercaptopropyl trimethoxysilane, 3-mercaptopropyl triethoxysilane, 3-mercaptopropyl tri-n-propoxysilane, 3-mercaptopropyl tri-i-propoxysilane, 3-mercaptopropyl tri-n-butoxysilane, 3-mercaptopropyl tri-sec-butoxysilane, mercaptomethyl trimethoxysilane, mercaptomethyl triethoxysilane, vinyl trichlorosilane, vinyl trimethoxysilane, vinyl triethoxysilane, vinyl tri-n-propoxysilane, vinyl tri-i-propoxysilane, vinyl tri-n-butoxysilane, vinyl tri-sec-butoxysilane, allyl trichlorosilane, allyl trimethoxysilane, allyl triethoxysilane, allyl tri-n-propoxysilane, allyl tri-i-propoxysilane, allyl tri-n-butoxysilane, allyl tri-sec-butoxysilane, phenyl trichlorosilane, phenyl trimethoxysilane, phenyl triethoxysilane, phenyl tri-n-propoxysilane, phenyl tri-i-propoxysilane, phenyl tri-n-butoxysilane, phenyl tri-sec-butoxysilane, methyl dichlorosilane, methyl dimethoxysilane, methyl diethoxysilane, methyl di-n-propoxysilane, methyl di-i-propoxysilane, methyl di-n-butoxysilane, methyl di-sec-butoxysilane, dimethyl dichlorosilane, dimethyl dimethoxysilane, dimethyl diethoxysilane, dimethyl di-n-propoxysilane, dimethyl di-i-propoxysilane, dimethyl di-n-butoxysilane, dimethyl di-sec-butoxysilane, (methyl)[2-(perfluoro-n-octyl)ethyl]dichlorosilane, (methyl)[2-(perfluoro-n-octyl)ethyl]dimethoxysilane, (methyl)[2-(perfluoro-n-octyl)ethyl]diethoxysilane, (methyl)[2-(perfluoro-n-octyl)ethyl]di-n-propoxysilane, (methyl)[2-(perfluoro-n-octyl)ethyl]di-i-propoxysilane, (methyl)[2-(perfluoro-n-octyl)ethyl]di-n-butoxysilane, (methyl)[2-(perfluoro-n-octyl)ethyl]di-sec-butoxysilane, (methyl)(3-mercaptopropyl)dichlorosilane, (methyl)(3-mercaptopropyl)dimethoxysilane, (methyl)(3-mercaptopropyl)diethoxysilane, (methyl)(3-mercaptopropyl)di-n-propoxysilane, (methyl)(3-mercaptopropyl)di-i-propoxysilane, (methyl)(3-mercaptopropyl)di-n-butoxysilane, (methyl)(3-mercaptopropyl)di-sec-butoxysilane, (methyl)(vinyl)dichlorosilane, (methyl)(vinyl)dimethoxysilane, (methyl)(vinyl)diethoxysilane, (methyl)(vinyl)di-n-propoxysilane, (methyl)(vinyl)di-i-propoxysilane, (methyl)(vinyl)di-n-butoxysilane, (methyl)(vinyl)di-sec-butoxysilane, divinyl dichlorosilane, divinyl dimethoxysilane, divinyl diethoxysilane, divinyl di-n-propoxysilane, divinyl di-i-propoxysilane, divinyl di-n-butoxysilane, divinyl di-sec-butoxysilane, diphenyl dichlorosilane, diphenyl dimethoxysilane, diphenyl diethoxysilane, diphenyl di-n-propoxysilane, diphenyl di-i-propoxysilane, diphenyl di-n-butoxysilane, diphenyl di-sec-butoxysilane, chlorodimethylsilane, methoxydimethylsilane, ethoxydimethylsilane, chlorotrimethylsilane, bromotrimethylsilane, iodotrimethylsilane, methoxytrimethylsilane, ethoxytrimethylsilane, n-propoxytrimethylsilane, i-propoxytrimethylsilane, n-butoxytrimethylsilane, sec-butoxytrimethylsilane, t-butoxytrimethylsilane, (chloro)(vinyl)dimethylsilane, (methoxy)(vinyl)dimethylsilane, (ethoxy)(vinyl)dimethylsilane, (chloro)(methyl)diphenylsilane, (methoxy)(methyl)diphenylsilane and (ethoxy)(methyl)diphenylsilane; and partial condensates under the trade names of KC-89, KC-89S, X-21-3153, X-21-5841, X-21-5842, X-21-5843, X-21-5844, X-21-5845, X-21-5846, X-21-5847, X-21-5848, X-22-160AS, X-22-170B, X-22-170BX, X-22-170D, X-22-170DX, X-22-176B, X-22-176D, X-22-176DX, X-22-176F, X-40-2308, X-40-2651, X-40-2655A, X-40-2671, X-40-2672, X-40-9220, X-40-9225, X-40-9227, X-40-9246, X-40-9247, X-40-9250, X-40-9323, X-41-1053, X-41-1056, X-41-1805, X-41-1810, KF6001, KF6002, KF6003, KR212, KR-213, KR-217, KR220L, KR242A, KR271, KR282, KR300, KR311, KR401N, KR500, KR510, KR5206, KR5230, KR5235, KR9218 and KR9706 (of Shin-Etsu Chemical Co., Ltd.); Glass Resin (of Showa Denko K.K.); SH804, SH805, SH806A, SH840, SR2400, SR2402, SR2405, SR2406, SR2410, SR2411, SR2416 and SR2420 (of Dow Corning Toray Co., Ltd.); FZ3711 and FZ3722 (of Nippon Unicar Company Limited); DMS-S12, DMS-S15, DMS-S21, DMS-S27, DMS-S31, DMS-S32, DMS-S33, DMS-S35, DMS-S38, DMS-S42, DMS-S45, DMS-S51, DMS-227, PSD-0332, PDS-1615, PDS-9931 and XMS-5025 (of Chisso Corporation); Methyl Silicate MS51 and Methyl Silicate MS56 (of Mitsubishi Chemical Corporation); Ethyl Silicate 28, Ethyl Silicate 40 and Ethyl Silicate 48 (of Colcoat Co., Ltd.); and GR100, GR650, GR908 and GR950 (of Showa Denko K.K.).

Out of these silane compounds, tetramethoxysilane, tetraethoxysilane, methyl trimethoxysilane, methyl triethoxysilane, 3-(meth)acryloxypropyl trimethoxysilane, 3-(meth)acryloxypropyl triethoxysilane, vinyl trimethoxysilane, vinyl triethoxysilane, allyl trimethoxysilane, allyl triethoxysilane, phenyl trimethoxysilane, phenyl triethoxysilane, 3-mercaptopropyl trimethoxysilane, 3-mercaptopropyl triethoxysilane, mercaptomethyl trimethoxysilane, mercaptomethyl triethoxysilane, dimethyl dimethoxysilane or dimethyl diethoxysilane is preferred.

The polyorganosiloxane having an epoxy group used in the present invention has an epoxy equivalent of preferably 100 to 10,000 g/mole, more preferably 150 to 1,000 g/mole. Therefore, to synthesize the polyorganosiloxane having an epoxy group, the mixing ratio of the silane compound having an epoxy group to the another silane compound is preferably set to ensure that the epoxy equivalent of the obtained polyorganosiloxane falls within the above range.

An organic solvent which can be used to synthesize the polyorganosiloxane having an epoxy group is selected from a hydrocarbon, ketone, ester, ether and alcohol.

Examples of the above hydrocarbon include toluene and xylene; examples of the above ketone include methyl ethyl ketone, methyl isobutyl ketone, methyl n-amyl ketone, diethyl ketone and cyclohexanone; examples of the above ester include ethyl acetate, n-butyl acetate, i-amyl acetate, propylene glycol monomethyl ether acetate, 3-methoxybutyl acetate and ethyl lactate; examples of the above ether include ethylene glycol dimethyl ether, ethylene glycol diethyl ether, tetrahydrofuran and dioxane; and examples of the above alcohol include 1-hexanol, 4-methyl-2-pentanol, ethylene glycol monomethyl ether, ethylene glycol monoethyl ether, ethylene glycol mono-n-propyl ether, ethylene glycol mono-n-butyl ether, propylene glycol monomethyl ether, propylene glycol monoethyl ether and propylene glycol mono-n-propyl ether. Out of these, water-insoluble organic solvents are preferred.

These organic solvents may be used alone or in combination of two or more.

The amount of the organic solvent is preferably 10 to 10,000 parts by weight, more preferably 50 to 1,000 parts by weight based on 100 parts by weight of the total of all the silane compounds.

The amount of water used to produce the polyorganosiloxane having an epoxy group is preferably 0.5 to 100 times, more preferably 1 to 30 times the total molar amount of all the silane compounds.

As the above catalyst may be used an acid, alkali metal compound, organic base, titanium compound or zirconium compound.

Examples of the above alkali metal compound include sodium hydroxide, potassium hydroxide, sodium methoxide, potassium methoxide, sodium ethoxide and potassium ethoxide.

Examples of the above organic base include primary and secondary organic amines such as ethylamine, diethylamine, piperazine, piperidine, pyrrolidine and pyrrole; tertiary organic amines such as triethylamine, tri-n-propylamine, tri-n-butylamine, pyridine, 4-dimethylaminopyridine and diazabicycloundecene; and quaternary organic amines such as tetramethylammonium hydroxide. Out of these organic bases, tertiary organic amines such as triethylamine, tri-n-propylamine, tri-n-butylamine, pyridine and 4-dimethylaminopyridine; and quaternary organic amines such as tetramethylammonium hydroxide are preferred.

An alkali metal compound or an organic base is preferred as the catalyst used to produce the polyorganosiloxane having an epoxy group. Since the polyorganosiloxane of interest can be obtained at a high hydrolysis/condensation rate by using an alkali metal compound or an organic base as the catalyst without causing a side reaction such as the ring-opening of the epoxy group, high production stability is obtained advantageously. The liquid crystal aligning agent of the present invention which contains a reaction product of the polyorganosiloxane having an epoxy group synthesized by using an alkali metal compound or an organic base as the catalyst and a cinnamic acid derivative has extremely high storage stability advantageously. The reason for this is assumed to be that when an alkali metal compound or an organic base is used as the catalyst in the hydrolysis/condensation reaction, a random structure, ladder-like structure or basket-like structure is formed, thereby obtaining a polyorganosiloxane having a low content of a silanol group, as described in Chemical Reviews, vol. 95, p. 1409 (1995). Since the polyorganosiloxane has a low content of the silanol group, a condensation reaction between silanol groups is suppressed and further when the liquid crystal aligning agent of the present invention contains another polymer which will be described hereinafter, a condensation reaction between the silanol group and the another polymer is suppressed with the result that excellent storage stability is obtained.

The catalyst is particularly preferably an organic base. The amount of the organic base differs according to the type of the organic base and reaction conditions such as temperature and should be suitably set. For example, it is preferably 0.01 to 3 times, more preferably 0.05 to 1 time the total molar amount of all the silane compounds.

The hydrolysis or hydrolysis/condensation reaction for producing the polyorganosiloxane having an epoxy group is preferably carried out by dissolving the silane compound having an epoxy group and optionally another silane compound in an organic solvent, mixing this solution with an organic base and water, and heating the resulting mixture in an oil bath, for example.

At the time of the hydrolysis/condensation reaction, the above mixture is desirably heated at preferably 130° C. or lower, more preferably 40 to 100° C. for preferably 0.5 to 12 hours, more preferably 1 to 8 hours. During heating, the mixture may be stirred or refluxed.

After the end of the reaction, an organic solvent layer separated from the reaction solution is preferably washed with water. The organic solvent layer is preferably washed with water containing a small amount of a salt, for example, an aqueous solution containing about 0.2 wt % of ammonium nitrate because the washing operation is easy. Washing is carried out until the aqueous layer after washing becomes neutral, the organic solvent layer is dried with a drying agent such as anhydrous calcium sulfate or molecular sieve as required, and then the solvent is removed, thereby making it possible to obtain the polyorganosiloxane having an epoxy group of interest.

Commercially available products of the polyorganosiloxane having an epoxy group may be used in the present invention. The commercially available products include DMS-E01, DMS-E12, DMS-E21 and EMS-32 (of Chisso Corporation).

[Cinnamic Acid Derivative]

The above cinnamic acid derivative having at least one group selected from the group consisting of a carboxyl group, a hydroxyl group, —SH, —NCO, —NHR (R is a hydrogen atom or an alkyl group having 1 to 6 carbon atoms), —CH=CH$_2$ and —SO$_2$Cl is preferably a compound represented by the following formula (2) or the following formula (3):

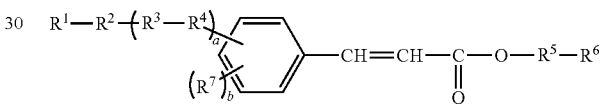

(in the formula (2), $R^1$ is an alkyl group having 1 to 40 carbon atoms or a monovalent organic group having 3 to 40 carbon atoms and containing an alicyclic group, with the proviso that some or all of the hydrogen atoms of the alkyl group may be substituted by a fluorine atom, $R^2$ is a single bond, an oxygen atom, —COO— or —COO—, $R^3$ is a divalent aromatic group, a divalent alicyclic group, a divalent heterocyclic group or a divalent condensed cyclic group, $R^4$ is a single bond, an oxygen atom, —COO— or —COO—, $R^5$ is a single bond, a methylene group, an alkylene group having 2 to 10 carbon atoms or a divalent aromatic group, when $R^5$ is a single bond, $R^6$ is a hydrogen atom and when $R^5$ is a methylene group, an alkylene group or a divalent aromatic group, $R^6$ is a carboxyl group, a hydroxyl group, —SH, —NCO, —NHR, —CH=CH$_2$ or —SO$_2$Cl (R is a hydrogen atom or an alkyl group having 1 to 6 carbon atoms), $R^7$ is a fluorine atom or a cyano group, "a" is an integer of 0 to 3, and "b" is an integer of 0 to 4)

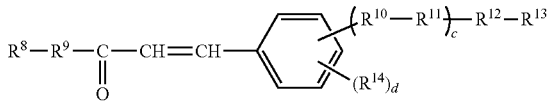

(in the formula (3), $R^8$ is an alkyl group having 1 to 40 carbon atoms or a monovalent organic group having 3 to 40 carbon atoms and containing an alicyclic group, with the proviso that some or all of the hydrogen atoms of the alkyl group may be substituted by a fluorine atom, $R^9$ is an oxygen atom or a divalent aromatic group, $R^{10}$ is an oxygen atom, —COO— or —OCO—, $R^{11}$ is a divalent aromatic group, a divalent heterocyclic group or a divalent condensed cyclic group, $R^{12}$ is a single bond, —OCO—$(CH_2)_e$— or —O—$(CH_2)_g$— ("e" and "g" are each an integer of 1 to 10), $R^{13}$ is a carboxyl group, a hydroxyl group, —SH, —NCO, —NHR, —CH=$CH_2$ or —$SO_2Cl$ (R is a hydrogen atom or an alkyl group having 1 to 6 carbon atoms), $R^{14}$ is a fluorine atom or a cyano group, "c" is an integer of 0 to 3, and "d" is an integer of 0 to 4).

The alkyl group having 1 to 40 carbon atoms represented by $R^1$ in the above formula (2) is preferably an alkyl group having 1 to 20 carbon atoms, some or all of the hydrogen atoms of which may be substituted by a fluorine atom. Examples of the alkyl group include n-pentyl group, n-hexyl group, n-heptyl group, n-octyl group, n-nonyl group, n-decyl group, n-lauryl group, n-dodecyl group, n-tridecyl group, n-tetradecyl group, n-pentadecyl group, n-hexadecyl group, n-heptadecyl group, n-octadecyl group, n-nonadecyl group, n-eicosyl group, 4,4,4-trifluorobutyl group, 4,4,5,5,5-pentafluoropentyl group, 4,4,5,5,6,6,6-heptafluorohexyl group, 3,3,4,4,5,5,5-heptafluoropentyl group, 2,2,2-trifluoroethyl group, 2,2,3,3,3-pentafluoropropyl group, 2-(perfluorobutyl)ethyl group, 2-(perfluorooctyl)ethyl group and 2-(perfluorodecyl)ethyl group. Examples of the monovalent organic group having 3 to 40 carbon atoms and containing an alicyclic group represented by $R^1$ include cholestenyl group, cholestanyl group and adamantyl group.

Examples of the divalent aromatic group represented by $R^3$ and $R^5$ include 1,4-phenylene group, 2-fluoro-1,4-phenylene group, 3-fluoro-1,4-phenylene group and 2,3,5,6-tetrafluoro-1,4-phenylene group; examples of the divalent heterocyclic group represented by $R^3$ include 1,4-pyridilene group, 2,5-piridilene group and 1,4-furanylene group; and examples of the divalent condensed cyclic group represented by $R^3$ include naphthylene group.

Examples of the divalent alicyclic group represented by $R^3$ include 1,4-cyclohexylene group.

Examples of the compound represented by the above formula (2) include compounds represented by the following formulas (2-1) to (2-30):

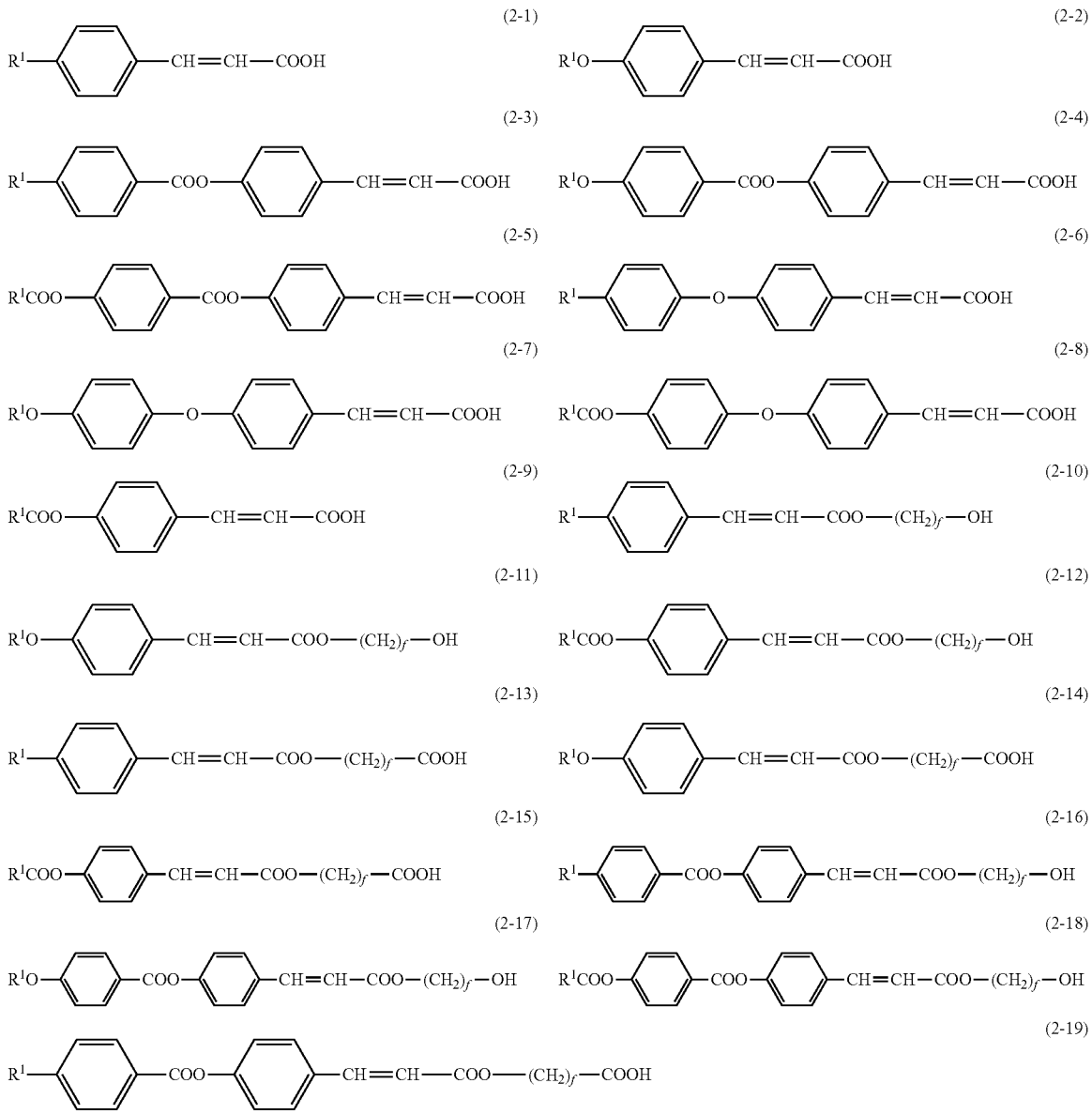

(2-20)
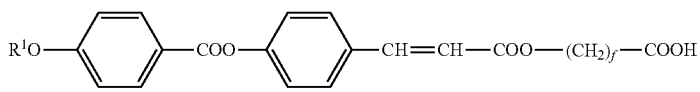

(2-21)
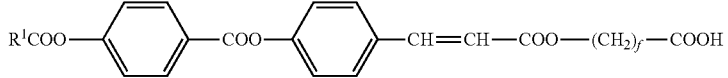

(2-22) (2-23)
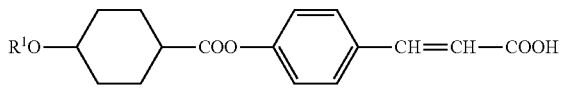 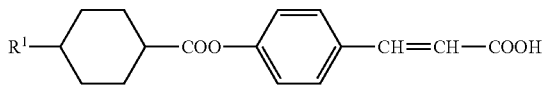

(2-24) (2-25)
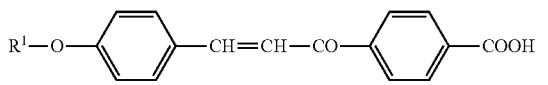 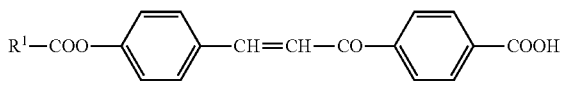

(2-26)
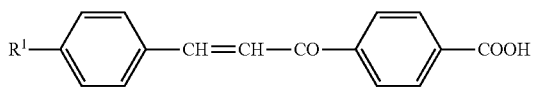

(2-27)
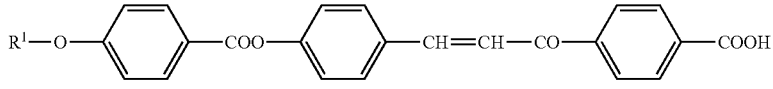

(2-28)
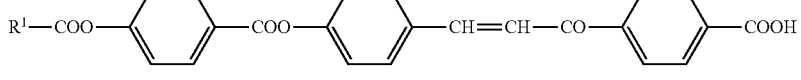

(2-29)
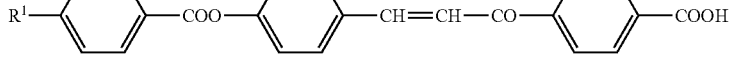

(2-30)
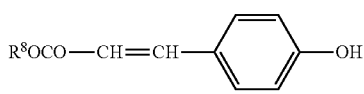

(in the above formulas, $R^1$ is as defined in the above formula (2), and "f" is an integer of 1 to 10).

The alkyl group having 1 to 40 carbon atoms represented by $R^8$ in the above formula (3) is preferably an alkyl group having 1 to 20 carbon atoms, some or all of the hydrogen atoms of which may be substituted by a fluorine atom. Examples of the alkyl group are the same as those enumerated for the alkyl group represented by $R^1$ in the above formula (2). Examples of the monovalent organic group having 3 to 40 carbon atoms and containing an alicyclic group represented by $R^8$ include cholestenyl group, cholestanyl group and adamantyl group.

Examples of the divalent aromatic group, heterocyclic group and condensed cyclic group represented by $R^9$ and $R^{11}$ are the same as those enumerated for the divalent aromatic group, heterocyclic group and condensed cyclic group represented by $R^3$ and $R^5$ in the above formula (2).

Examples of the compound represented by the above formula (3) include compounds represented by the following formulas (3-1) to (3-11):

(3-1) (3-2)
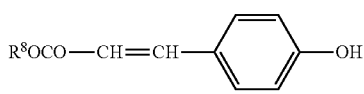 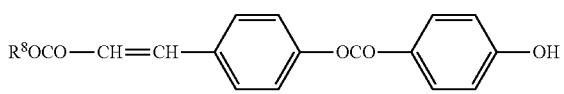

(3-3)
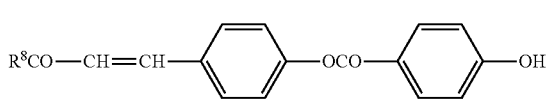

(3-4)
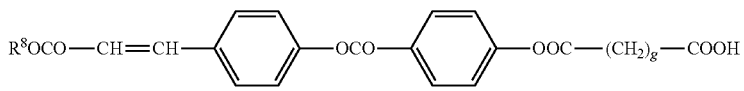

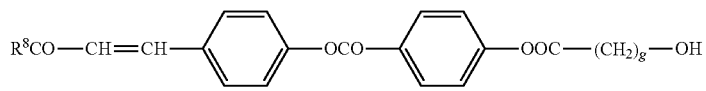
(3-5)

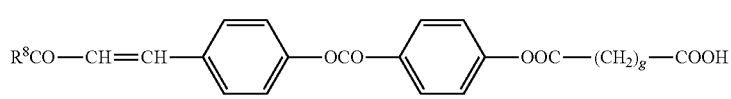
(3-6)

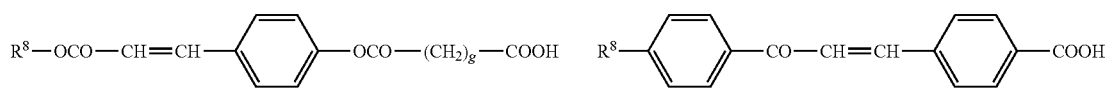
(3-7)      (3-8)

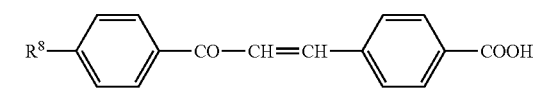

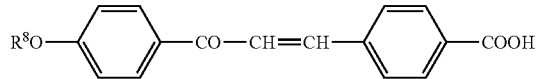
(3-9)

(3-10)

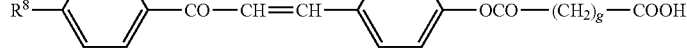
(3-11)

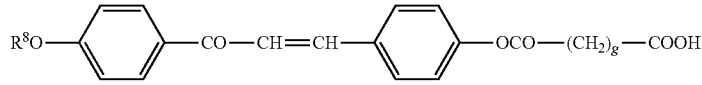

(in the above formulas, $R^8$ is as defined in the above formula (3), and "g" is an integer of 1 to 10).

[Synthesis of Radiation Sensitive Polyorganosiloxane]

The radiation sensitive polyorganosiloxane used in the present invention can be synthesized by reacting the above polyorganosiloxane having an epoxy group with the above cinnamic acid derivative preferably in the presence of a catalyst.

The cinnamic acid derivative is used in an amount of preferably 0.001 to 1.5 moles, more preferably 0.01 to 1 mole, much more preferably 0.05 to 0.9 mole based on 1 mole of the epoxy group of the polyorganosiloxane.

In the present invention, part of the above cinnamic acid derivative may be substituted by the compound represented by the above formula (5) as long as the effect of the present invention is not impaired. In this case, the synthesis of the radiation sensitive polyorganosiloxane is carried out by reacting the polyorganosiloxane having an epoxy group with a mixture of the cinnamic acid derivative and the compound represented by the above formula (5).

$R^{15}$ in the above formula (5) is preferably an alkyl group or alkoxyl group having 8 to 20 carbon atoms, or a fluoroalkyl group or fluoroalkoxyl group having 4 to 21 carbon atoms. $R^{16}$ is preferably a single bond, a 1,4-cyclohexylene group or a 1,4-phenylene group, and $R^{17}$ is preferably a carboxyl group.

Preferred examples of the compound represented by the above formula (5) include compounds represented by the following formulas (5-1) to (5-4):

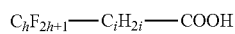
(5-1)

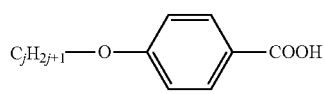
(5-2)

-continued $C_kF_{2k+1}$—$C_mH_{2m}$—O—⟨benzene⟩—COOH
(5-3)

$C_nH_{2n+1}$—⟨benzene⟩—COOH
(5-4)

(in the above formulas, "h" is an integer of 1 to 3, "i" is an integer of 3 to 18, "j" is an integer of 5 to 20, "k" is an integer of 1 to 3, "m" is an integer of 0 to 18, and "n" is an integer of 1 to 18).

Out of these, compounds represented by the following formulas (5-3-1) to (5-3-3) are preferred.

$CF_3$—O—⟨benzene⟩—COOH
(5-3-1)

$CF_3$—$C_3H_6$—O—⟨benzene⟩—COOH
(5-3-2)

$C_2F_5$—$C_3H_6$—O—⟨benzene⟩—COOH
(5-3-3)

The compound represented by the above formula (5) is a compound which reacts with the polyorganosiloxane having an epoxy group together with the above cinnamic acid derivative to provide pretilt angle generating capability to the obtained liquid crystal alignment film. In this text, the compound represented by the above formula (5) will be referred to as "another pretilt angle generating compound" hereinafter.

In the present invention, when the another pretilt angle generating compound is used in combination with the above cinnamic acid derivative, the total amount of the cinnamic acid derivative and the another pretilt angle generating compound is preferably 0.001 to 1.5 moles, more preferably 0.01 to 1 mole, much more preferably 0.05 to 0.9 mole based on 1 mole of the epoxy group of the polyorganosiloxane. In this case, the another pretilt angle generating compound is used in an amount of preferably not more than 50 mol %, more preferably not more than 25 mol % based on the total of it and the cinnamic acid derivative. When the amount of the another pretilt angle generating compound is larger than 50 mol %, there is a case where an abnormal domain is formed when the liquid crystal display device is turned on.

As the above catalyst may be used an organic base or a compound which is known as a curing accelerator for promoting a reaction between an epoxy compound and an acid anhydride.

Examples of the above organic base include primary and secondary organic amines such as ethylamine, diethylamine, piperazine, piperidine, pyrrolidine and pyrrole; tertiary organic amines such as triethylamine, tri-n-propylamine, tri-n-butylamine, pyridine, 4-dimethylaminopyridine and diazabicycloundecene; and quaternary organic amines such as tetramethylammonium hydroxide. Out of these organic bases, tertiary organic amines such as triethylamine, tri-n-propylamine, tri-n-butylamine, pyridine and 4-dimethylaminopyridine, and quaternary organic amines such as tetramethylammonium hydroxide are preferred.

Examples of the above curing accelerator include tertiary amines such as benzyldimethylamine, 2,4,6-tris(dimethylaminomethyl)phenol, cyclohexyldimethylamine and triethanolamine; imidazole compounds such as 2-methylimidazole, 2-n-heptylimidazole, 2-n-undecylimidazole, 2-phenylimidazole, 2-phenyl-4-methylimidazole, 1-benzyl-2-methylimidazole, 1-benzyl-2-phenylimidazole, 1,2-dimethylimidazole, 2-ethyl-4-methylimidazole 1-(2-cyanoethyl)-2-methylimidazole, 1-(2-cyanoethyl)-2-n-undecylimidazole, 1-(2-cyanoethyl)-2-phenylimidazole, 1-(2-cyanoethyl)-2-ethyl-4-methylimidazole, 2-phenyl-4-methyl-5-hydroxymethylimidazole, 2-phenyl-4,5-di(hydroxymethyl)imidazole, 1-(2-cyanoethyl)-2-phenyl-4,5-di[(2'-cyanoethoxy)methyl]imidazole, 1-(2-cyanoethyl)-2-n-undecylimidazolium trimellitate, 1-(2-cyanoethyl)-2-phenylimidazolium trimellitate, 1-(2-cyanoethyl)-2-ethyl-4-methylimidazolium trimellitate, 2,4-diamino-6-[2'-methylimidazolyl-(1')]ethyl-s-triazine, 2,4-diamino-6-(2'-n-undecylimidazolyl)ethyl-s-triazine, 2,4-diamino-6-[2'-ethyl-4'-methylimidazolyl-(1')]ethyl-s-triazine, isocyanuric acid adduct of 2-methylimidazole, isocyanuric acid adduct of 2-phenylimidazole and isocyanuric acid adduct of 2,4-diamino-6-[2'-methylimidazolyl-(1')]ethyl-s-triazine; organic phosphorus compounds such as diphenyl phosphine, triphenyl phosphine and triphenyl phosphite; quaternary phosphonium salts such as benzyltriphenylphosphonium chloride, tetra-n-butylphosphonium bromide, methyltriphenylphosphonium bromide, ethyltriphenylphosphonium bromide, n-butyltriphenylphosphonium bromide, tetraphenylphosphonium bromide, ethyltriphenylphosphonium iodide, ethyltriphenylphosphonium acetate, tetra-n-butylphosphonium o,o-diethylphosphorodithionate, tetra-n-butylphosphonium benzotriazolate, tetra-n-butylphosphonium tetrafluoroborate, tetra-n-butylphosphonium tetraphenylborate and tetraphenylphosphonium tetraphenylborate; diazabicycloalkenes such as 1,8-diazabicyclo[5.4.0]undecene-7 and organic acid salts thereof; organic metal compounds such as zinc octylate, tin octylate and aluminum acetylacetone complex; quaternary ammonium salts such as tetraethylammonium bromide, tetra-n-butylammonium bromide, tetraethylammonium chloride and tetra-n-butylammonium chloride; boron compounds such as boron trifluoride and triphenyl borate; metal halogen compounds such as zinc chloride and stannic chloride; and latent curing accelerators including high-melting point dispersible latent curing accelerators such as amine adduct type accelerators including dicyandiamide and an adduct of an amine with epoxy resin; microcapsule type latent curing accelerators obtained by coating the surfaces of curing accelerators such as the above imidazole compounds, organic phosphorus compounds and quaternary phosphonium salts with a polymer; amine salt type latent curing accelerators; and high-temperature dissociation type thermally cationic polymerization latent curing accelerators such as Lewis acid salts and Brϕnsted acid salts.

Out of these, quaternary ammonium salts such as tetraethylammonium bromide, tetra-n-butylammonium bromide, tetraethylammonium chloride and tetra-n-butylammonium chloride are preferred.

The catalyst is used in an amount of preferably not more than 100 parts by weight, more preferably 0.01 to 100 parts by weight, much more preferably 0.1 to 20 parts by weight based on 100 parts by weight of the polyorganosiloxane having an epoxy group.

The reaction temperature is preferably 0 to 200° C., more preferably 50 to 150° C. The reaction time is preferably 0.1 to 50 hours, more preferably 0.5 to 20 hours.

The synthesis reaction of the above radiation sensitive polyorganosiloxane may be carried out in the presence of an organic solvent as required. Examples of the organic solvent include hydrocarbon compounds, ether compounds, ester compounds, ketone compounds, amide compounds and alcohol compounds. Out of these, ether compounds, ester compounds and ketone compounds are preferred from the viewpoints of the solubilities of the raw materials and the product and the purification ease of the product. The solvent is used in an amount which ensures that the solids content (the ratio of the total weight of components except for the solvent in the reaction solution to the total weight of the solution) becomes preferably not less than 0.1 wt %, more preferably 5 to 50 wt %.

The radiation sensitive polyorganosiloxane of the present invention is obtained by introducing a structure derived from the cinnamic acid derivative into the polyorganosiloxane having an epoxy group through the ring-opening addition of an epoxy. This production method is very advantageous because it is simple and can increase the introduction rate of the structure derived from the cinnamic acid derivative.

<Other Components>

The liquid crystal aligning agent of the present invention contains the above-described radiation sensitive polyorganosiloxane.

The liquid crystal aligning agent of the present invention may further contain other components in addition to the above radiation sensitive polyorganosiloxane as long as the effect of the present invention is not impaired. The other components include a polymer except for the radiation sensitive polyorganosiloxane (to be referred to as "another polymer" hereinafter), a curing agent, a curing catalyst, a curing accelerator, a compound having at least one epoxy group in the molecule (to be referred to as "epoxy compound" hereinafter), a functional silane compound, and a surfactant.

[Another Polymers]

The above another polymer may be used to further improve the characteristic properties of a solution of the liquid crystal aligning agent of the present invention and the electric properties of the obtained liquid crystal alignment film. Examples of the another polymer include at least one polymer selected from the group consisting of a polyamic acid and a polyimide, at least one polymer selected from the group consisting of a polyorganosiloxane having a structure represented by the following formula (4), a hydrolysate thereof and a condensate of the hydrolysate (to be referred to as "another polyorganosiloxane" hereinafter), a polyamic acid ester, a polyester, a polyamide, a cellulose derivative, a polyacetal, a polystyrene derivative, a poly(styrene-phenylmaleimide) derivative and a poly(meth)acrylate.

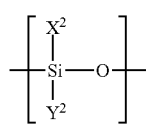

(4)

(In the above formula (4), $X^2$ is a hydroxyl group, halogen atom, alkyl group having 1 to 20 carbon atoms, alkoxyl group having 1 to 6 carbon atoms, or aryl group having 6 to 20 carbon atoms, and $Y^2$ is a hydroxyl group or alkoxyl group having 1 to 10 carbon atoms.)

[Polyamic Acid]

The above polyamic acid can be obtained by reacting a tetracarboxylic dianhydride with a diamine compound.

Examples of the tetracarboxylic dianhydride which can be used to synthesize the polyamic acid include aliphatic and alicyclic tetracarboyxlic dianhydrides such as 2,3,5-tricarboxycyclopentylacetic dianhydride, butanetetracarboxylic dianhydride, 1,2,3,4-cyclobutanetetracarboxylic dianhydride, 1,3-dimethyl-1,2,3,4-cyclobutanetetracarboxylic dianhydride, 1,2,3,4-cyclopentanetetracarboxylic dianhydride, 3,5,6-tricarboxynorbornane-2-acetic dianhydride, 2,3,4,5-tetrahydrofurantetracarboxylic dianhydride, 1,3,3a,4,5,9b-hexahydro-5-(tetrahydro-2,5-dioxo-3-furanyl)-naphtho[1,2-c]-furan-1,3-dione, 1,3,3a,4,5,9b-hexahydro-5-(tetrahydro-2,5-dioxo-3-furanyl)-8-methyl-naphtho[1,2-c]-furan-1,3-dione, 5(2,5-dioxotetrahydrofuranyl)-3-methyl-3-cyclohexene-1-2-dicarboxylic anhydride, bicyclo[2.2.2]-oct-7-ene-2,3,5,6-tetracarboxylic dianhydride and tetracarboxylic dianhydrides represented by the following formulas (T-1) to (T-14); and aromatic tetracarboxylic dianhydrides such as pyromellitic dianhydride, 3,3',4,4'-biphenylsulfonetetracarboxylic dianhydride, 1,4,5,8-naphthalenetetracarboxylic dianhydride, 2,3,6,7-naphthalenetetracarboxylic dianhydride, 3,3',4,4'-biphenylether tetracarboxylic dianhydride, 3,3',4,4'-dimethyldiphenylsilane tetracarboxylic dianhydride, 3,3',4,4'-tetraphenylsilane tetracarboxylic dianhydride, 1,2,3,4-furantetracarboxylic dianhydride, 4,4'-bis(3,4-dicarboxyphenoxy)diphenylsulfide dianhydride, 4,4'-bis(3,4-dicabroxyphenoxy)diphenylsulfone dianhydride, 4,4'-bis (3,4-dicabroxyphenoxy)diphenylpropane dianhydride, 3,3',4,4'-perfluoroisopropylidene tetracarboxylic dianhydride, 3,3',4,4'-biphenyl tetracarboxylic dianhydride, bis(phthalic acid)phenylphosphine oxide dianhydride, p-phenylene-bis (triphenylphthalic)dianhydride, m-phenylene-bis(triphenylphthalic)dianhydride, bis(triphenylphthalic acid)-4,4'-diphenyl ether dianhydride, bis(triphenylphthalic acid)-4,4'-diphenylmethane dianhydride and tetracarboxylic dianhydrides represented by the following formulas (T-15) to (T-18).

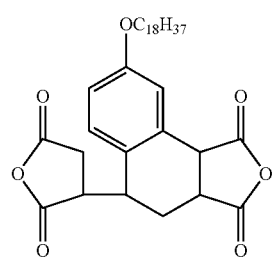

(T-1)

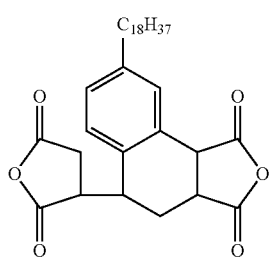

(T-2)

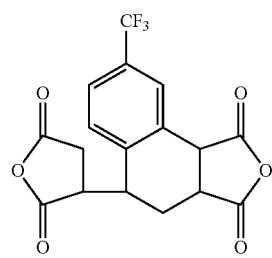

(T-3)

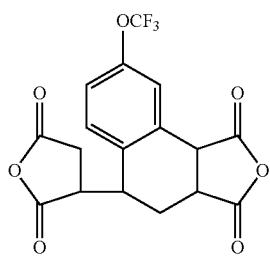

(T-4)

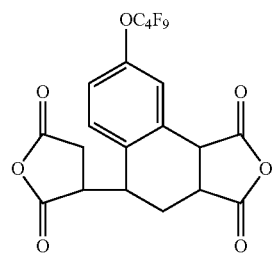

(T-5)

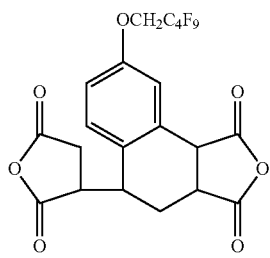

(T-6)

-continued
(T-7)
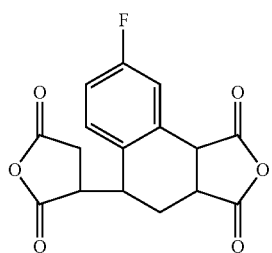
(T-8)
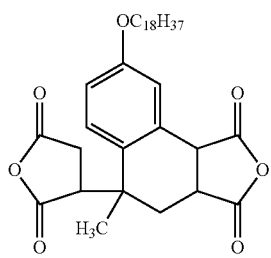
(T-9)
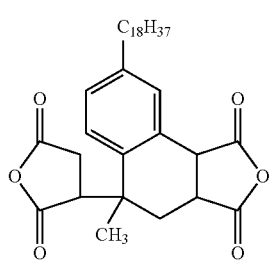
(T-10)
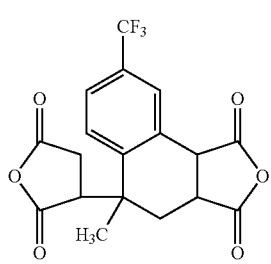
(T-11)
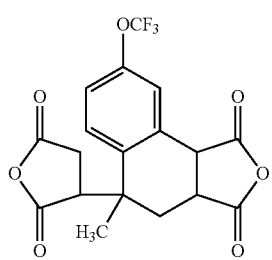
(T-12)
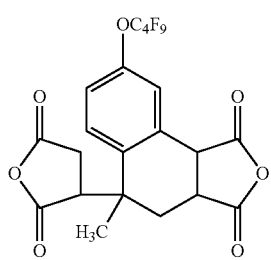
(T-13)
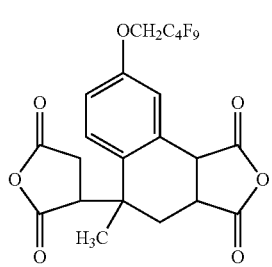
(T-14)
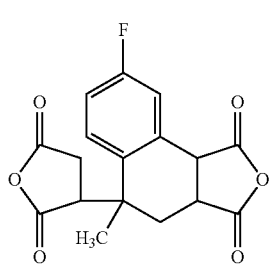
(T-15)
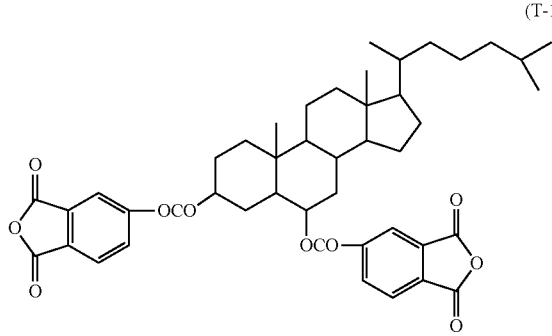
(T-16)
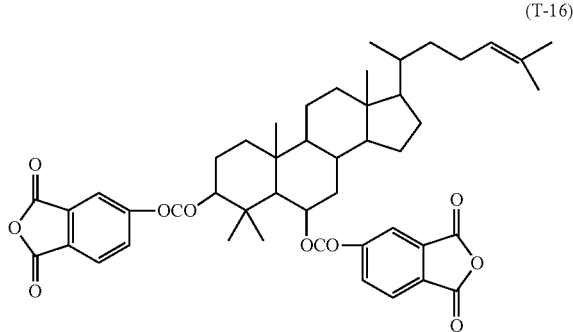

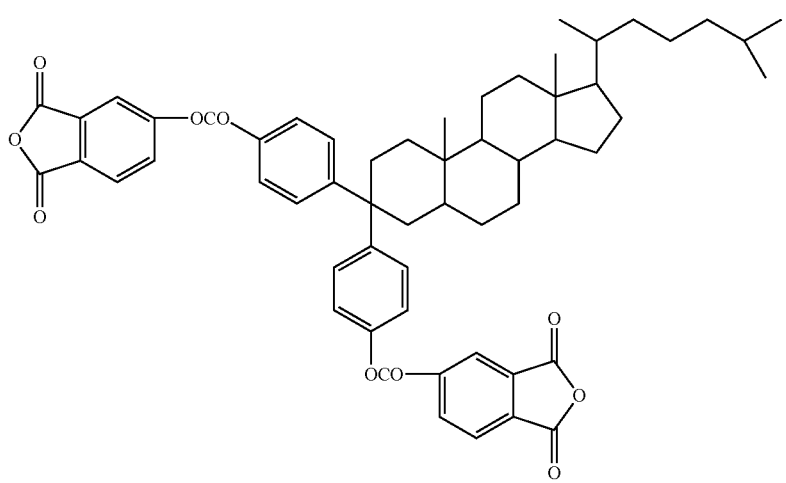
(T-17)

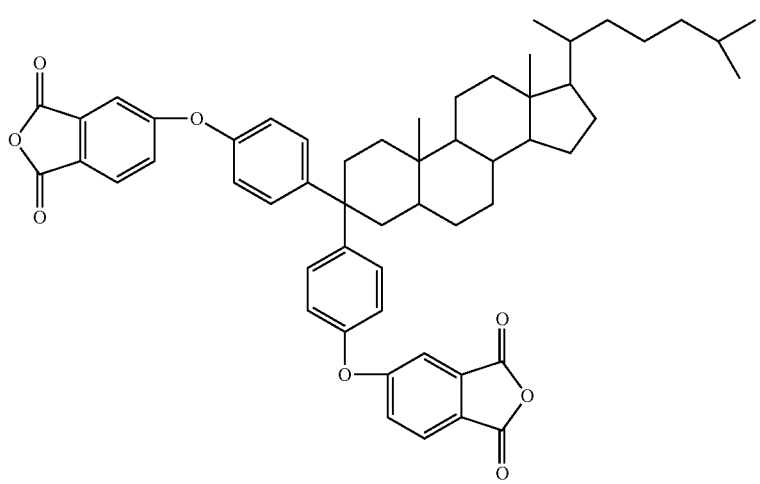
(T-18)

Out of these, preferred are 1,3,3a,4,5,9b-hexahydro-5-(tetrahydro-2,5-dioxo-3-furanyl)-naphtho[1,2-c]-furan-1,3-dione, 1,3,3a,4,5,9b-hexahydro-5-(tetrahydro-2,5-dioxo-3-furanyl)-8-methyl-naphtho[1,2-c]-furan-1,3-dione, 2,3,5-tricarboxycyclopentylacetic dianhydride, butanetetracarboxylic dianhydride, 1,3-dimethyl-1,2,3,4-cyclobutanetetracarboxylic dianhydride, 1,2,3,4-cyclobutanetetracarboxylic dianhydride, pyromellitic dianhydride, 3,3',4,4'-biphenylsulfone tetracarboxylic dianhydride, 1,4,5,8-naphthalenetetracarboxylic dianhydride, 2,3,6,7-naphthalenetetracarboxylic dianhydride, 3,3',4,4'-biphenylether tetracarboxylic dianhydride or tetracarboyxlic dianhydrides represented by the above formulas (T-1), (T-2) and (T-15) to (T-18).

These tetracarboxylic dianhydrides may be used alone or in combination of two or more.

Examples of the diamine which can be used to synthesize the above polyamic acid include aromatic diamines such as p-phenylenediamine, m-phenylenediamine, 4,4'-diaminodiphenylmethane, 4,4'-diaminodiphenylethane, 4,4'-diaminodiphenylsulfide, 4,4'-diaminodiphenylsulfone, 3,3'-dimethyl-4,4'-diaminobiphenyl, 4,4'-diaminobenzanilide, 4,4'-diaminodiphenyl ether, 1,5-diaminonaphthalene, 3,3-dimethyl-4,4'-diaminobiphenyl, 5-amino-1-(4'-aminophenyl)-1,3,3-trimethylindane, 6-amino-1-(4'-aminophenyl)-1,3,3-trimethylindane, 3,4'-diaminodiphenyl ether, 2,2-bis(4-aminophenoxy)propane, 2,2-bis[4-(4-aminophenoxy)phenyl]propane, 2,2-bis[4-(4-aminophenoxy)phenyl]hexafluoropropane, 2,2-bis(4-aminophenyl)hexafluoropropane, 2,2-bis[4-(4-aminophenoxy)phenyl]sulfone, 1,4-bis(4-aminophenoxy)benzene, 1,3-bis(4-aminophenoxy)benzene, 1,3-bis(3-aminophenoxy)benzene, 9,9-bis(4-aminophenyl)-10-hydroanthracene, 2,7-diaminofluorene, 9,9-bis(4-aminophenyl)fluorene, 4,4'-methylene-bis (2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-(p-phenyleneisopropylidene)bisaniline, 4,4'-(m-phenyleneisopropylidene)bisaniline, 2,2-bis[4-(4-amino-2-trifluoromethylphenoxy)phenyl]hexafluoropropane, 4,4'-diamino-2,2'-bis (trifluoromethyl)biphenyl, 4,4'-bis[(4-amino-2-trifluoromethyl)phenoxy]-octafluorobiphenyl, 6-(4-chalconyloxy)hexyloxy(2,4-diaminobenzene), 6-(4'-fluoro-4-chalconyloxy)hexyloxy(2,4-diaminobenzene), 8-(4-chalconyloxy)octyloxy(2,4-diaminobenzene), 8-(4'-fluoro-4-chalconyloxy)octyloxy(2,4-diaminobenzene), 1-dodecyloxy-2,4-diaminobenzene, 1-tetradecyloxy-2,4-diaminobenzene, 1-pentadecyloxy-2,4-diaminobenzene, 1-hexadecyloxy-2,4-diaminobenzene, 1-octadecyloxy-2,4-diaminobenzene, 1-cholesteryloxy-2,4-diaminobenzene, 1-cholestanyloxy-2,4-diaminobenzene, dodecyloxy(3,5-diaminobenzoyl), tetradecyloxy(3,5-diaminobenzoyl), pentadecyloxy(3,5-diaminobenzoyl), hexadecyloxy(3,5-diaminobenzoyl), octadecyloxy(3,5-diaminobenzoyl), cholesteryloxy(3,5-diaminobenzoyl), cholestanyloxy(3,5-diaminobenzoyl), (2,4-diaminophenoxy)palmitate, (2,4-diaminophenoxy)stearylate, (2,4-diaminophenoxy)-4-trifluoromethyl benzoate and compounds represented by the following formulas (D-1) to (D-5):

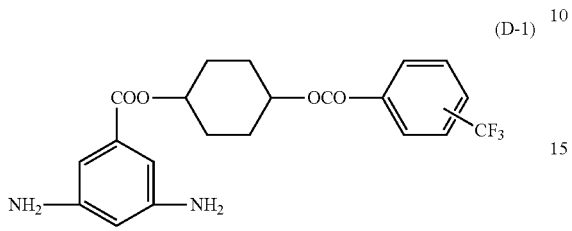

(D-1)

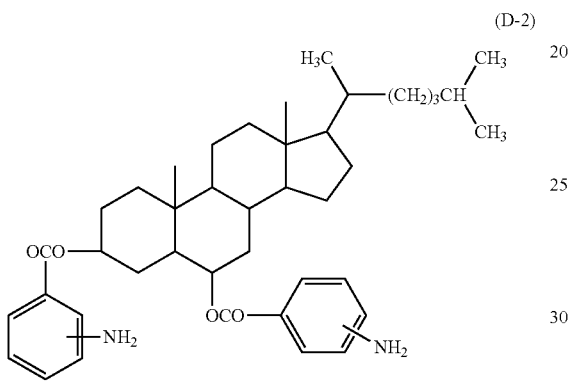

(D-2)

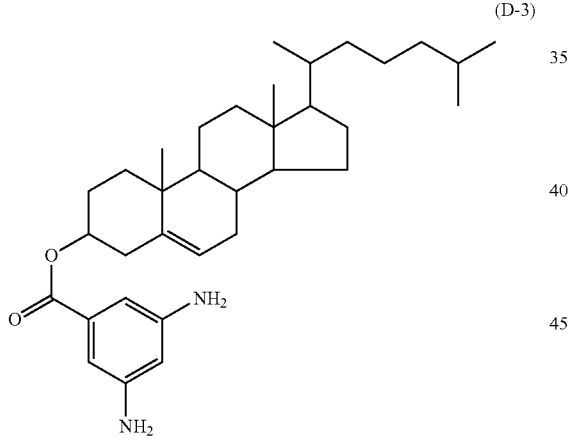

(D-3)

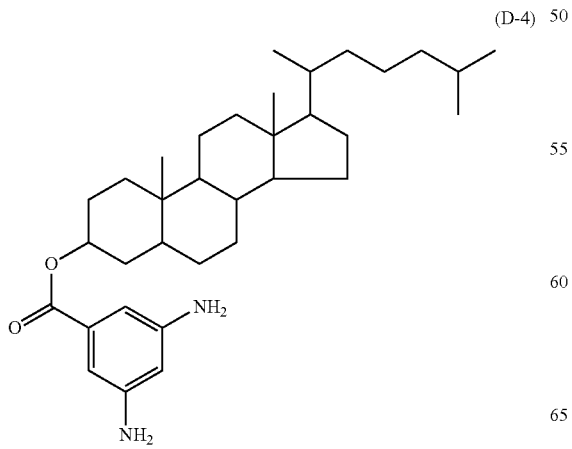

(D-4)

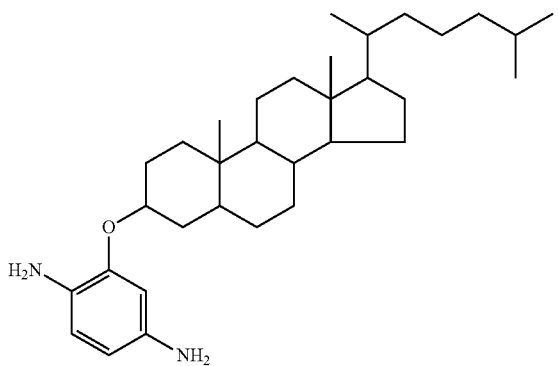

(D-5)

aromatic diamines having a hetero atom such as diaminotetraphenyl thiophene; aliphatic and alicyclic diamines such as metaxylylenediamine, 1,3-propanediamine, tetramethylenediamine, pentamethylenediamine, hexamethylenediamine, heptamethylenediamine, octamethylenediamine, nonamethylenediamine, 4,4-diaminoheptamethylenediamine, 1,4-diaminocyclohexane, isophoronediamine, tetrahydrodicyclopentadienylenediamine, hexahydro-4,7-methanoindanylenedimethylenediamine, tricyclo[6.2.1.0$^{2.7}$]-undecylenedimethyldiamine and 4,4'-methylenebis(cyclohexylamine); and diaminoorganosiloxanes such as diaminohexamethyldisiloxane.

Out of these, preferred are p-phenylenediamine, 4,4'-diaminodiphenylmethane, 1,5-diaminonaphthalene, 2,7-diaminofluorene, 4,4'-diaminodiphenyl ether, 4,4'-(p-phenyleneisopropylidene)bisaniline, 2,2-bis[4-(4-aminophenoxy)phenyl]hexafluoropropane, 2,2-bis(4-aminophenyl)hexafluoropropane, 2,2-bis[4-(4-amino-2-trifluoromethylphenoxy)phenyl]hexafluoropropane, 4,4'-diamino-2,2'-bis(trifluoromethyl)biphenyl, 4,4'-bis[(4-amino-2-trifluoromethyl)phenoxy]-octafluorobiphenyl, 1-hexadecyloxy-2,4-diaminobenzene, 1-octadecyloxy-2,4-diaminobenzene, 1-cholesteryloxy-2,4-diaminobenzene, 1-cholestanyloxy-2,4-diaminobenzene, hexadecyloxy(3,5-diaminobenzoyl), octadecyloxy(3,5-diaminobenzoyl), cholesteryloxy(3,5-diaminobenzoyl), cholestanyloxy(3,5-diaminobenzoyl) or diamines represented by the above formulas (D-1) to (D-5).

These diamines may be used alone or in combination of two or more.

As for the ratio of the tetracarboxylic dianhydride to the diamine compound used in the synthesis reaction of the polyamic acid, the amount of the acid anhydride group of the tetracarboxylic dianhydride is preferably 0.2 to 2 equivalents, more preferably 0.3 to 1.2 equivalents based on 1 equivalent of the amino group contained in the diamine.

The synthesis reaction of the polyamic acid is carried out preferably in an organic solvent at a temperature of preferably −20 to 150° C., more preferably 0 to 100° C. for preferably 0.5 to 24 hours, more preferably 2 to 10 hours. The organic solvent is not particularly limited if it can dissolve the synthesized polyamic acid. Examples of the organic solvent include aprotic polar solvents such as N-methyl-2-pyrrolidone, N,N-dimethylacetamide, N,N-dimethylformamide, N,N-dimethylimidazolidinone, dimethyl sulfoxide, γ-butyrolactone, tetramethylurea and hexamethylphosphortriamide; and phenolic solvents such as m-cresol, xylenol, phenol and halogenated phenol. The amount (a) of the organic solvent is set to ensure that the total amount (b) of the tetracarboxylic dianhydride and the diamine compounds becomes preferably 0.1 to 50 wt %, more preferably 5 to 30 wt % based on the total weight (a+b) of the reaction solution.

The reaction solution of the polyamic acid is obtained as described above. This reaction solution may be used to prepare a liquid crystal aligning agent directly or after the polyamic acid contained in the reaction solution is isolated, or after the isolated polyamic acid is purified. The polyamic acid can be isolated by a method in which the above reaction solution is injected into a large amount of a poor solvent to obtain a precipitate and this precipitate is dried under reduced pressure or a method in which the reaction solution is distilled off under reduced pressure by means of an evaporator. The polyamic acid can be purified by a method in which the polyamic acid is dissolved in an organic solvent again and precipitated with a poor solvent or a method in which the step of distilling off the reaction solution under reduced pressure by means of an evaporator is carried out once or several times.

[Polyimide]

The above polyimide can be produced by dehydrating/ring closing the amic acid structure of the polyamic acid obtained as described above. At this point, all of the amic acid structure may be dehydrated/ring closed to be completely imidized, or only part of the amic acid structure may be dehydrated/ring closed to obtain a partial imide having both an amic acid structure and an imide structure.

The dehydration ring-closure of the polyamic acid is carried out by (i) a method in which the polyamic acid is heated or (ii) a method in which the polyamic acid is dissolved in an organic solvent, a dehydrating agent and a dehydration ring-closure catalyst are added to the obtained solution and optionally heated.

In the above method (i) in which the polyamic acid is heated, the reaction temperature is preferably 50 to 200° C., more preferably 60 to 170° C. When the reaction temperature is lower than 50° C., the dehydration ring-closure reaction does not proceed fully and when the reaction temperature is higher than 200° C., the molecular weight of the obtained imidized polymer may lower. In this method in which the polyamic acid is heated, the reaction time is preferably 0.5 to 48 hours, more preferably 2 to 20 hours.

Meanwhile, in the above method (ii) in which a dehydrating agent and a dehydration ring-closure catalyst are added to the polyamic acid solution, an acid anhydride such as acetic anhydride, propionic anhydride or trifluoroacetic anhydride may be used as the dehydrating agent. The amount of the dehydrating agent is preferably 0.01 to 20 moles based on 1 mole of the structural unit of the polyamic acid. A tertiary amine such as pyridine, collidine, lutidine or triethylamine may be used as the dehydrating/ring closing catalyst. However, the catalyst is not limited to these. The amount of the dehydration ring-closure catalyst is preferably 0.01 to 10 moles based on 1 mole of the dehydrating agent. Examples of the organic solvent used in the dehydration ring-closure reaction are the same as the organic solvents enumerated above which are used to synthesize the polyamic acid. The reaction temperature of the dehydration ring-closure dehydration ring-closure reaction is preferably 0 to 180° C., more preferably 10 to 150° C., and the reaction time is preferably 0.5 to 20 hours, more preferably 1 to 8 hours.

In the method (ii), a reaction solution containing a polyimide is obtained as described above. This reaction solution may be used to prepare a liquid crystal aligning agent directly, or after the dehydrating agent and the dehydration ring-closing catalyst are removed from the reaction solution, after the polyimide is isolated or after the isolated polyimide is purified. To remove the dehydrating agent and the dehydration ring-closing catalyst from the reaction solution, means such as solvent substitution may be employed. The isolation and purification of the polyimide may be carried out by the same operations as described in the method of isolating and purifying the polyamic acid.

[Another Polyorganosiloxane]

The another polyorganosiloxane in the present invention is at least one selected from the group consisting of a polyorganosiloxane represented by the above formula (4), a hydrolysate thereof and a condensate of the hydrolysate. The another polyorganosiloxane can be synthesized, for example, by at least one silane compound selected from the group consisting of an alkoxysilane compound and a halogenated silane compound (to be referred to as "raw silane compound" hereinafter) preferably in a suitable organic solvent in the present of water and a catalyst.

Examples of the raw silane compound which can be used herein include tetramethoxysilane, tetraethoxysilane, tetra-n-propoxysilane, tetra-iso-propoxysilane, tetra-n-butoxysilane, tetra-sec-butoxysilane, tetra-tert-butoxysilane and tetrachlorosilane; methyl trimethoxysilane, methyl triethoxysilane, methyl tri-n-propoxysilane, methyl tri-iso-propoxysilane, methyl tri-n-butoxysilane, methyl tri-sec-butoxysilane, methyl tri-tert-butoxysilane, methyl triphenoxysilane, methyl trichlorosilane, ethyl trimethoxysilane, ethyl triethoxysilane, ethyl tri-n-propoxysilane, ethyl tri-iso-propoxysilane, ethyl tri-n-butoxysilane, ethyl tri-sec-butoxysilane, ethyl tri-tert-butoxysilane, ethyl trichlorosilane, phenyl trimethoxysilane, phenyl triethoxysilane and phenyl trichlorosilane; dimethyl dimethoxysilane, dimethyl diethoxysilane and dimethyl dichlorosilane; and trimethylmethoxysilane, trimethylethoxysilane and trimethylchlorosilane. Out of these, preferred are tetramethoxysilane, tetraethoxysilane, methyl trimethoxysilane, methyl triethoxysilane, phenyl trimethoxysilane, phenyl triethoxysilane, dimethyl dimethoxysilane, dimethyl diethoxysilane, trimethyl methoxysilane and trimethyl ethoxysilane.

Examples of the organic solvent which may be optionally used to synthesize the another polyorganosiloxane include an alcohol compound, ketone compound, amide compound, ester compound and another aprotic compound. They may be used alone or in combination of two or more.

Examples of the above alcohol compound include monohydric alcohol compounds such as methanol, ethanol, n-propanol, i-propanol, n-butanol, i-butanol, sec-butanol, t-butanol, n-pentanol, i-pentanol, 2-methylbutanol, sec-pentanol, t-pentanol, 3-methoxybutanol, n-hexanol, 2-methylpentanol, sec-hexanol, 2-ethylbutanol, sec-heptanol, heptanol-3, n-octanol, 2-ethylhexanol, sec-octanol, n-nonyl alcohol, 2,6-dimethylheptanol-4, n-decanol, sec-undecylalcohol, trimethylnonyl alcohol, sec-tetradecyl alcohol, sec-heptadecyl alcohol, phenol, cyclohexanol, methyl cyclohexanol, 3,3,5-trimethylcyclohexanol, benzyl alcohol and diacetone alcohol; polyhydric alcohol compounds such as ethylene glycol, 1,2-propylene glycol, 1,3-butylene glycol, pentanediol-2,4, 2-methylpentanediol-2,4, hexanediol-2,5, heptanediol-2,4,2-ethylhexanediol-1,3, diethylene glycol, dipropylene glycol, triethylene glycol and tripropylene glycol; and partial ethers of a polyhydric alcohol compound such as ethylene glycol monomethyl ether, ethylene glycol monoethyl ether, ethylene glycol monopropyl ether, ethylene glycol monobutyl ether, ethylene glycol monohexyl ether, ethylene glycol monophenyl ether, ethylene glycol mono-2-ethylbutyl ether, diethylene glycol monomethyl ether, diethylene glycol monoethyl ether, diethylene glycol monopropyl ether, diethylene glycol monobutyl ether, diethylene glycol monohexyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether and dipropylene glycol monopropyl ether. These alcohol compounds may be used alone or in combination of two or more.

Examples of the above ketone compound include monoketone compounds such as acetone, methyl ethyl ketone, methyl-n-propyl ketone, methyl-n-butyl ketone, diethyl ketone, methyl-1-butyl ketone, methyl-n-pentyl ketone, ethyl-n-butyl ketone, methyl-n-hexyl ketone, di-1-butyl ketone, trimethyl nonanone, cyclohexanone, 2-hexanone, methyl cyclohexanone, 2,4-pentanedione, acetonyl acetone, acetophenone and fenchone; and β-diketone compounds such as acetylacetone, 2,4-hexanedione, 2,4-heptanedione, 3,5-heptanedione, 2,4-octanedione, 3,5-octanedione, 2,4-nonanedione, 3,5-nonanedione, 5-methyl-2,4-hexanedione, 2,2,6,6-tetramethyl-3,5-heptanedione and 1,1,1,5,5,5-hexafluoro-2,4-heptanedione. These ketone compounds may be used alone or in combination of two or more.

Examples of the above amide compounds include formamide, N-methylformamide, N,N-dimethylformamide, N-ethylformamide, N,N-diethylformamide, acetamide, N-methylacetamide, N,N-dimethylacetamide, N-ethylacetamide, N,N-diethylacetamide, N-methylpropionamide, N-methylpyrrolidone, N-formylmorpholine, N-formylpiperidine, N-formylpyrrolidine, N-acetylmorpholine, N-acetylpiperidine and N-acetylpyrrolidine. These amide compounds may be used alone or in combination of two or more.

Examples of the above ester compound include diethyl carbonate, ethylene carbonate, propylene carbonate, diethyl carbonate, methyl acetate, ethyl acetate, γ-butyrolactone, γ-valerolactone, n-propyl acetate, i-propyl acetate, n-butyl acetate, i-butyl acetate, sec-butyl acetate, n-pentyl acetate, sec-pentyl acetate, 3-methoxybutyl acetate, methylpentyl acetate, 2-ethylbutyl acetate, 2-ethylhexyl acetate, benzyl acetate, cyclohexyl acetate, methylcyclohexyl acetate, n-nonyl acetate, methyl acetoacetate, ethyl acetoacetate, ethylene glycol monomethyl ether acetate, ethylene glycol monoethyl ether acetate, diethylene glycol monomethyl ether acetate, diethylene glycol monoethyl ether acetate, diethylene glycol mono-n-butyl ether acetate, propylene glycol monomethyl ether acetate, propylene glycol monoethyl ether acetate, propylene glycol monopropyl ether acetate, propylene glycol monobutyl ether acetate, dipropylene glycol monomethyl ether acetate, dipropylene glycol monoethyl ether acetate, glycol diacetate, methoxytriglycol acetate, ethyl propionate, n-butyl propionate, i-amyl propionate, diethyl oxalate, di-n-butyl oxalate, methyl lactate, ethyl lactate, n-butyl lactate, n-amyl lactate, diethyl malonate, dimethyl phthalate and diethyl phthalate. These ester compounds may be used alone or in combination of two or more.

Examples of the above another aprotic compound include acetonitrile, dimethyl sulfoxide, N,N,N',N'-tetraethyl sulfamide, hexamethylphosphoric triamide, N-methylmorphorone, N-methylpyrrole, N-ethylpyrrole, N-methyl-Δ3-pyrroline, N-methylpiperidine, N-ethylpiperidine, N,N-dimethylpiperazine, N-methylimidazole, N-methyl-4-piperidone, N-methyl-2-piperidone, N-methyl-2-pyrrolidone, 1,3-dimethyl-2-imidazolidinone and 1,3-dimethyltetrahydro-2(1H)-pyrimidinone.

Out of these solvents, polyhydric alcohol compounds, partial ethers of a polyhydric alcohol compound and ester compounds are particularly preferred.

The amount of water used to synthesize the another polyorganosiloxane is preferably 0.01 to 100 moles, more preferably 0.1 to 30 moles, much more preferably 1 to 1.5 moles based on 1 mole of the total of the alkoxyl group and halogen atom of the raw silane compound.

Examples of the catalyst which can be used to synthesize the another polyorganosiloxane include a metal chelate compound, organic acid, inorganic acid, organic base, ammonia and alkali metal compound.

Examples of the above metal chelate compound include titanium chelate compounds such as triethoxy.mono(acetylacetonato)titanium, tri-n-propoxy.mono(acetylacetonato)titanium, tri-i-propoxy.mono(acetylacetonato)titanium, tri-n-butoxy.mono(acetylacetonato)titanium, tri-sec-butoxy.mono(acetylacetonato)titanium, tri-t-butoxy.mono(acetylacetonato)titanium, diethoxy.bis(acetylacetonato)titanium, di-n-propoxy.bis(acetylacetonato)titanium, di-i-propoxy.bis(acetylacetonato)titanium, di-n-butoxy.bis(acetylacetonato)titanium, di-sec-butoxy.bis(acetylacetonato)titanium, di-t-butoxy.bis(acetylacetonato)titanium, monoethoxy.tris(acetylacetonato)titanium, mono-n-propoxy.tris(acetylacetonato)titanium, mono-i-propoxy.tris(acetylacetonato)titanium, mono-n-butoxy.tris(acetylacetonato)titanium, mono-sec-butoxy.tris(acetylacetonato)titanium, mono-t-butoxy.tris(acetylacetonato)titanium, tetrakis(acetylacetonato)titanium, triethoxy.mono(ethylacetoacetate)titanium, tri-n-propoxy.mono(ethylacetoacetate)titanium, tri-i-propoxy.mono(ethylacetoacetate)titanium, tri-n-butoxy.mono(ethylacetoacetate)titanium, tri-sec-butoxy.mono(ethylacetoacetate)titanium, tri-t-butoxy.mono(ethylacetoacetate)titanium, diethoxy.bis(ethylacetoacetate)titanium, di-n-propoxy.bis(ethylacetoacetate)titanium, di-i-propoxy.bis(ethylacetoacetate)titanium, di-n-butoxy.bis(ethylacetoacetate)titanium, di-sec-butoxy.bis(ethylacetoacetate)titanium, di-t-butoxy.bis(ethylacetoacetate)titanium, monoethoxy.tris(ethylacetoacetate)titanium, mono-n-propoxy.tris(ethylacetoacetate)titanium, mono-i-propoxy.tris(ethylacetoacetate)titanium, mono-n-butoxy.tris(ethylacetoacetate)titanium, mono-sec-butoxy.tris(ethylacetoacetate)titanium, mono-t-butoxy.tris(ethylacetoacetate)titanium, tetrakis(ethylacetoacetate)titanium, mono(acetylacetonato)tris(ethylacetoacetate)titanium, bis(acetylacetonato)bis(ethylacetoacetate)titanium and tris(acetylacetonato)mono(ethylacetoacetate)titanium; zirconium chelate compounds such as triethoxy.mono(acetylacetonato)zirconium, tri-n-propoxy.mono(acetylacetonato) zirconium, tri-i-propoxy.mono(acetylacetonato)zirconium, tri-n-butoxy.mono(acetylacetonato)zirconium, tri-sec-butoxy.mono(acetylacetonato)zirconium, tri-t-butoxy.mono(acetylacetonato)zirconium, diethoxy.bis(acetylacetonato)zirconium, di-n-propoxy.bis(acetylacetonato)zirconium, di-i-propoxy.bis(acetylacetonato)zirconium, di-n-butoxy.bis(acetylacetonato)zirconium, di-sec-butoxy.bis(acetylacetonato)zirconium, di-t-butoxy.bis(acetylacetonato)zirconium, monoethoxy.tris(acetylacetonato)zirconium, mono-n-propoxy.tris(acetylacetonato)zirconium, mono-i-propoxy.tris(acetylacetonato)zirconium, mono-n-butoxy.tris(acetylacetonato)zirconium, mono-sec-butoxy.tris(acetylacetonato)zirconium, mono-t-butoxy.tris(acetylacetonato)zirconium, tetrakis(acetylacetonato)zirconium, triethoxy.mono(ethylacetoacetate)zirconium, tri-n-propoxy.mono(ethylacetoacetate)zirconium, tri-i-propoxy.mono(ethylacetoacetate)zirconium, tri-n-butoxy.mono(ethylacetoacetate)zirconium, tri-sec-butoxy.mono(ethylacetoacetate)zirconium, tri-t-butoxy.mono(ethylacetoacetate)zirconium, diethoxy.bis(ethylacetoacetate)zirconium, di-n-propoxy.bis(ethylacetoacetate)zirconium, di-i-propoxy.bis(ethylacetoacetate)zirconium, di-n-butoxy.bis (ethylacetoacetate)zirconium, di-sec-butoxy.bis(ethylacetoacetate)zirconium, di-t-butoxy.bis(ethylacetoacetate)zirconium, monoethoxy.tris(ethylacetoacetate)zirconium, mono-n-propoxy.tris(ethylacetoacetate)zirconium, mono-i-propoxy.tris(ethylacetoacetate)zirconium, mono-n-butoxy-.tris(ethylacetoacetate)zirconium, mono-sec-butoxy.tris(ethylacetoacetate)zirconium, mono-t-butoxy.tris(ethylacetoacetate)zirconium, tetrakis(ethylacetoacetate)zirconium, mono(acetylacetonato)tris(ethylacetoacetate)zirconium, bis(acetylacetonato)bis(ethylacetoacetate)zirconium and tris(acetylacetonato)mono(ethylacetoacetate)zirconium; and aluminum chelate compounds such as tris(acetylacetonato)aluminum and tris(ethylacetoacetate)aluminum.

Examples of the above organic acid include acetic acid, propionic acid, butanoic acid, pentanoic acid, hexanoic acid, heptanoic acid, octanoic acid, nonanoic acid, decanoic acid, oxalic acid, maleic acid, methylmalonic acid, adipic acid, sebacic acid, gallic acid, butyric acid, mellitic acid, arachidonic acid, mikimic acid, 2-ethylhexanoic acid, oleic acid, stearic acid, linoleic acid, linoleinic acid, salicylic acid, benzoic acid, p-aminobenzoic acid, p-toluenesulfonic acid, benzenesulfonic acid, monochloroacetic acid, dichloroacetic acid, trichloroacetic acid, trifluoroacetic acid, formic acid, malonic acid, sulfonic acid, phthalic acid, fumaric acid, citric acid and tartaric acid.

Examples of the above inorganic acid include hydrochloric acid, nitric acid, sulfuric acid, hydrofluoric acid and phosphoric acid.

Examples of the above organic base include pyridine, pyrrole, piperazine, pyrrolidine, piperidine, picoline, trimethylamine, triethylamine, monoethanolamine, diethanolamine, dimethyl monoethanolamine, monomethyl diethanolamine, triethanolamine, diazabicycloocтане, diazabicyclononane, diazabicycloundecene and tetramethylammonium hydroxide.

Examples of the above alkali metal compound include sodium hydroxide, potassium hydroxide, barium hydroxide and calcium hydroxide.

These catalysts may be used alone or in combination of two or more.

Out of these catalysts, metal chelate compounds, organic acids and inorganic acids are preferred, and titanium chelate compounds and organic acids are more preferred.

The amount of the catalyst is preferably 0.001 to 10 parts by weight, more preferably 0.001 to 1 part by weight based on 100 parts by weight of the raw silane compound.

Water which is added in the synthesis of the another polyorganosiloxane may be added to the raw silane compound or a solution prepared by dissolving the silane compound in an organic solvent intermittently or continuously.

The catalyst may be added to the raw silane compound or a solution prepared by dissolving the silane compound in an organic solvent in advance, or dissolved or dispersed into water to be added.

The reaction temperature for the synthesis of the another polyorganosiloxane is preferably 0 to 100° C., more preferably 15 to 80° C. The reaction time is preferably 0.5 to 24 hours, more preferably 1 to 8 hours.

[Amount of Another Polymer]

When the liquid crystal aligning agent of the present invention contains the above-described radiation sensitive polyorganosiloxane and another polymer, the content of the another polymer is preferably not more than 10,000 parts by weight based on 100 parts by weight of the radiation sensitive polyorganosiloxane. The more preferred content of the another polymer differs according to the type of the another polymer.

When the liquid crystal aligning agent of the present invention contains the radiation sensitive polyorganosiloxane and at least one polymer selected from the group consisting of a polyamic acid and a polyimide, the total amount of the polyamic acid and the polyimide is preferably 100 to 5,000 parts by weight, more preferably 200 to 2,000 parts by weight based on 100 parts by weight of the radiation sensitive polyorganosiloxane.

When the liquid crystal aligning agent of the present invention contains the radiation sensitive polyorganosiloxane and another polyorganosiloxane, the amount of the another polyorganosiloxane is preferably 100 to 2,000 parts by weight based on 100 parts by weight of the radiation sensitive polyorganosiloxane.

When the liquid crystal aligning agent of the present invention contains the radiation sensitive polyorganosiloxane and another polymer, the another polymer is preferably at least one polymer selected from the group consisting of a polyamic acid and a polyimide or another polyorganosiloxane.

[Curing Agent and Curing Catalyst]

The above curing agent and the above curing catalyst may be contained in the liquid crystal aligning agent of the present invention to further reinforce the crosslinking reaction of the radiation sensitive polyorganosiloxane, and the above curing accelerator may be contained in the liquid crystal aligning agent of the present invention to promote a curing reaction caused by the curing agent.

As the above curing agent may be used a curing agent which is generally used to cure a curable compound having an epoxy group or a curable composition which contains a compound having an epoxy group. Examples of the curing agent include a polyamine, polycarboxylic anhydride or polycarboxylic acid.

Examples of the above polycarboxylic anhydride include anhydrides of cyclohexanetricarboxylic acid and other polycarboxylic anhydrides.

The anhydrides of cyclohexanetricarboxylic acid include cyclohexane-1,3,4-tricarboxylic-3,4-anhydride, cyclohexane-1,3,5-tricarboxylic-3,5-anhydride and cyclohexane-1,2,3-tricarboxylic-2,3-anhydride. The other polycarboxylic anhydrides include 4-methyltetrahydrophthalic anhydride, methylnadic anhydride, dodecenylsuccinic anhydride, succinic anhydride, maleic anhydride, phthalic anhydride, trimellitic anhydride, compound represented by the following formula (6), tetracarboxylic dianhydride which is generally used to synthesize a polyamic acid, Diels-Alder reaction product of an alicyclic compound having a conjugated double bond such as α-terpinene or alloocimene and maleic anhydride, and hydrogenated product thereof.

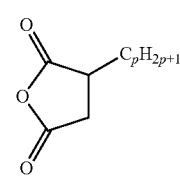

(6)

(in the formula (6), "p" is an integer of 1 to 20.)

As the above curing catalyst may be used an antimony hexafluoride compound, phosphorus hexafluoride compound or aluminum trisacetylacetonato. These catalysts can catalyze the cationic polymerization of an epoxy group by heating.

Examples of the above curing accelerator include imidazole compounds; quaternary phosphorus compounds; quaternary amine compounds; diazabicycloalkenes such as 1,8-diazabicyclo[5.4.0]undecene-7 and organic salts thereof; organic metal compounds such as zinc octylate, tin octylate and aluminum acetylacetone complex; boron compounds such as boron trifluoride and triphenyl borate; metal halogen compounds such as zinc chloride and stannic chloride; high-melting point dispersible latent curing accelerators such as amine addition type accelerators including dicyandiamide and an adduct of an amine with epoxy resin; microcapsule type latent curing accelerators prepared by coating the surface of a quaternary phosphonium salt with a polymer; amine salt type latent curing accelerators; and high-temperature dissociation type thermally cationic polymerization latent curing accelerators such as Lewis acid salts and Brφnsted acid salts.

[Epoxy Compound]

The above epoxy compound may be contained in the liquid crystal aligning agent of the present invention to improve the adhesion to the surface of the substrate of a liquid crystal alignment film to be formed.

Examples of the epoxy compound include ethylene glycol diglycidyl ether, polyethylene glycol diglycidyl ether, propylene glycol diglycidyl ether, tripropylene glycol diglycidyl ether, polypropylene glycol diglycidyl ether, neopentyl glycol diglycidyl ether, 1,6-hexanediol diglycidyl ether, glycerin diglycidyl ether, 2,2-dibromoneopentyl glycol diglycidyl ether, 1,3,5,6-tetraglycidyl-2,4-hexanediol, N,N,N',N'-tetraglycidyl-m-xylenediamine, 1,3-bis(N,N-diglycidylaminomethyl)cyclohexane, N,N,N',N'-tetraglycidyl-4,4'-diaminodiphenylmethane, N,N-diglycidyl-benzylamine and N,N-diglycidyl-aminomethylcyclohexane.

When the liquid crystal aligning agent of the present invention contains the epoxy compound, the amount of the epoxy compound is preferably not more than 40 parts by weight, more preferably 0.1 to 30 parts by weight based on 100 parts by weight of the total of the above radiation sensitive polyorganosiloxane and the another polymer which is optionally used.

When the liquid crystal aligning agent of the present invention contains the epoxy compound, a basic catalyst such as 1-benzyl-2-methylimidazole may be used to cause its crosslinking reaction efficiently.

[Functional Silane Compound]

The above functional silane compound may be used to improve the adhesion to a substrate of the obtained liquid crystal alignment film. Examples of the functional silane compound include 3-aminopropyl trimethoxysilane, 3-aminopropyl triethoxysilane, 2-aminopropyl trimethoxysilane, 2-aminopropyl triethoxysilane, N-(2-aminoethyl)-3-aminopropyl trimethoxysilane, N-(2-aminoethyl)-3-aminopropylmethyl dimethoxysilane, 3-ureidopropyl trimethoxysilane, 3-ureidopropyl triethoxysilane, N-ethoxycarbonyl-3-aminopropyl trimethoxysilane, N-ethoxycarbonyl-3-aminopropyl triethoxysilane, N-triethoxysilylpropyl triethylenetriamine, N-trimethoxysilylpropyl triethylenetriamine, 10-trimethoxysilyl-1,4,7-triazadecane, 10-triethoxysilyl-1,4,7-triazadecane, 9-trimethoxysilyl-3,6-diazanonylacetate, 9-triethoxysilyl-3,6-diazanonylacetate, N-benzyl-3-aminopropyl trimethoxysilane, N-benzyl-3-aminopropyl triethoxysilane, N-phenyl-3-aminopropyl trimethoxysilane, N-phenyl-3-aminopropyl triethoxysilane, N-bis(oxyethylene)-3-aminopropyl trimethoxysilane, N-bis(oxyethylene)-3-aminopropyl triethoxysilane, 3-glycidyloxypropyl trimethoxysilane and 2-(3,4-epoxycyclohexyl)ethyl trimethoxysilane. Further, reaction products of a tetracarboxylic dianhydride and a silane compound having an amino group as disclosed by JP-A 63-291922 are also included in the above examples.

When the liquid crystal aligning agent of the present invention contains the functional silane compound, the amount of the functional silane compound is preferably not more than 50 parts by weight, more preferably not more than 20 parts by weight based on 100 parts by weight of the total of the above radiation sensitive polyorganosiloxane and the another polymer which is optionally used.

[Surfactant]

Examples of the above surfactant include a nonionic surfactant, anionic surfactant, cationic surfactant, amphoteric surfactant, silicone surfactant, polyalkylene oxide surfactant and fluorine-containing surfactant.

When the liquid crystal aligning agent of the present invention contains a surfactant, the amount of the surfactant is preferably not more than 10 parts by weight, more preferably not more than 1 part by weight based on 100 parts by weight of the whole liquid crystal aligning agent.

<Liquid Crystal Aligning Agent>

The liquid crystal aligning agent of the present invention contains the radiation sensitive polyorganosiloxane as an essential component and optionally other components as described above and is preferably prepared as a composition solution obtained by dissolving these components in an organic solvent. Preferably, the organic solvent which can be used to prepare the liquid crystal aligning agent of the present invention dissolves the radiation sensitive polyorganosiloxane and optional other components and does not react with these.

The organic solvent which can be preferably used for the liquid crystal aligning agent of the present invention differs according to the type of the another polymer which is optionally added.

Preferred examples of the organic solvent which is used when the liquid crystal aligning agent of the present invention contains the radiation sensitive polyorganosiloxane and at least one polymer selected from a polyamic acid and a polyimide are organic solvents enumerated above which are used to synthesize the polyamic acid. At this point, poor solvents enumerated above which are used to synthesize the polyamic acid of the present invention may be used. These organic solvents may be used alone or in combination of two or more.

Meanwhile, when the liquid crystal aligning agent of the present invention contains only a radiation sensitive polyorganosiloxane as a polymer, or when the liquid crystal aligning agent contains a radiation sensitive polyorganosiloxane and another polyorganosiloxane, preferred examples of the organic solvent include 1-ethoxy-2-propanol, propylene glycol monoethyl ether, propylene glycol monopropyl ether, propylene glycol monobutyl ether, propylene glycol monoacetate, dipropylene glycol methyl ether, dipropylene glycol ethyl ether, dipropylene glycol propyl ether, dipropylene glycol dimethyl ether, ethylene glycol monomethyl ether, ethylene glycol monoethyl ether, ethylene glycol monopropyl ether, ethylene glycol monobutyl ether (butyl cellosolve), ethylene glycol monoamyl ether, ethylene glycol monohexyl ether, diethylene glycol, methyl cellosolve acetate, ethyl cellosolve acetate, propyl cellosolve acetate, butyl cellosolve acetate, methyl carbitol, ethyl carbitol, propyl carbitol, butyl carbitol, n-propyl acetate, i-propyl acetate, n-butyl acetate, i-butyl acetate, sec-butyl acetate, n-pentyl acetate, sec-pentyl acetate, 3-methoxybutyl acetate, methylpentyl acetate, 2-ethylbutyl acetate, 2-ethylhexyl acetate, benzyl acetate, n-hexyl acetate, cyclohexyl acetate, octyl acetate, amyl acetate and isoamyl acetate. Out of these, n-propyl acetate, i-propyl acetate, n-butyl acetate, i-butyl acetate, sec-butyl acetate, n-pentyl acetate and sec-pentyl acetate are preferred.

As the preferred solvent used for the preparation of the liquid crystal aligning agent of the present invention, the organic solvents listed above may be used alone or in combination of two or more according to whether another polymer is used or not and the type of that polymer to ensure that the components contained in the liquid crystal aligning agent do not separate out when the solids content is in the preferred range below and that the surface tension of the liquid crystal aligning agent falls in the range of 25 to 40 mN/m.

The solids content of the liquid crystal aligning agent of the present invention, that is, the ratio of the total weight of all the components except for the solvent in the liquid crystal aligning agent to the whole weight of the liquid crystal aligning agent is selected in consideration of viscosity and volatility but preferably 1 to 10 wt %. The liquid crystal aligning agent of the present invention is applied to the surface of a substrate to form a coating film as a liquid crystal alignment film. When the solids content is lower than 1 wt %, the thickness of this coating film becomes too small, thereby making it difficult to obtain a satisfactory liquid crystal alignment film. When the solids content is higher than 10 wt %, the thickness of the coating film becomes too large, thereby making it difficult to obtain a satisfactory liquid crystal alignment film, and the viscosity of the liquid crystal aligning agent becomes too high, whereby coating properties may become unsatisfactory. The particularly preferred solids content differs according to means of applying the liquid crystal aligning agent to the substrate. For example, when a spinner is used, the solids content is particularly preferably 1.5 to 4.5 wt %. In the case of printing, the solids content is particularly preferably set to 3 to 9 wt %, thereby setting the solution viscosity to 12 to 50 mPa·s. In the case of ink jet coating, the solids content is particularly preferably set to 1 to 5 wt %, thereby setting the solution viscosity to 3 to 15 mPa·s.

The temperature for the preparation of the liquid crystal aligning agent of the present invention is preferably 0 to 200° C., more preferably 10 to 60° C.

<Method of Forming a Liquid Crystal Alignment Film>

The liquid crystal aligning agent of the present invention can be advantageously used to form a liquid crystal alignment film by an optical aligning method.

As a method of forming a liquid crystal alignment film, a liquid crystal alignment coating film of the present invention is formed on a substrate and provided with liquid crystal alignability by the optical aligning method.

The liquid crystal aligning agent of the present invention is first applied to the transparent conductive film formed side of a substrate having a patterned transparent conductive film by a suitable coating technique such as roll coating, spinner coating, printing or ink jet coating. The coated surface is prebaked and then post-baked to form a coating film. The prebaking is carried out, for example, at a temperature of 40 to 120° C. for 0.1 to 5 minutes, and the post-baking is carried out at preferably 120 to 300° C., more preferably 150 to 250° C. for preferably 5 to 200 minutes, more preferably 10 to 100 minutes. The thickness of the coating film after post-baking is preferably 0.001 to 1 µm, more preferably 0.005 to 0.5 µm.

The above substrate is a transparent substrate made of glass such as float glass or soda glass, or plastic such as polyethylene terephthalate, polybutylene terephthalate, polyether sulfone or polycarbonate.

As the transparent conductive film may be used a NESA film made of $SnO_2$ or an ITO film made of $In_2O_3$—$SnO_2$. Photoetching or a technique using a mask when the transparent conductive film is to be formed may be employed for the patterning of the transparent conductive film.

Before the application of the liquid crystal aligning agent, a functional silane compound or a titanate may be applied to the substrate and the transparent conductive film to further improve adhesion between the substrate/transparent conductive film and the coating film.

Thereafter, linearly polarized or partially polarized radiation, or non-polarized radiation is applied to the coating film to provide liquid crystal alignability. Ultraviolet radiation and visible radiation including light having a wavelength of 150 to 800 nm may be used as the radiation but ultraviolet radiation including light having a wavelength of 300 to 400 nm is preferred. When the used radiation is linearly polarized or partially polarized, the radiation may be applied in a direction perpendicular to the surface of the substrate, an oblique direction to provide a pretilt angle, or both directions. When non-polarized radiation is applied, the application direction must be an oblique direction.

As the light source may be used a low-pressure mercury lamp, high-pressure mercury lamp, deuterium lamp, metal halide lamp, argon resonance lamp, xenon lamp or excimer laser. Ultraviolet radiation having the above preferred wavelength range can be obtained by means using a filter, a diffraction grating and one of the above light sources.

The dose of the radiation is preferably 1 $J/m^2$ or more and less than 10,000 $J/m^2$, more preferably 10 to 3,000 $J/m^2$. To provide liquid crystal alignability to a coating film formed from a conventionally known liquid crystal aligning agent by the optical aligning method, a dose of 10,000 $J/m^2$ or more is required. However, when the liquid crystal aligning agent of the present invention is used, if the dose of radiation in the optical aligning method is 3,000 $J/m^2$ or less, even 1,000 $J/m^2$ or less, excellent liquid crystal alignability can be provided, thereby making it possible to cut the production cost of a liquid crystal display device.

The term "pretilt angle" as used herein means the inclination angle of a liquid crystal molecule from a direction parallel to the surface of the substrate.

<Method of Manufacturing a Liquid Crystal Display Device>

A liquid crystal display device formed by using the liquid crystal aligning agent of the present invention can be manufactured as follows, for example.

Two substrates having this liquid crystal alignment film formed as described above are prepared and liquid crystals are interposed between the two substrates to fabricate a liquid crystal cell. To fabricate the liquid crystal cell, the following two processes may be employed.

The first process is a conventionally known process. First, two substrate are opposed to each other through a cell gap in such a manner that the liquid crystal alignment films of these substrates are opposed to each other, a sealing agent is used to join together the peripheral portions of the two substrates, liquid crystals are injected into the cell gap defined by the surfaces of the substrates and the sealing agent to fill the gap, and an injection hole is closed up to fabricate the liquid crystal cell.

The second process is called "ODF (One Drop Fill) process". An ultraviolet curable sealing agent is applied to a predetermined position of one of the two substrates having a liquid crystal alignment film, liquid crystals are dropped on the surface of the liquid crystal alignment film, the other substrate is joined to the above substrate in such a manner that the liquid crystal alignment films of these substrates are opposed to each other, and ultraviolet radiation is applied to the entire surfaces of the substrates to cure the sealing agent so as to fabricate a liquid crystal cell.

In all of the above processes, after the liquid crystal cell is heated until the liquid crystals used take an isotropic phase, it is desired that flow alignment at the time of injection should be removed by gradually cooling the liquid crystal cell to room temperature.

Then, the liquid crystal display device of the present invention can be obtained by joining a polarizing plate to the outer surfaces of the liquid crystal cell. When the liquid crystal alignment film has horizontal alignability, a liquid crystal display device having a TN or STN liquid crystal cell can be obtained by adjusting the angle between the polarization directions of linearly polarized radiations applied to the two substrates having the liquid crystal alignment film thereon and the angles between the substrates and the polarizing plates. When the liquid crystal alignment film has homeotropic alignability, a cell is constructed such that the directions of the alignment easy axis of the two substrates having the liquid crystal alignment film thereon become parallel to each other, and a polarizing plate is put on the both sides of the cell in such a manner that its polarizing direction and the easy axis form an angle of 45° to manufacture a liquid crystal display device having a homeotropic alignment type liquid crystal cell.

As the above sealing agent may be used epoxy resin containing aluminum oxide spheres as a spacer and a curing agent.

As the above liquid crystals may be used nematic liquid crystals or smectic liquid crystals. In the case of a TN liquid crystal cell and a STN liquid crystal cell, liquid crystals having positive dielectric anisotropy for forming nematic liquid crystals are preferred, as exemplified by biphenyl-based liquid crystals, phenylcyclohexane-based liquid crystals, ester-based liquid crystals, terphenyl-based liquid crystals, biphenylcyclohexane-based liquid crystals, pyrimidine-based liquid crystals, dioxane-based liquid crystals, bicyclooctane-based liquid crystals and cubane-based liquid crystals. Cholesteric liquid crystals such as cholesteryl chloride, cholesteryl nonaate or cholesteryl carbonate; a chiral agent marketed under the trade name of C-15 or CB-15 (of Merck & Co., Inc.); and ferroelectric liquid crystals such as p-decyloxybenzilidene-p-amino-2-methylbutyl cinnamate may be further added to the above liquid crystals. In the case of a homeotropic alignment type liquid crystal cell, liquid crystals having negative dielectric anisotropy for forming nematic liquid crystals are preferred, as exemplified by dicyanobenzene-based liquid crystals, pyridazine-based liquid crystals, Schiff base-based liquid crystals, azoxy-based liquid crystals, biphenyl-based liquid crystals and phenylcyclohexane-based liquid crystals.

The polarizing plate used on the outer sides of the liquid crystal cell may be a polarizing plate produced by sandwiching a polarizing film called "H film" which is prepared by stretching and aligning polyvinyl alcohol while allowing it to absorb iodine between cellulose acetate protective films, or a polarizing plate composed of the H film itself.

The liquid crystal display device of the present invention manufactured as described above has excellent characteristic properties such as display properties and reliability.

EXAMPLES

The following examples are provided for the purpose of further illustrating the present invention but are in no way to be taken as limiting.

The weight average molecular weight in the following examples is a value in terms of polystyrene measured by gel permeation chromatography under the following conditions.

Column: TSKgelGRCXLII of Tosoh Corporation
Solvent: tetrahydrofuran
Temperature: 40° C.
Pressure: 68 kgf/cm$^2$ The epoxy equivalent was measured in accordance with the "hydrochloric acid-methyl ethyl ketone method" prescribed in JIS C2105.

The solution viscosity of the polymer solution is a value measured at 25° C. by using an E type viscometer.

In the following examples, amounts required in the examples were ensured by repeating the synthesis of raw material compounds and polymers on the following synthesis scales as required.

Synthesis of Polyorganosiloxane Having an Epoxy Group

Synthesis Example 1

100.0 g of 2-(3,4-epoxycyclohexyl)ethyl trimethoxysilane (ECETS), 500 g of methyl isobutyl ketone and 10.0 g of triethylamine were fed to a reactor equipped with a stirrer, a thermometer, a dropping funnel and a reflux cooling tube and mixed together at room temperature. Then, 100 g of deionized water was added dropwise to these from the dropping funnel over 30 minutes to carry out a reaction at 80° C. for 6 hours while they were mixed together under reflux. After the end of the reaction, an organic layer was extracted and washed with a 0.2 wt % ammonium nitrate aqueous solution until water after washing became neutral, and the solvent and water were distilled off under reduced pressure to obtain a polyorganosiloxane having an epoxy group as a viscous transparent liquid.

When $^1$H-NMR analysis was made on this polyorganosiloxane having an epoxy group, a peak having theoretical intensity based on the epoxy group was obtained at a chemical shift (δ) around 3.2 ppm. Therefore, it was confirmed that a side reaction of the epoxy group did not occur during the reaction.

The viscosity, Mw and epoxy equivalent of this polyorganosiloxane having an epoxy group are shown in Table 1.

Synthesis Examples 2 and 3

Polyorganosiloxanes having an epoxy group were obtained as viscous transparent liquids in the same manner as in Synthesis Example 1 except that the raw materials were changed as shown in Table 1.

In Table 1, the symbols of the raw silane compounds denote the following compounds.
ECETS: 2-(3,4-epoxycyclohexyl)ethyl trimethoxysilane
MTMS: methyltrimethoxysilane
PTMS: phenyltrimethoxysilane

TABLE 1

| | Raw silane compound (g) | | | | Epoxy equivalent |
|---|---|---|---|---|---|
| | ECETS | MTMS | PTMS | Mw | (g/mole) |
| Synthetic Example 1 | 100 | 0 | 0 | 2,200 | 186 |
| Synthetic Example 2 | 80 | 20 | 0 | 2,500 | 210 |
| Synthetic Example 3 | 80 | 0 | 20 | 2,000 | 228 |

Synthesis of Cinnamic Acid Derivative

Synthesis Example 4

A cinnamic acid derivative (2-4-1) was synthesized based on the following scheme 1.

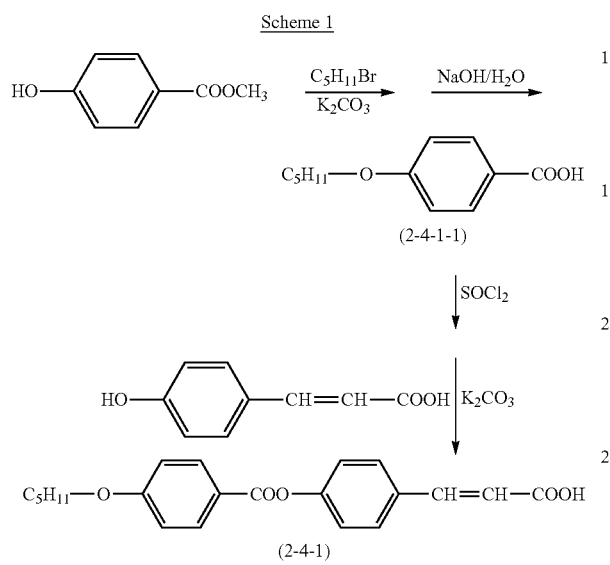

After 91.3 g of methyl 4-hydroxybenzoate, 182.4 g of potassium carbonate and 320 mL of N-methyl-2-pyrrolidone were fed to a 1-liter eggplant flask and stirred at room temperature for 1 hour, 99.7 g of 1-bromopentane was added to these and stirred at 100° C. for 5 hours. After the end of a reaction, re-precipitation was carried out with water. Then, 48 g of sodium hydroxide and 400 mL of water were added to this precipitate and refluxed for 3 hours to carry out a hydrolytic reaction. After the end of the reaction, the reaction solution was neutralized with hydrochloric acid, and the formed precipitate was recrystallized with ethanol to obtain 102 g of a white crystal of a compound (2-4-1-1).

10.41 g of this compound (2-4-1-1) was put into a reactor, and 100 mL of thionyl chloride and 77 µL of N,N-dimethylformamide were added to this compound and stirred at 80° C. for 1 hour. Then, thionyl chloride was distilled off under reduced pressure, methylene chloride was added to the obtained product which was then washed with a sodium hydrogen carbonate aqueous solution, dried with magnesium sulfate and concentrated, and tetrahydrofuran was added to prepare a solution.

Thereafter, 7.39 g of 4-hydroxycinnamic acid, 13.82 g of potassium carbonate, 0.48 g of tetrabutyl ammonium, 50 mL of tetrahydrofuran and 100 mL of water were fed to a 500 mL three-necked flask different from the above flask. This aqueous solution was cooled with ice, and the above tetrahydrofuran solution was added dropwise slowly to this aqueous solution and stirred for another 2 hours. After the end of the reaction, hydrochloric acid was added to neutralize the reaction solution, extraction was carried out with ethyl acetate, the extract was dried with magnesium sulfate, concentrated and recrystallized with ethanol to obtain 9.0 g of a white crystal of the cinnamic acid derivative (2-4-1).

Synthesis Example 5

9.2 g of a white crystal of a cinnamic acid derivative represented by the following formula (2-4-2) was obtained in the same manner as in the above Synthesis Example 4 except that 110.9 g of 1-iodo-4,4,4-trifluorobutane was used in place of 1-bromopentane.

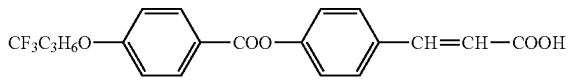

(2-4-2)

Synthesis of Radiation Sensitive Polyorganosiloxane

Example 1

5.0 g of the polyorganosiloxane having an epoxy group obtained in the above Synthesis Example 1, 46.4 g of methyl isobutyl ketone, 4.76 of the cinnamic acid derivative represented by the above formula (2-4-1) obtained in the above Synthesis Example 4 and 0.10 g of UCAT 18X (trade name, quaternary amine salt manufactured by San-Apro Ltd.) were fed to a 200 mL three-necked flask and stirred at 80° C. for 12 hours. After the end of a reaction, re-precipitation was carried out with methanol, the precipitate was dissolved in ethyl acetate to obtain a solution which was then washed with water 3 times, and the solvent was distilled off to obtain 2.8 g of a white powder of a radiation sensitive polyorganosiloxane S-1. The weight average molecular weight Mw of the radiation sensitive polyorganosiloxane S-1 was 10,100.

Example 2

3.0 g of a white powder of a radiation sensitive polyorganosiloxane S-2 was obtained in the same manner as in the above Example 1 except that 0.10 g of triisopropylamine was used in place of UCAT 18X and the stirring time was changed to 24 hours. The weight average molecular weight Mw of the radiation sensitive polyorganosiloxane S-2 was 15,200.

Example 3

2.7 g of a white powder of a radiation sensitive polyorganosiloxane S-3 was obtained in the same manner as in the above Example 1 except that 0.10 g of tetrabutylammonium bromide was used in place of UCAT 18X and the stirring time was changed to 8 hours. The weight average molecular weight Mw of the radiation sensitive polyorganosiloxane S-3 was 9,500.

Example 4

2.7 g of a white powder of a radiation sensitive polyorganosiloxane S-4 was obtained in the same manner as in the above Example 3 except that 5.30 g of the cinnamic acid derivative represented by the formula (2-4-2) obtained in the above Synthesis Example 5 was used in place of the cinnamic acid derivative represented by the formula (2-4-1). The weight average molecular weight Mw of the radiation sensitive polyorganosiloxane S-4 was 9,900.

Example 5

7.6 g of a white powder of a radiation sensitive polyorganosiloxane S-5 was obtained in the same manner as in the above Example 4 except that the amount of the cinnamic acid derivative represented by the formula (2-4-2) was changed to 9.54 g and the stirring time was changed to 24 hours. The weight average molecular weight Mw of the radiation sensitive polyorganosiloxane S-5 was 9,900.

Synthesis of Polyamic Acid

Synthesis Example 6

19.61 g (0.1 mole) of cyclobutanetetracarboxylic dianhydride and 21.23 g (0.1 mole) of 4,4'-diamino-2,2'-dimethylbiphenyl were dissolved in 367.6 g of N-methyl-2-pyrrolidone to carry out a reaction at room temperature for 6 hours. Thereafter, the reaction mixture was injected into an excessive amount of methanol to precipitate the reaction product. The precipitate was washed with methanol and dried at 40° C. under reduced pressure for 15 hours to obtain 35 g of a polyamic acid (PA-1).

Synthesis Example 7

22.4 g (0.1 mole) of 2,3,5-tricarboxycyclopentylacetic dianhydride and 14.23 g (0.1 mole) of cyclohexanebis(methylamine) were dissolved in 329.3 g of N-methyl-2-pyrrolidone to carry out a reaction at 60° C. for 6 hours. Thereafter, the reaction mixture was injected into an excessive amount of methanol to precipitate the reaction product. The precipitate was washed with methanol and dried at 40° C. under reduced pressure for 15 hours to obtain 32 g of a polyamic acid (PA-2).

Synthesis of Polyimide

Synthesis Example 8

17.5 g of PA-2 obtained in the above Synthesis Example 7 was collected, 232.5 g of N-methyl-2-pyrrolidone, 3.8 g of pyridine and 4.9 g of acetic anhydride were added to PA-2 to carryout a reaction at 120° C. for 4 hours to imidize PA-2. Then, the reaction mixture was injected into an excessive amount of methanol to precipitate a reaction product. The precipitate was washed with methanol and dried under reduced pressure for 15 hours to obtain 15 g of a polyimide PI-1.

Synthesis of Another Polyorganosiloxane

Synthesis Example 9

20.8 g of tetraethoxysilane and 28.2 g of 1-ethoxy-2-propanol were fed to a 200 mL three-necked flask equipped with a cooling tube, heated at 60° C. and stirred. A maleic anhydride aqueous solution prepared in a different 20 mL flask by dissolving 0.26 g of maleic anhydride in 10.8 g of water was added to the resulting mixture and heated at 60° C. and stirred for another 4 hours to carryout a reaction. The solvent was distilled off from the obtained reaction mixture, and 1-ethoxy-2-propanol was added to concentrate the reaction mixture again so as to obtain a polymer solution containing 10 wt % of a polyorganosiloxane PS-1. The weight average molecular weight Mw of PS-1 was 5,100.

Preparation of Liquid Crystal Aligning Agent

Example 6

100 parts by weight of the radiation sensitive polyorganosiloxane S-1 obtained in the above Example 1 and 1,000 parts by weight of the polyamic acid PA-1 obtained in the above Synthesis Example 6 as the another polymer were used in combination, and N-methyl-2-pyrrolidone and butyl cellosolve were added to these to prepare a solution having a solvent composition of N-methyl-2-pyrrolidone:butyl cellosolve=50:50 (weight ratio) and a solids content of 3.0 wt %.

This solution was filtered with a filter having an opening diameter of 1 µm to prepare a liquid crystal aligning agent A-1.

This liquid crystal aligning agent A-1 was stored at −15° C. for 6 months. The viscosity of the liquid crystal aligning agent A-1 was measured at 25° C. before and after storage with an E type viscometer. The storage stability was evaluated as "acceptable" when the change rate of the solution viscosity before and after storage was less than 10% and as "unacceptable" when the change rate was 10% or more. The storage stability of the liquid crystal aligning agent A-1 was "acceptable".

Examples 7 to 16

Liquid crystal aligning agents A-2 to A-11 were prepared in the same manner as in Example 6 except that the type of the radiation sensitive polyorganosiloxane and the type and amount of the another polymer were changed as shown in Table 2.

The storage stabilities of these liquid crystal aligning agents were evaluated in the same manner as in Example 6. The evaluation results are shown in Table 2.

Example 17

2,000 parts by weight in terms of PS-1 of the solution containing another polyorganosiloxane PS-1 obtained in the above Synthesis Example 9 as the another polymer was collected, 100 parts by weight of the radiation sensitive polyorganosiloxane S-5 obtained in the above Example 5 was added to this solution, and 1-ethoxy-2-propanol was further added to the resulting mixture so as to prepare a solution having a solids content of 4.0 wt %.

This solution was filtered with a filter having an opening diameter of 1 µm to prepare a liquid crystal aligning agent A-12.

The storage stability of this liquid crystal aligning agent was evaluated in the same manner as in the above Example 6. The evaluation results are shown in Table 2.

TABLE 2

| | Liquid crystal aligning agent (name) | Radiation sensitive polyorganosiloxane (name) | Another polymer | | Storage stability |
|---|---|---|---|---|---|
| | | | Type | Amount (parts by weight) | |
| Ex. 6 | A-1 | S-1 | PA-1 | 1,000 | Acceptable |
| Ex. 7 | A-2 | S-1 | PA-1 | 500 | Acceptable |
| Ex. 8 | A-3 | S-1 | PA-2 | 500 | Acceptable |
| Ex. 9 | A-4 | S-1 | PI-1 | 500 | Acceptable |
| Ex. 10 | A-5 | S-2 | PA-2 | 500 | Acceptable |
| Ex. 11 | A-6 | S-3 | PA-2 | 500 | Acceptable |
| Ex. 12 | A-7 | S-4 | PA-1 | 2,000 | Acceptable |
| Ex. 13 | A-8 | S-4 | PA-1 | 1,000 | Acceptable |
| Ex. 14 | A-9 | S-4 | PA-1 | 500 | Acceptable |
| Ex. 15 | A-10 | S-4 | PA-2 | 500 | Acceptable |
| Ex. 16 | A-11 | S-5 | PA-2 | 500 | Acceptable |
| Ex. 17 | A-12 | S-5 | PS-1 | 500 | Acceptable |

Ex.: Example

Example 18

Formation of Liquid Crystal Alignment Film and Manufacture of Liquid Crystal Display Device The liquid crystal aligning agent S-1 prepared in the above Example 6 was applied to the transparent electrode side of a glass substrate having a transparent electrode which was composed of an ITO film with a spinner, prebaked on a hot plate at 80° C. for 1 minute and heated in an oven whose inside had been substituted by nitrogen at 200° C. for 1 hour to form a coating film having a thickness of 0.1 μm. 1,000 J/m² of polarized ultraviolet radiation including a 313 nm bright line was applied to the surface of this coating film by using an Hg—Xe lamp and a Glan-Taylor prism from a direction 40° inclined from the normal of the substrate to form a liquid crystal alignment film. This operation was repeated to prepare a pair of (two) substrates having this liquid crystal alignment film thereon.

An epoxy resin adhesive containing aluminum oxide spheres having a diameter of 5.5 μm was applied to the periphery of the liquid crystal alignment film side of one of the above substrates by screen printing, the liquid crystal alignment film sides of the pair of substrates were opposed to each other and contact bonded together in such a manner that the projection directions on the substrate surfaces of the optical axis of ultraviolet radiation of the substrates became antiparallel to each other, and the adhesive was thermally cured at 150° C. for 1 hour. After negative type liquid crystals (MLC-6608 of Merck & Co., Inc.) were filled into the space between the substrates from a liquid crystal injection port, the liquid crystal injection port was sealed with an epoxy-based adhesive. Further, the resulting assembly was heated at 150° C. and then gradually cooled to room temperature to remove flow alignment at the time of injecting liquid crystals. Then, a polarizing plate was put on the exterior sides of the substrates in such a manner that the polarizing directions of the two polarizing plates became orthogonal to each other and formed an angle of 45° from the projection directions on the substrate surfaces of the optical axis of ultraviolet radiation of the liquid crystal alignment films to manufacture a homeotropic alignment type liquid crystal display device.

This liquid crystal display device was evaluated by the following methods. The evaluation results are shown in Table 3.

[Evaluation Method of Liquid Crystal Display Device]

(1) Evaluation of Liquid Crystal Alignability

The existence of an abnormal domain formed by a change in brightness when the liquid crystal display device manufactured above was turned on and off by applying and not applying a voltage of 5 V (application and cancellation of voltage) was checked through an optical microscope. Liquid crystal alignability was evaluated as "acceptable" when there was no abnormal domain.

(2) Evaluation of Pretilt Angle

The pretilt angle of the liquid crystal display device manufactured above was measured by a crystal rotation method using a He—Ne laser beam in accordance with the method described in T. J. Scheffer et. al. J. Appl. Phys. Vol. 19, p. 2013 (1980).

(3) Evaluation of Voltage Holding Ratio

After a voltage of 5V was applied to the liquid crystal display device manufactured above for an application time of 60 μs and a span of 167 ms, the voltage holding ratio was measured 167 ms after the cancellation of voltage application. The VHR-1 of Toyo Corporation was used to measure the voltage holding ratio.

(4) Evaluation of Burn-in

After a 30 Hz, 3 V rectangular wave on which DC 5V had been superimposed was applied to the liquid crystal display device manufactured above in a 60° C. environment for 2 hours, the residual DC voltage in the liquid crystal cell right after the DC voltage was cut off was obtained by a flicker erasing method.

Examples 19 to 33

Liquid crystal alignment films were formed and liquid crystal display devices were manufactured and evaluated in the same manner as in Example 18 except that the type of the liquid crystal aligning agent used and the dose of polarized radiation for forming the liquid crystal alignment films were changed as shown in Table 3.

Comparative Example 1

Synthesis of Polyamic Acid 22.4 g (0.1 mole) of 2,3,5-tricarboxycyclopentylacetic dianhydride and 48.46 g (0.1 mole) of a compound represented by the following formula (d-1) synthesized in accordance with JP-A 2003-520878 were dissolved in 283.4 g of N-methyl-2-pyrrolidone to carry out a reaction at room temperature for 6 hours.

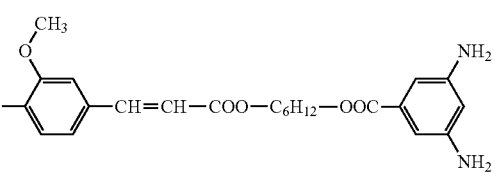

(d-1)

Then, the reaction mixture was injected into an excessive amount of methanol to precipitate a reaction product. The obtained precipitate was washed with methanol and dried at 40° C. under reduced pressure for 15 hours to obtain 67 g of a polyamic acid.

<Preparation of Liquid Crystal Aligning Agent>

The polyamic acid synthesized above was dissolved in a mixed solvent of 1-methyl-2-pyrrolidone and butyl cellosolve (weight ratio of 50:50) to prepare a solution having a solid content of 3.0 wt %. This solution was filtered with a filter having an opening diameter of 1 μm to prepare a liquid crystal aligning agent R-1.

<Formation of Liquid Crystal Alignment Film and Manufacture and Evaluation of Liquid Crystal Display Device>

A liquid crystal alignment film was formed, and a liquid crystal display device was manufactured and evaluated in the same manner as in the above Example 18 except that the liquid crystal aligning agent R-1 prepared above was used. The results are shown in Table 3.

TABLE 3

| Ex. | Liquid crystal aligning agent (name) | Dose of ultraviolet radiation (J/m²) | Alignability | Pretilt angle | Voltage holding ratio (%) | Burn-in (residual DC voltage) (mV) |
|---|---|---|---|---|---|---|
| Ex. 18 | A-1 | 1,000 | Acceptable | 89° | 98 | 5 |
| Ex. 19 | A-2 | 1,000 | Acceptable | 89° | 98 | 5 |
| Ex. 20 | A-3 | 200 | Acceptable | 89° | 98 | 7 |
| Ex. 21 | A-3 | 1,000 | Acceptable | 89° | 98 | 6 |
| Ex. 22 | A-3 | 3,000 | Acceptable | 89° | 98 | 6 |
| Ex. 23 | A-4 | 1,000 | Acceptable | 89° | 98 | 8 |
| Ex. 24 | A-5 | 1,000 | Acceptable | 89° | 98 | 6 |
| Ex. 25 | A-6 | 1,000 | Acceptable | 89° | 98 | 6 |
| Ex. 26 | A-7 | 1,000 | Acceptable | 89° | 99 | 6 |
| Ex. 27 | A-8 | 1,000 | Acceptable | 89° | 99 | 5 |
| Ex. 28 | A-9 | 200 | Acceptable | 89° | 99 | 6 |
| Ex. 29 | A-9 | 1,000 | Acceptable | 89° | 99 | 5 |
| Ex. 30 | A-9 | 3,000 | Acceptable | 89° | 99 | 5 |
| Ex. 31 | A-10 | 1,000 | Acceptable | 89° | 99 | 5 |
| Ex. 32 | A-11 | 1,000 | Acceptable | 89° | 99 | 5 |
| Ex. 33 | A-12 | 200 | Acceptable | 89° | 99 | 7 |
| C. Ex. 1 | R-1 | 3,000 | Acceptable | 89° | 97 | 150 |

Ex.: Example
C. Ex.: Comparative Example

Synthesis of Radiation Sensitive Polyorganosiloxane

Example 34

5.0 g of the polyorganosiloxane having an epoxy group obtained in the above Synthesis Example 1, 46.4 g of methyl isobutyl ketone, 3.18 g of the cinnamic acid derivative represented by the formula (2-4-2) obtained in the above Synthesis Example 5 as the cinnamic acid derivative and 0.10 g of tetrabutylammonium bromide were fed to a 200 mL three-necked flask and stirred at 80° C. for 8 hours. After the end of a reaction, re-precipitation was carried out with methanol, the precipitate was dissolved in ethyl acetate to obtain a solution which was then washed with water 3 times, and the solvent was distilled off to obtain a radiation sensitive polyorganosiloxane S-6 as a white powder. The weight average molecular weight Mw of the radiation sensitive polyorganosiloxane S-6 was 11,500.

Examples 35 to 45

Radiation sensitive polyorganosiloxanes S-7 to S-17 were obtained in the same manner as in Example 34 except that the amount of the cinnamic acid derivative represented by the formula (2-4-2) and the type and amount of the another pretilt angle generating compound were changed as shown in Table 4. The weight average molecular weights Mw of these radiation sensitive polyorganosiloxanes are shown in Table 4.

In Table 4, the pretilt angle generating compounds "(5-3-1)", "(5-3-2)" and "(5-3-3)" are compounds represented by the above formulas (5-3-1), (5-3-2) and (5-3-3), respectively.

TABLE 4

| | Radiation sensitive polyorganosiloxane (name) | Amount of cinnamic acid derivative (2-4-2) (g) | Another pretilt angle generating compound | | Mw |
|---|---|---|---|---|---|
| | | | Type | Amount (g) | |
| Ex. 34 | S-6 | 3.18 | Octyloxybenzoic acid | 1.35 | 11,500 |
| Ex. 35 | S-7 | 5.30 | Octyloxybenzoic acid | 1.35 | 12,000 |
| Ex. 36 | S-8 | 3.18 | (5-3-1) | 1.11 | 11,800 |
| Ex. 37 | S-9 | 5.30 | (5-3-1) | 1.11 | 12,300 |
| Ex. 38 | S-10 | 3.18 | (5-3-2) | 1.33 | 12,500 |
| Ex. 39 | S-11 | 5.30 | (5-3-2) | 1.33 | 13,000 |
| Ex. 40 | S-12 | 3.18 | (5-3-3) | 1.6 | 12,600 |
| Ex. 41 | S-13 | 5.30 | (5-3-3) | 1.6 | 13,000 |
| Ex. 42 | S-14 | 3.18 | Dodecanoic acid | 1.08 | 11,000 |
| Ex. 43 | S-15 | 5.30 | Dodecanoic acid | 1.08 | 11,200 |
| Ex. 44 | S-16 | 3.18 | Stearic acid | 1.53 | 12,100 |
| Ex. 45 | S-17 | 5.30 | Stearic acid | 1.53 | 12,400 |

Ex.: Example

Synthesis of Polyamic Acid

Synthesis Example 10

98 g (0.50 mole) of 1,2,3,4-cyclobutanetetracarboxylic dianhydride and 109 g (0.50 mole) of pyromellitic dianhydride as tetracarboxylic dianhydrides and 198 g (1.0 mole) of 4,4'-diaminodiphenylmethane as a diamine were dissolved in 2,290 g of N-methyl-2-pyrrolidone to carry out a reaction at 40° C. for 3 hours, and then 1,350 g of N-methyl-2-pyrrolidone was added to obtain a polymer solution containing 10 wt % of a polyamic acid PA-3. The solution viscosity of this polyamic acid solution was 135 mPa·s.

Synthesis Example 11

196 g (1.0 molar equivalent) of 1,2,3,4-cyclobutanetetracarboxylic dianhydride as a tetracarboxylic dianhydride and 200 g (1.0 molar equivalent) of 4,4'-diaminodiphenyl ether as diamine compounds were dissolved in 2,246 g of N-methyl-2-pyrrolidone to carry out a reaction at 40° C. for 4 hours, and 1,321 g of N-methyl-2-pyrrolidone was added to obtain a solution containing 10 wt % of a polyamic acid (PA-4). The solution viscosity of this polyamic acid solution was 220 mPa·s.

Synthesis Example 12

196 g (1.0 molar equivalent) of 1,2,3,4-cyclobutanetetracarboxylic dianhydride as a tetracarboxylic dianhydride and 212 g (1.0 molar equivalent) of 2,2'-dimethyl-4,4'-diaminobiphenyl as diamine compounds were dissolved in 3,670 g of N-methyl-2-pyrrolidone to carry out a reaction at 40° C. for 3 hours so as to obtain a solution containing 10 wt % of a polyamic acid (PA-5). The solution viscosity of this polyamic acid solution was 170 mPa·s.

Synthesis Example 13

224 g (1.0 molar equivalent) of 2,3,5-tricarboxycyclopentylacetic dianhydride as a tetracarboxylic dianhydride and 200 g (1.0 molar equivalent) of 4,4'-diaminodiphenyl ether as diamine compounds were dissolved in 2,404 g of N-methyl-2-pyrrolidone to carry out a reaction at 40° C. for 4 hours so as to obtain a solution containing a polyamic acid (PA-6). The solution viscosity of a solution containing 10 wt % of a polymer prepared by dispensing a small amount of this polyamic acid solution and adding N-methyl-2-pyrrolidone to this solution was 190 mPa·s.

Synthesis of Polyimide

Synthesis Example 14

112 g (0.50 mole) of 2,3,5-tricarboxycyclopentylacetic dianhydride and 157 g (0.50 mole) of 1,3,3a,4,5,9b-hexahydro-8-methyl-5-(tetrahydro-2,5-dioxo-3-furanyl)-naphtho[1,2-c]-furan-1,3-dione as tetracarboxylic dianhydrides and 95 g (0.88 mole) of p-phenylenediamine, 32 g (0.10 mole) of 2,2-ditrifluoromethyl-4,4-diaminobiphenyl, 6.4 g (0.010 mole) of 3,6-bis(4-aminobenzoyloxy)cholestane and 4.0 g (0.015 mole) of octadecanoxy-2,5-diaminobenzene as diamine compounds were dissolved in 960 g of N-methyl-2-pyrrolidone to carry out a reaction at 60° C. for 9 hours. The solution viscosity of a solution containing 10 wt % of a polymer prepared by dispensing a small amount of the obtained polyamic acid solution and adding N-methyl-2-pyrrolidone to this solution was 58 mPa·s.

2,740 g of N-methyl-2-pyrrolidone, 396 g of pyridine and 409 g of acetic anhydride were added to the obtained polyamic acid solution to carry out a dehydration ring-closure reaction at 110° C. for 4 hours. After the end of the dehydration ring-closure reaction, the solvent in the system was substituted by new N-methyl-2-pyrrolidone (pyridine and acetic anhydride used in the dehydration ring-closure reaction were removed to the outside of the system by this operation) to obtain a solution containing 15 wt % of a polyimide (PI-2) having an imidization rate of about 95%.

The solution viscosity of this polyimide solution was 33 mPa·s.

Synthesis Example 15

112 g (0.50 mole) of 2,3,5-tricarboxycyclopentylacetic dianhydride and 157 g (0.50 mole) of 1,3,3a,4,5,9b-hexahydro-8-methyl-5-(tetrahydro-2,5-dioxo-3-furanyl)-naphtho[1,2-c]-furan-1,3-dione as tetracarboxylic dianhydrides, 96 g (0.89 mole) of p-phenylenediamine, 25 g (0.10 mole) of bisaminopropyltetramethyldisiloxane and 13 g (0.020 mole) of 3,6-bis(4-aminobenzoyloxy)cholestane as diamine compounds, and 8.1 g (0.030 mole) of N-octadecylamine as a monoamine were dissolved in 960 g of N-methyl-2-pyrrolidone to carry out a reaction at 60° C. for 6 hours. The solution viscosity of a solution containing 10 wt % of a polymer prepared by dispensing a small amount of the obtained polyamic acid solution and adding N-methyl-2-pyrrolidone to this solution was 60 mPa·s.

Then, 2,700 g of N-methyl-2-pyrrolidone was added to the obtained polyamic acid solution, and 396 g of pyridine and 409 g of acetic anhydride were added to carry out a dehydration ring-closure reaction at 110° C. for 4 hours. After the end of the dehydration ring-closure reaction, the solvent in the system was substituted by new N-methyl-2-pyrrolidone (pyridine and acetic anhydride used in the dehydration ring-closure reaction were removed to the outside of the system by this operation) to obtain a solution containing 15 wt % of a polyimide (PI-3) having an imidization rate of about 95%.

The solution viscosity of a solution containing 6.0 wt % of a polymer prepared by dispensing a small amount of the obtained polyimide solution and adding N-methyl-2-pyrrolidone to this solution was 18 mPa·s.

Synthesis Example 16

224 g (1.0 mole) of 2,3,5-tricarboxycyclopentylacetic dianhydride as a tetracarboxylic dianhydride and 107 g (0.99 mole) of p-phenylenediamine and 6.43 g (0.010 mole) of 3,6-bis(4-aminobenzoyloxy)cholestane as diamine compounds were dissolved in 3,039 g of N-methyl-2-pyrrolidone to carry out a reaction at 60° C. for 6 hours so as to obtain a polyamic acid solution having a viscosity of about 260 mPa·s.

2,700 g of N-methyl-2-pyrrolidone was added to the obtained polyamic acid solution, and 396 g of pyridine and 306 g of acetic anhydride were added to carry out a dehydration ring-closure reaction at 110° C. for 4 hours. After the end of the dehydration ring-closure reaction, the solvent in the system was substituted by new N-methyl-2-pyrrolidone (pyridine and acetic anhydride used in the dehydration ring-closure reaction were removed to the outside of the system by this operation) to obtain a solution containing 9.0 wt % of a polyimide (PI-4) having an imidization rate of about 89%.

The solution viscosity of a solution containing 5.0 wt % of a polymer prepared by dispensing a small amount of the obtained polyimide solution and adding N-methyl-2-pyrrolidone to this solution was 74 mPa·s.

Synthesis Example 17

112 g (0.50 mole) of 2,3,5-tricarboxycyclopentylacetic dianhydride and 157 g (0.50 mole) of 1,3,3a,4,5,9b-hexahydro-8-methyl-5-(tetrahydro-2,5-dioxo-3-furanyl)-naphtho[1,2-c]-furan-1,3-dione as tetracarboxylic dianhydrides and 89 g (0.82 mole) of p-phenylenediamine, 32 g (0.10 mole) of 2,2'-ditrifluoromethyl-4,4'-diaminobiphenyl, 25 g (0.059 mole) of 1-(3,5-diaminobenzoyloxy)-4-(4-trifluoromethylbenzoyloxy)-cyclohexane and 4.0 g (0.011 mole) of octadecanoxy-2,5-diaminobenzene as diamine compounds were dissolved in 2,175 g of N-methyl-2-pyrrolidone to carry out a reaction at 60° C. for 6 hours so as to obtain a solution containing a polyamic acid. The solution viscosity of a solution containing 10 wt % of a polymer prepared by dispensing a small amount of the obtained polyamic acid solution and adding N-methyl-2-pyrrolidone to this solution was 110 mPa·s.

3,000 g of N-methyl-2-pyrrolidone was added to 1,500 g of the obtained polyamic acid solution, and 221 g of pyridine and 228 g of acetic anhydride were added to carry out a dehydration ring-closure reaction at 110° C. for 4 hours. After the end of the dehydration ring-closure reaction, the solvent in the system was substituted by new N-methyl-2-pyrrolidone (pyridine and acetic anhydride used in the dehydration ring-closure reaction were removed to the outside of the system by this operation) to obtain a solution containing 10 wt % of polyimide (PI-5) having an imidization rate of about 92%.

The solution viscosity of a solution containing 4.5 wt % of a polymer prepared by dispensing a small amount of the obtained polyimide solution and adding N-methyl-2-pyrrolidone to this solution was 26 mPa·s.

Synthesis Example 18

19.9 g (0.089 mole) of 2,3,5-tricarboxycyclopentylacetic dianhydride as a tetracarboxylic dianhydride and 6.8 g (0.063 mole) of p-phenylenediamine, 3.6 g (0.018 mole) of 4,4'-diaminodiphenylmethane and 4.7 g (0.009 mole) of a compound represented by the following formula (D-6) as diamine compounds were dissolved in 140 g of N-methyl-2-pyrrolidone to carry out a reaction at 60° C. for 4 hours. The solution viscosity of a solution containing 10 wt. % of a polymer prepared by dispensing a small amount of the obtained polyamic acid solution and adding N-methyl-2-pyrrolidone to this solution was 115 mPa·s.

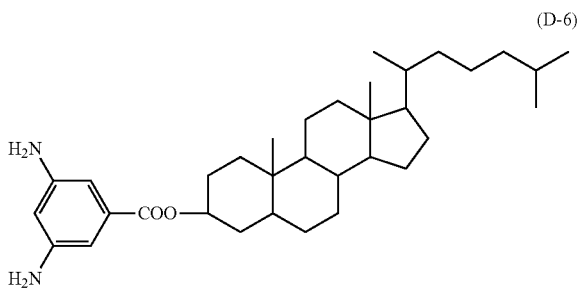
(D-6)

Then, 325 g of N-methyl-2-pyrrolidone was added to the obtained polyamic acid solution, and 14 g of pyridine and 18 g of acetic anhydride were added to carryout a dehydration ring-closure reaction at 110° C. for 4 hours. After the end of the dehydration ring-closure reaction, the solvent in the system was substituted by new N-methyl-2-pyrrolidone (pyridine and acetic anhydride used in the dehydration ring-closure reaction were removed to the outside of the system by this operation) to obtain a solution containing 15.4 wt % of a polyimide (PI-6) having an imidization rate of about 77%.

The solution viscosity of a solution containing 10 wt % of a polymer prepared by dispensing a small amount of the obtained polyimide solution and adding N-methyl-2-pyrrolidone to this solution was 84 mPa·s.

Synthesis Example 19

20.9 g (0.093 mole) of 2,3,5-tricarboxycyclopentylacetic dianhydride as a tetracarboxylic dianhydride and 9.2 g (0.085 mole) of p-phenylenediamine and 4.9 g (0.009 mole) of the compound represented by the above formula (D-6) as diamine compounds were dissolved in 140 g of N-methyl-2-pyrrolidone to carry out a reaction at 60° C. for 4 hours. The solution viscosity of a solution containing 10 wt % of a polymer prepared by dispensing a small amount of the obtained polyamic acid solution and adding N-methyl-2-pyrrolidone to this solution was 126 mPa·s.

Then, 325 g of N-methyl-2-pyrrolidone was added to the obtained polyamic acid solution, and 7.4 g of pyridine and 9.5 g of acetic anhydride were added to carry out a dehydration ring-closure reaction at 110° C. for 4 hours. After the end of the dehydration ring-closure reaction, the solvent in the system was substituted by new N-methyl-2-pyrrolidone (pyridine and acetic anhydride used in the dehydration ring-closure reaction were removed to the outside of the system by this operation) to obtain a solution containing 16.1 wt % of a polyimide (PI-7) having an imidization rate of about 54%.

The solution viscosity of a solution containing 10 wt % of a polymer prepared by dispensing a small amount of the obtained polyimide solution and adding N-methyl-2-pyrrolidone to this solution was 75 mPa·s.

Synthesis Example 20

18.8 g (0.084 mole) of 2,3,5-tricarboxycyclopentylacetic dianhydride as a tetracarboxylic dianhydride and 7.4 g (0.068 mole) of p-phenylenediamine and 8.9 g (0.017 mole) of the compound represented by the above formula (D-6) as diamine compounds were dissolved in 140 g of N-methyl-2-pyrrolidone to carry out a reaction at 60° C. for 4 hours. The solution viscosity of a solution containing 10 wt % of a polymer prepared by dispensing a small amount of the obtained polyamic acid solution and adding N-methyl-2-pyrrolidone to this solution was 126 mPa·s.

Then, 325 g of N-methyl-2-pyrrolidone was added to the obtained polyamic acid solution, and 6.6 g of pyridine and 8.5 g of acetic anhydride were added to carry out a dehydration ring-closure reaction at 110° C. for 4 hours. After the end of the dehydration ring-closure reaction, the solvent in the system was substituted by new N-methyl-2-pyrrolidone (pyridine and acetic anhydride used in the dehydration ring-closure reaction were removed to the outside of the system by this operation) to obtain a solution containing 15.9 wt % of a polyimide (PI-8) having an imidization rate of about 55%.

The solution viscosity of a solution containing 10 wt % of a polymer prepared by dispensing a small amount of the obtained polyimide solution and adding N-methyl-2-pyrrolidone to this solution was 75 mPa·s.

Synthesis Example 21

19.1 g (0.085 mole) of 2,3,5-tricarboxycyclopentylacetic dianhydride as a tetracarboxylic dianhydride and 7.4 g (0.069 mole) of p-phenylenediamine and 8.5 g (0.017 mole) of a compound represented by the following formula (D-7) as diamine compounds were dissolved in 140 g of N-methyl-2-pyrrolidone to carry out a reaction at 60° C. for 4 hours. The solution viscosity of a solution containing 10 wt % of a polymer prepared by dispensing a small amount of the obtained polyamic acid solution and adding N-methyl-2-pyrrolidone to this solution was 206 mPa·s.

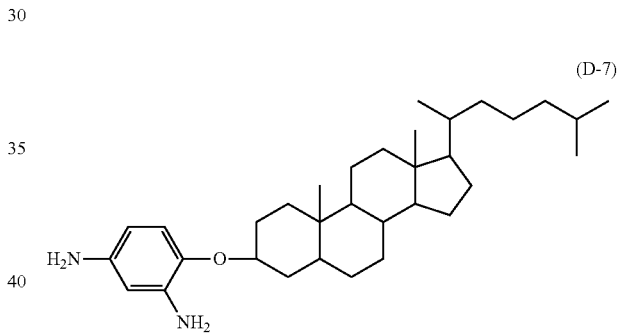
(D-7)

Then, 325 g of N-methyl-2-pyrrolidone was added to the obtained polyamic acid solution, and 6.7 g of pyridine and 8.7 g of acetic anhydride were added to carry out a dehydration ring-closure reaction at 110° C. for 4 hours. After the end of the dehydration ring-closure reaction, the solvent in the system was substituted by new N-methyl-2-pyrrolidone (pyridine and acetic anhydride used in the dehydration ring-closure reaction were removed to the outside of the system by this operation) to obtain a solution containing 15.8 wt % of a polyimide (PI-9) having an imidization rate of about 52%.

The solution viscosity of a solution containing 10 wt % of a polymer prepared by dispensing a small amount of the obtained polyimide solution and adding N-methyl-2-pyrrolidone to this solution was 105 mPa·s.

Synthesis Example 22

17.3 g (0.077 mole) of 2,3,5-tricarboxycyclopentylacetic dianhydride as a tetracarboxylic dianhydride and 5.9 g (0.054 mole) of p-phenylenediamine, 4.1 g (0.008 mole) of the compound represented by the above formula (D-6) and 7.7 g (0.016 mole) of the compound represented by the above formula (D-7) as diamine compounds were dissolved in 140 g of N-methyl-2-pyrrolidone to carry out a reaction at 60° C. for 4 hours. The solution viscosity of a solution containing 10 wt % of a polymer prepared by dispensing a small amount of the obtained polyamic acid solution and adding N-methyl-2-pyrrolidone to this solution was 117 mPa·s.

Then, 325 g of N-methyl-2-pyrrolidone was added to the obtained polyamic acid solution, and 6.1 g of pyridine and 7.9 g of acetic anhydride were added to carry out a dehydration ring-closure reaction at 110° C. for 4 hours. After the end of the dehydration ring-closure reaction, the solvent in the system was substituted by new N-methyl-2-pyrrolidone (pyridine and acetic anhydride used in the dehydration ring-closure reaction were removed to the outside of the system by this operation) to obtain a solution containing 15.4 wt % of a polyimide (PI-10) having an imidization rate of about 55%.

The solution viscosity of a solution containing 10 wt % of a polymer prepared by dispensing a small amount of the obtained polyimide solution and adding N-methyl-2-pyrrolidone to this solution was 109 mPa·s.

Preparation of Liquid Crystal Aligning Agent

Example 46

1,000 parts by weight in terms of PA-3 of the solution containing a polyamic acid PA-3 synthesized in the above Synthesis Example 10 as the another polymer was collected, 100 parts by weight of the radiation sensitive polyorganosiloxane obtained in the above Example 4 was added to the solution, and further N-methyl-2-pyrrolidone and butyl cellosolve were added to prepare a solution having a solvent composition of N-methyl-2-pyrrolidone:butyl cellosolve=50:50 (weight ratio) and a solids content of 3.0 wt %.

This solution was filtered with a filter having an opening diameter of 1 µm to prepare a liquid crystal aligning agent A-13.

The storage stability of this liquid crystal aligning agent was evaluated in the same manner as is Example 6. The evaluation results are shown in Table 5.

Examples 47 to 58 and 71 to 75

Liquid crystal aligning agents A-14 to A-25 and A-38 to A-42 were prepared in the same manner as in Example 46 except that the type of the radiation sensitive polyorganosiloxane and the type and amount of the another polymer solution were changed as shown in Table 5.

The storage stabilities of these liquid crystal aligning agents were evaluated in the same manner as in Example 6. The evaluation results are shown in Table 5.

Examples 59 to 70

Liquid crystal aligning agents A-26 to A-37 were prepared in the same manner as in Example 6 except that the type of the radiation sensitive polyorganosiloxane was changed as shown in Table 5.

The storage stabilities of these liquid crystal aligning agents were evaluated in the same manner as in Example 6. The evaluation results are shown in Table 5.

Example 76

100 parts by weight of the radiation sensitive polyorganosiloxane S-4 obtained in the above Example 4 and 1,000 parts by weight of PA-1 obtained in the above Synthesis Example 6 as the another polymer were used in combination, 50 parts by weight of a compound represented by the following formula (E-1) as an epoxy compound was added to the obtained mixture, and further N-methyl-2-pyrrolidone and butyl cellosolve were added to prepare a solution having a solvent composition of N-methyl-2-pyrrolidone:butyl cellosolve=50:50 (weight ratio) and a solids content of 3.0 wt %.

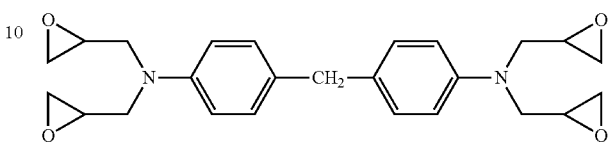

(E-1)

This solution was filtered with a filter having an opening diameter of 1 µm to prepare a liquid crystal aligning agent A-43.

The storage stability of this liquid crystal aligning agent was evaluated in the same manner as in Example 6. The evaluation results are shown in Table 6.

Examples 77 to 79 and 92 to 95

Liquid crystal aligning agents A-44 to A-46 and A-59 to A-62 were prepared in the same manner as in Example 76 except that the type of the radiation sensitive polyorganosiloxane and the type and amount of the epoxy compound were changed as shown in Table 6.

The storage stabilities of these liquid crystal aligning agents were evaluated in the same manner as in Example 6. The evaluation results are shown in Table 6.

Example 80

1,000 parts by weight in terms of PI-6 of the solution containing a polyimide PI-6 obtained in the above Synthesis Example 18 as the another polymer was collected, 100 parts by weight of the radiation sensitive polyorganosiloxane obtained in the above Example 4 and 50 parts by weight of the compound represented by the above formula (E-1) as the epoxy compound were added to this solution, and N-methyl-2-pyrrolidone and butyl cellosolve were added to these to prepare a solution having a solvent composition of N-methyl-2-pyrrodione:butyl cellosolve=50:50 (weight ratio) and a solids content of 3.0 wt %.

This solution was filtered with a filter having an opening diameter of 1 µm to prepare a liquid crystal aligning agent A-47.

The storage stability of this liquid crystal aligning agent was evaluated in the same manner as in Example 6. The evaluation results are shown in Table 6.

Examples 81 to 91 and 96 to 107

Liquid crystal aligning agents A-48 to A-58 and A-63 to A-74 were prepared in the same manner as in Example 80 except that the types and amounts of the solution containing another polymer and the epoxy compound were changed as shown in Table 6.

The storage stabilities of these liquid crystal aligning agents were evaluated in the same manner as in Example 6. The evaluation results are shown in Table 6.

In Table 6, the epoxy compound "E-1" is a compound represented by the above formula (E-1) and the epoxy compound "E-2" is a compound represented by the following formula (E-2).

TABLE 5

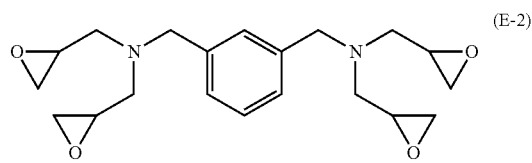
(E-2)

| | Liquid crystal aligning agent (name) | Radiation sensitive polyorgano-siloxane (name) | Another polymer Type | Amount (parts by weight) | Storage stability |
|---|---|---|---|---|---|
| Ex. 46 | A-13 | S-4 | PA-3 | 1,000 | Acceptable |
| Ex. 47 | A-14 | S-4 | PA-4 | 1,000 | Acceptable |
| Ex. 48 | A-15 | S-4 | PA-5 | 1,000 | Acceptable |
| Ex. 49 | A-16 | S-4 | PA-6 | 1,000 | Acceptable |
| Ex. 50 | A-17 | S-4 | PI-2 | 1,000 | Acceptable |
| Ex. 51 | A-18 | S-4 | PI-3 | 1,000 | Acceptable |
| Ex. 52 | A-19 | S-4 | PI-4 | 1,000 | Acceptable |
| Ex. 53 | A-20 | S-4 | PI-5 | 1,000 | Acceptable |
| Ex. 54 | A-21 | S-4 | PI-6 | 1,000 | Acceptable |
| Ex. 55 | A-22 | S-4 | PI-7 | 1,000 | Acceptable |
| Ex. 56 | A-23 | S-4 | PI-8 | 1,000 | Acceptable |
| Ex. 57 | A-24 | S-4 | PI-9 | 1,000 | Acceptable |
| Ex. 58 | A-25 | S-4 | PI-10 | 1,000 | Acceptable |
| Ex. 59 | A-26 | S-6 | PA-1 | 1,000 | Acceptable |
| Ex. 60 | A-27 | S-7 | PA-1 | 1,000 | Acceptable |
| Ex. 61 | A-28 | S-8 | PA-1 | 1,000 | Acceptable |

TABLE 5-continued

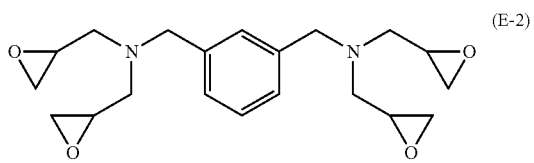
(E-2)

| | Liquid crystal aligning agent (name) | Radiation sensitive polyorgano-siloxane (name) | Another polymer Type | Amount (parts by weight) | Storage stability |
|---|---|---|---|---|---|
| Ex. 62 | A-29 | S-9 | PA-1 | 1,000 | Acceptable |
| Ex. 63 | A-30 | S-10 | PA-1 | 1,000 | Acceptable |
| Ex. 64 | A-31 | S-11 | PA-1 | 1,000 | Acceptable |
| Ex. 65 | A-32 | S-12 | PA-1 | 1,000 | Acceptable |
| Ex. 66 | A-33 | S-13 | PA-1 | 1,000 | Acceptable |
| Ex. 67 | A-34 | S-14 | PA-1 | 1,000 | Acceptable |
| Ex. 68 | A-35 | S-15 | PA-1 | 1,000 | Acceptable |
| Ex. 69 | A-36 | S-16 | PA-1 | 1,000 | Acceptable |
| Ex. 70 | A-37 | S-17 | PA-1 | 1,000 | Acceptable |
| Ex. 71 | A-38 | S-17 | PI-6 | 1,000 | Acceptable |
| Ex. 72 | A-39 | S-17 | PI-7 | 1,000 | Acceptable |
| Ex. 73 | A-40 | S-17 | PI-8 | 1,000 | Acceptable |
| Ex. 74 | A-41 | S-17 | PI-9 | 1,000 | Acceptable |
| Ex. 75 | A-42 | S-17 | PI-10 | 1,000 | Acceptable |

Ex.: Example

TABLE 6

| | Liquid crystal aligning agent (name) | Radiation sensitive polyorgano-siloxane (name) | Another polymer Type | Amount (pbw) | Epoxy compounds Type | Amount (pbw) | Storage stability |
|---|---|---|---|---|---|---|---|
| Ex. 76 | A-43 | S-4 | PA-1 | 1,000 | E-1 | 50 | Acceptable |
| Ex. 77 | A-44 | S-4 | PA-1 | 1,000 | E-1 | 200 | Acceptable |
| Ex. 78 | A-45 | S-4 | PA-1 | 1,000 | E-2 | 50 | Acceptable |
| Ex. 79 | A-46 | S-4 | PA-1 | 1,000 | E-2 | 200 | Acceptable |
| Ex. 80 | A-47 | S-4 | PI-6 | 1,000 | E-1 | 50 | Acceptable |
| Ex. 81 | A-48 | S-4 | PI-6 | 1,000 | E-1 | 200 | Acceptable |
| Ex. 82 | A-49 | S-4 | PI-6 | 1,000 | E-2 | 50 | Acceptable |
| Ex. 83 | A-50 | S-4 | PI-6 | 1,000 | E-2 | 200 | Acceptable |
| Ex. 84 | A-51 | S-4 | PI-7 | 1,000 | E-1 | 50 | Acceptable |
| Ex. 85 | A-52 | S-4 | PI-7 | 1,000 | E-1 | 200 | Acceptable |
| Ex. 86 | A-53 | S-4 | PI-7 | 1,000 | E-2 | 50 | Acceptable |
| Ex. 87 | A-54 | S-4 | PI-7 | 1,000 | E-2 | 200 | Acceptable |
| Ex. 88 | A-55 | S-4 | PI-8 | 1,000 | E-1 | 50 | Acceptable |
| Ex. 89 | A-56 | S-4 | PI-8 | 1,000 | E-1 | 200 | Acceptable |
| Ex. 90 | A-57 | S-4 | PI-8 | 1,000 | E-2 | 50 | Acceptable |
| Ex. 91 | A-58 | S-4 | PI-8 | 1,000 | E-2 | 200 | Acceptable |
| Ex. 92 | A-59 | S-17 | PA-1 | 1,000 | E-1 | 50 | Acceptable |
| Ex. 93 | A-60 | S-17 | PA-1 | 1,000 | E-1 | 200 | Acceptable |
| Ex. 94 | A-61 | S-17 | PA-1 | 1,000 | E-2 | 50 | Acceptable |
| Ex. 95 | A-62 | S-17 | PA-1 | 1,000 | E-2 | 200 | Acceptable |
| Ex. 96 | A-63 | S-17 | PI-6 | 1,000 | E-1 | 50 | Acceptable |
| Ex. 97 | A-64 | S-17 | PI-6 | 1,000 | E-1 | 200 | Acceptable |
| Ex. 98 | A-65 | S-17 | PI-6 | 1,000 | E-2 | 50 | Acceptable |
| Ex. 99 | A-66 | S-17 | PI-6 | 1,000 | E-2 | 200 | Acceptable |
| Ex. 100 | A-67 | S-17 | PI-7 | 1,000 | E-1 | 50 | Acceptable |
| Ex. 101 | A-68 | S-17 | PI-7 | 1,000 | E-1 | 200 | Acceptable |
| Ex. 102 | A-69 | S-17 | PI-7 | 1,000 | E-2 | 50 | Acceptable |
| Ex. 103 | A-70 | S-17 | PI-7 | 1,000 | E-2 | 200 | Acceptable |
| Ex. 104 | A-71 | S-17 | PI-8 | 1,000 | E-1 | 50 | Acceptable |
| Ex. 105 | A-72 | S-17 | PI-8 | 1,000 | E-1 | 200 | Acceptable |
| Ex. 106 | A-73 | S-17 | PI-8 | 1,000 | E-2 | 50 | Acceptable |
| Ex. 107 | A-74 | S-17 | PI-8 | 1,000 | E-2 | 200 | Acceptable |

Ex.: Example
pbw: parts by weight

Formation of Liquid Crystal Alignment Film and Manufacture and Evaluation of Liquid Crystal Display Device Examples 108 to 169

Liquid crystal alignment films were formed and liquid crystal display devices were manufactured and evaluated in the same manner as in Example 18 except that the type of the liquid crystal aligning agent used was changed as shown in Table 7. The results are shown in Table 7 and Table 8.

TABLE 7

| | Liquid crystal aligning agent (name) | Dose of ultra-violet radiation (J/m$^2$) | Alignability | Pretilt angle (°) | Voltage holding ratio (%) | Burn-in (mV) |
|---|---|---|---|---|---|---|
| Ex. 108 | A-13 | 1,000 | Acceptable | 89 | 98 | 6 |
| Ex. 109 | A-14 | 1,000 | Acceptable | 89 | 98 | 6 |
| Ex. 110 | A-15 | 1,000 | Acceptable | 89 | 98 | 6 |
| Ex. 111 | A-16 | 1,000 | Acceptable | 89 | 98 | 6 |
| Ex. 112 | A-17 | 1,000 | Acceptable | 89 | 99 | 6 |
| Ex. 113 | A-18 | 1,000 | Acceptable | 89 | 99 | 6 |
| Ex. 114 | A-19 | 1,000 | Acceptable | 89 | 99 | 6 |
| Ex. 115 | A-20 | 1,000 | Acceptable | 89 | 99 | 6 |
| Ex. 116 | A-21 | 1,000 | Acceptable | 89 | 99 | 5 |
| Ex. 117 | A-22 | 1,000 | Acceptable | 89 | 99 | 5 |
| Ex. 118 | A-23 | 1,000 | Acceptable | 89 | 99 | 5 |
| Ex. 119 | A-24 | 1,000 | Acceptable | 89 | 99 | 5 |
| Ex. 120 | A-25 | 1,000 | Acceptable | 89 | 99 | 5 |
| Ex. 121 | A-26 | 1,000 | Acceptable | 89 | 98 | 6 |
| Ex. 122 | A-27 | 1,000 | Acceptable | 89 | 98 | 6 |
| Ex. 123 | A-28 | 1,000 | Acceptable | 89 | 98 | 6 |
| Ex. 124 | A-29 | 1,000 | Acceptable | 89 | 98 | 6 |
| Ex. 125 | A-30 | 1,000 | Acceptable | 89 | 99 | 5 |
| Ex. 126 | A-31 | 1,000 | Acceptable | 89 | 99 | 5 |
| Ex. 127 | A-32 | 1,000 | Acceptable | 89 | 99 | 5 |
| Ex. 128 | A-33 | 1,000 | Acceptable | 89 | 99 | 5 |
| Ex. 129 | A-34 | 1,000 | Acceptable | 89 | 99 | 5 |
| Ex. 130 | A-35 | 1,000 | Acceptable | 89 | 99 | 5 |
| Ex. 131 | A-36 | 1,000 | Acceptable | 89 | 99 | 5 |
| Ex. 132 | A-37 | 1,000 | Acceptable | 89 | 99 | 5 |
| Ex. 133 | A-38 | 1,000 | Acceptable | 89 | 99 | 5 |
| Ex. 134 | A-39 | 1,000 | Acceptable | 89 | 99 | 5 |
| Ex. 135 | A-40 | 1,000 | Acceptable | 89 | 99 | 5 |
| Ex. 136 | A-41 | 1,000 | Acceptable | 89 | 99 | 5 |
| Ex. 137 | A-42 | 1,000 | Acceptable | 89 | 99 | 5 |

Ex.: Example

TABLE 8

| | Liquid crystal aligning agent (name) | Dose of ultra-violet radiation (J/m$^2$) | Alignability | Pretilt angle (°) | Voltage holding ratio (%) | Burn-in (mV) |
|---|---|---|---|---|---|---|
| Ex. 138 | A-43 | 1,000 | Acceptable | 89 | 99 | 6 |
| Ex. 139 | A-44 | 1,000 | Acceptable | 89 | 99 | 6 |
| Ex. 140 | A-45 | 1,000 | Acceptable | 89 | 99 | 6 |
| Ex. 141 | A-46 | 1,000 | Acceptable | 89 | 99 | 6 |
| Ex. 142 | A-47 | 1,000 | Acceptable | 89 | 99 | 6 |
| Ex. 143 | A-48 | 1,000 | Acceptable | 89 | 99 | 6 |
| Ex. 144 | A-49 | 1,000 | Acceptable | 89 | 99 | 6 |
| Ex. 145 | A-50 | 1,000 | Acceptable | 89 | 99 | 6 |
| Ex. 146 | A-51 | 1,000 | Acceptable | 89 | 99 | 6 |
| Ex. 147 | A-52 | 1,000 | Acceptable | 89 | 99 | 6 |
| Ex. 148 | A-53 | 1,000 | Acceptable | 89 | 99 | 6 |
| Ex. 149 | A-54 | 1,000 | Acceptable | 89 | 99 | 6 |
| Ex. 150 | A-55 | 1,000 | Acceptable | 89 | 99 | 6 |
| Ex. 151 | A-56 | 1,000 | Acceptable | 89 | 99 | 6 |
| Ex. 152 | A-57 | 1,000 | Acceptable | 89 | 99 | 6 |
| Ex. 153 | A-58 | 1,000 | Acceptable | 89 | 99 | 6 |
| Ex. 154 | A-59 | 1,000 | Acceptable | 89 | 99 | 6 |
| Ex. 155 | A-60 | 1,000 | Acceptable | 89 | 99 | 6 |
| Ex. 156 | A-61 | 1,000 | Acceptable | 89 | 99 | 6 |
| Ex. 157 | A-62 | 1,000 | Acceptable | 89 | 99 | 6 |
| Ex. 158 | A-63 | 1,000 | Acceptable | 89 | 99 | 6 |
| Ex. 159 | A-64 | 1,000 | Acceptable | 89 | 99 | 6 |
| Ex. 160 | A-65 | 1,000 | Acceptable | 89 | 99 | 6 |
| Ex. 161 | A-66 | 1,000 | Acceptable | 89 | 99 | 6 |
| Ex. 162 | A-67 | 1,000 | Acceptable | 89 | 99 | 6 |
| Ex. 163 | A-68 | 1,000 | Acceptable | 89 | 99 | 6 |
| Ex. 164 | A-69 | 1,000 | Acceptable | 89 | 99 | 6 |
| Ex. 165 | A-70 | 1,000 | Acceptable | 89 | 99 | 6 |
| Ex. 166 | A-71 | 1,000 | Acceptable | 89 | 99 | 6 |
| Ex. 167 | A-72 | 1,000 | Acceptable | 89 | 99 | 6 |
| Ex. 168 | A-73 | 1,000 | Acceptable | 89 | 99 | 6 |
| Ex. 169 | A-74 | 1,000 | Acceptable | 89 | 99 | 6 |

Ex.: Example

Synthesis of Cinnamic Acid Derivative

Synthesis Example 23

A compound (2-23-1) was synthesized based on the following scheme.

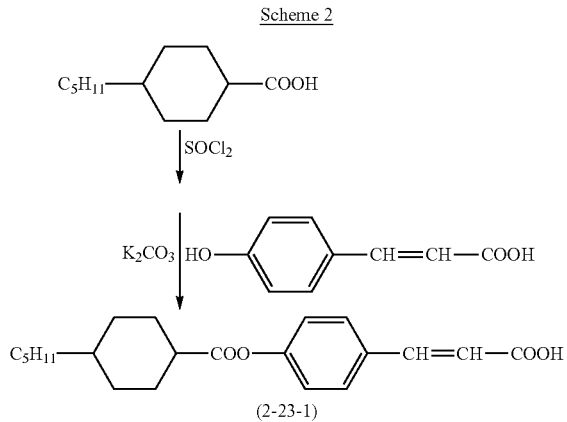

9.91 g of 4-pentyl-transcyclohexylcarboxylic acid was put into a reactor, and 100 mL of thionyl chloride and 77 μL of N,N-dimethylformamide were added to this and stirred at 80° C. for 1 hour. Then, thionyl chloride was distilled off under reduced pressure, methylene chloride was added to the obtained product, the resulting mixture was washed with a sodium hydrogen carbonate aqueous solution, dried with magnesium sulfate and concentrated, and tetrahydrofuran was added to obtain a solution.

Thereafter, 7.39 g of 4-hydroxycinnamic acid, 13.82 g of potassium carbonate, 0.48 g of tetrabutyl ammonium, 50 mL of tetrahydrofuran and 100 mL of water were fed to a 500 mL three-necked flask different from the above flask. This solution was cooled with ice, and the above tetrahydrofuran solution containing a reaction product of 4-pentyl-transcyclohexylcarboxylic acid and thionyl chloride was added dropwise slowly to this solution to carry out a reaction under agitation for another 2 hours. After the end of the reaction, hydrochloric acid was added to the reaction mixture to neutralize it, extraction was carried out with ethyl acetate, and the extract was dried with magnesium sulfate, concentrated and recrystallized with ethanol to obtain 13 g of a white crystal of the compound (2-23-1).

Synthesis Example 24

A compound (2-24-1) was synthesized based on the following scheme 3.

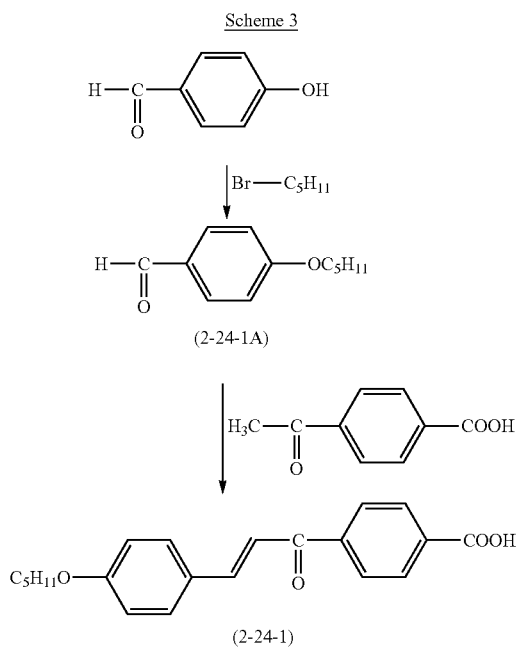

(2-24-1)

After 24.4 g of 4-hydroxybenzaldehyde, 27.6 g of potassium carbonate, 1.0 g of potassium iodide and 500 mL of acetone were fed to a 1-liter three-necked flask and stirred at room temperature for 30 minutes, 30.2 g of 1-bromopentane was added to carryout a reaction under reflux in a nitrogen atmosphere for 5 hours. After the end of the reaction, the reaction solution was injected into water to precipitate a product. The formed precipitate was collected by filtration and recrystallized with acetone to obtain 33 g of a white crystal of a compound (2-24-1A), that is, 4-pentyloxybenzaldehyde.

19.2 g of the obtained 4-pentyloxybenzaldehyde, 16.4 g of 4-acetylbenzoic acid, 8.0 g of sodium hydroxide and 150 mL of ethanol were fed to a 500 mL three-necked flask to carry out a reaction under reflux for 6 hours. After the end of the reaction, heating was stopped to gradually cool the reaction solution down to room temperature, and 200 mL of water was added and stirred until a homogeneous solution was obtained. This solution was put into a 1-liter beaker, and concentrated hydrochloric acid was added dropwise to this solution under agitation until pH became 7 or less. The obtained precipitate was collected by filtration and recrystallized with ethanol to obtain 29 g of a white crystal of the compound (2-24-1), that is, 4-pentyloxy-4'-carboxychalcone.

Synthesis Example 25

30 g of a white crystal of a compound (2-24-2) represented by the following formula was obtained in the same manner as in the above Synthesis Example 24 except that 47.6 g of 1-iodo-4,4,4-trifluorobutane was used in place of 1-bromopentane.

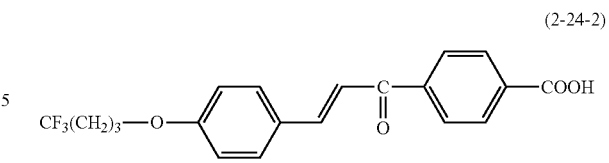

Synthesis Example 26

A compound (3-7-1) was synthesized based on the following scheme 4.

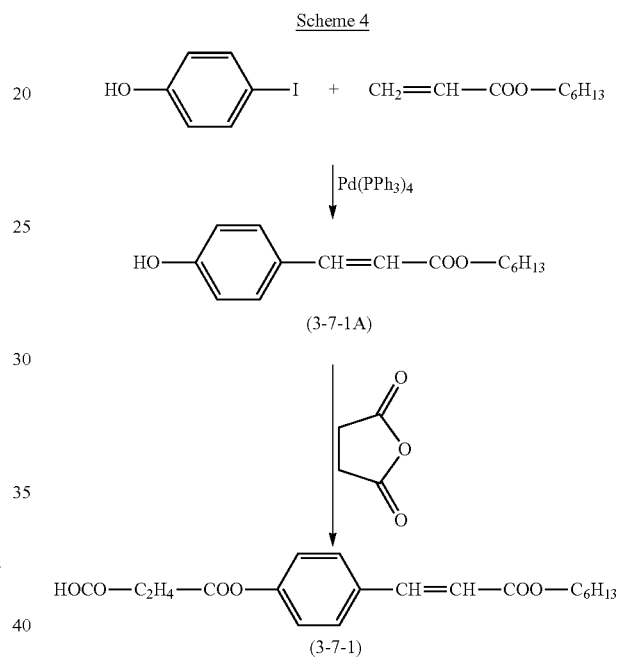

22 g of 4-iodophenol, 16 g of hexyl acrylate, 14 mL of triethylamine, 2.3 g of tetrakistriphenylphosphine palladium and 1 liter of N,N-dimethylformamide were fed to a 2-liter three-necked flask equipped with a thermometer and a nitrogen introduction tube, and the inside of the system was fully dried. Subsequently, the above mixture was heated at 90° C. and stirred in a nitrogen stream for 2 hours to carry out a reaction. After the end of the reaction, diluted hydrochloric acid was added to extract the reaction product with ethyl acetate. An organic layer was washed with water, dried with magnesium sulfate, concentrated and recrystallized with ethanol to obtain 12 g of a compound (3-7-1A).

Thereafter, 12 g of the above compound (3-7-1A), 5.5 g of succinic anhydride and 0.6 g of 4-dimethylaminopyridine were fed to a 200 mL three-necked flask equipped with a thermometer, a nitrogen introduction tube and a reflux tube, and the inside of the system was fully dried. Then, 5.6 g of triethylamine and 100 mL of tetrahydrofuran were added to this mixture to carry out a reaction under reflux for 5 hours. After the end of the reaction, diluted hydrochloric acid was added to the reaction mixture which was then extracted with ethyl acetate. The obtained extract was washed with water, dried with magnesium sulfate, concentrated and recrystallized with ethanol to obtain 8.7 g of the compound (3-7-1).

Synthesis Example 27

A compound (3-9-1) was synthesized based on the following scheme 5.

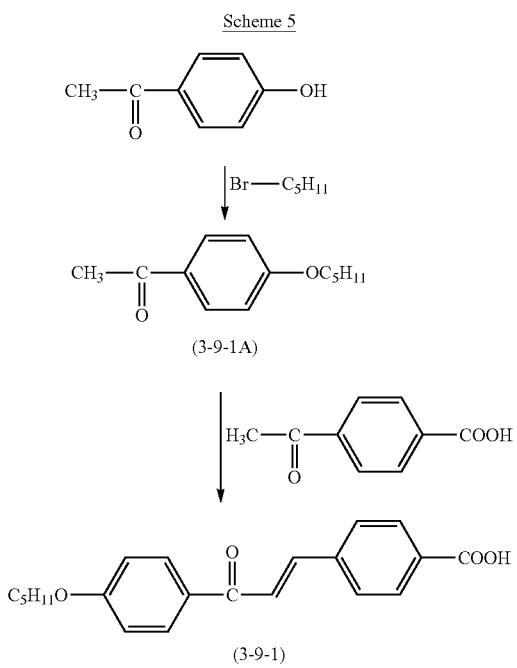

After 27.2 g of 4-hydroxyacetophenone, 27.6 g of potassium carbonate, 1.0 g of potassium iodide and 500 mL of acetone were fed to a 1-liter three-necked flask and stirred at room temperature for 30 minutes, 30.2 g of 1-bromopentane was added to carryout a reaction under reflux in a nitrogen atmosphere for 5 hours. After the end of the reaction, the reaction solution was injected into water to precipitate a product. The formed precipitate was collected by filtration and recrystallized with acetone to obtain 35 g of a white crystal of a compound (3-9-1A), that is, 4-pentyloxyacetophenone.

20.6 g of 4-pentyloxyacetophenone obtained above, 15.0 g of 4-formylbenzoic acid, 8.0 g of sodium hydroxide and 150 mL of ethanol were fed to a 500 mL three-necked flask to carry out a reaction under reflux for 6 hours. After the end of the reaction, heating was stopped to gradually cool the reaction solution down to room temperature, and 200 mL of water was added and stirred until a homogeneous solution was obtained. This solution was put into a 1-liter beaker, and concentrated hydrochloric acid was added dropwise to this solution under agitation until pH became 7 or less. The obtained precipitate was collected by filtration and recrystallized with ethanol to obtain 25 g of a white crystal of the compound (3-9-1), that is, 4-carboxy-4'-pentyloxychalcone.

Synthesis Example 28

28 g of a white crystal of a compound (3-9-2) represented by the following formula was obtained in the same manner as in the above Synthesis Example 27 except that 47.6 g of 1-iodo-4,4,4-trifluorobutane was used in place of 1-bromopentane.

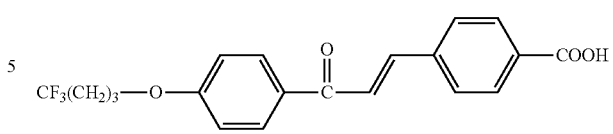

(3-9-2)

Synthesis of Radiation Sensitive Polyorganosiloxane

Example 170

5.0 g of the polyorganosiloxane EPS-1 having an epoxy group obtained in the above Synthesis Example 1, 46.4 g of methyl isobutyl ketone and an amount corresponding to 50 mol % of the silicon atom of EPS-1 of the compound (2-23-1) obtained in the above Synthesis Example 23, 1.35 g of n-octyloxybenzoic acid as the another pretilt angle generating compound and 0.10 g of tetrabutylammonium bromide were fed to a 200 mL three-necked flask to carryout a reaction at 80° C. under agitation for 8 hours. After the end of the reaction, re-precipitation was carried out with methanol, the precipitate was dissolved in ethyl acetate to obtain a solution which was then washed with water 3 times, and then the solvent was distilled off to obtain a radiation sensitive polyorganosiloxane S-18 as a white powder. The weight average molecular weight Mw of this radiation sensitive polyorganosiloxane S-CE-18 was 9,400.

Examples 171 to 174

Radiation sensitive polyorganosiloxanes S-19 to S-22 were obtained in the same manner as in the above Example 170 except that the type of the cinnamic acid derivative used was changed as shown in Table 9.

The weight average molecular weights Mw of these radiation sensitive polyorganosiloxanes are shown in Table 9.

TABLE 9

| | Type of radiation sensitive polyorganosiloxane | Type of cinnamic acid derivative | Radiation sensitive polyorganosiloxane | |
|---|---|---|---|---|
| | | | Name | Mw |
| Example 170 | EPS-1 | 2-23-1 | S-18 | 9,400 |
| Example 171 | EPS-1 | 3-9-1 | S-19 | 12,000 |
| Example 172 | EPS-1 | 3-9-2 | S-20 | 12,300 |
| Example 173 | EPS-1 | 2-24-1 | S-21 | 12,000 |
| Example 174 | EPS-1 | 2-24-2 | S-22 | 12,200 |

Preparation of Liquid Crystal Aligning Agent

Example 175

100 parts by weight of the radiation sensitive polyorganosiloxane S-18 obtained in the above Example CE-4 and 1,000 parts by weight in terms of PI-7 of the solution containing a polyimide PI-7 obtained in the above Synthesis Example 19 as the another polymer were used in combination, 50 parts by weight of the compound represented by the above formula (E-1) as the epoxy compound was added to these, and further N-methyl-2-pyrrolidone and butyl cellosolve were added to prepare a solution having a solvent composition of N-methyl-2-pyrrolidone:butyl cellosolve=50:50 (weight ratio) and a solids content of 3.0 wt %. This solution was filtered with a filter having an opening diameter of 1 μm to prepare a liquid crystal aligning agent A-75.

The storage stability of this liquid crystal aligning agent was evaluated in the same manner as in the above Example 6. The evaluation results are shown in Table 10.

Examples 176 to 179

Liquid crystal aligning agents A-76 to A-79 were prepared in the same manner as in the above Example 175 except that the type of the radiation sensitive polyorganosiloxane used was changed as shown in Table 10.

The storage stabilities of these liquid crystal aligning agents were evaluated in the same manner as in the above Example 6. The evaluation results are shown in Table 10.

TABLE 10

| | Name of liquid crystal aligning agent | Type of radiation sensitive polyorganosiloxane | Storage stability |
|---|---|---|---|
| Example 175 | A-75 | S-18 | Acceptable |
| Example 176 | A-76 | S-19 | Acceptable |
| Example 177 | A-77 | S-20 | Acceptable |
| Example 178 | A-78 | S-21 | Acceptable |
| Example 179 | A-79 | S-22 | Acceptable |

<Manufacture and Evaluation of Liquid Crystal Display Device>

Manufacture and Evaluation of Homeotropic Alignment Type Liquid Crystal Display Device Examples 180 to 182

Liquid crystal display devices were manufactured and evaluated in the same manner as in the above Example 18 except that the type of the liquid crystal aligning agent used and the dose of ultraviolet radiation were changed as shown in Table 11. The results are shown in Table 11.

Manufacture and Evaluation of TN Alignment Type Liquid Crystal Display Device

Example 183

The liquid crystal aligning agent A-76 prepared in the above Example 177 was applied to the transparent electrode side of a glass substrate having a transparent electrode which was composed of an ITO film with a spinner heated at 180° C. for 1 hour to form a coating film having a thickness of 0.1 μm. 3,000 J/m² of polarized ultraviolet radiation including a 313 nm bright line was applied to the surface of this coating film by using an Hg—Xe lamp and a Glan-Taylor prism from a direction 40° inclined from the normal of the substrate to provide liquid crystal aligning capability so as form a liquid crystal alignment film.

This operation was repeated to prepare a pair of (two) substrates having this liquid crystal alignment film on the transparent conductive film.

An epoxy resin adhesive containing aluminum oxide spheres having a diameter of 5.5 μm was applied to the peripheries of the liquid crystal alignment film formed sides of the above pair of substrates by screen printing, and the substrates were joined and contact bonded together in such a manner that the application directions of polarized ultraviolet radiation became orthogonal to each other and heated at 150° C. for 1 hour to thermally cure the adhesive. After positive type nematic liquid crystals (MLC-6221 of Merck & Co., Inc., containing a chiral agent) were injected into the space between the substrates from a liquid crystal injection port to fill the space, the liquid crystal injection port was sealed with an epoxy-based adhesive. Further, the resulting assembly was heated at 150° C. for 10 minutes and then gradually cooled to room temperature to remove flow alignment at the time of injecting liquid crystals. Then, a polarizing plate was put on the exterior sides of the substrates in such a manner that the polarizing directions of the two polarizing plates became orthogonal to each other and parallel to the polarizing directions of the liquid crystal alignment films to manufacture a TN alignment type liquid crystal display device.

The liquid crystal alignability, voltage holding ratio, burn-in and light resistance of this liquid crystal display device were evaluated in the same manner as in Example 18. The evaluation results are shown in Table 11.

Example 184

A TN alignment type liquid crystal display device was manufactured and evaluated in the same manner as in the above Example 183 except that the type of the liquid crystal aligning agent used was changed as shown in Table 11. The results are shown in Table 11.

TABLE 11

| | Name of liquid crystal aligning agent | Dose of ultraviolet radiation (J/m²) | Alignment mode | Liquid crystal alignability | Pretilt angle (°) | Voltage holding ratio (%) | Burn-in (mV) | Light resistance |
|---|---|---|---|---|---|---|---|---|
| Ex. 180 | A-75 | 1,000 | Homeotropic | Acceptable | 89 | 98 | 5 | Acceptable |
| Ex. 181 | A-78 | 3,000 | Homeotropic | Acceptable | 89 | 97 | 13 | Acceptable |
| Ex. 182 | A-79 | 3,000 | Homeotropic | Acceptable | 89 | 97 | 14 | Acceptable |
| Ex. 183 | A-76 | 3,000 | TN | Acceptable | — | 97 | 15 | Acceptable |
| Ex. 184 | A-77 | 3,000 | TN | Acceptable | — | 97 | 16 | Acceptable |

Ex.: Example

Synthesis of Polyamic Acid

Synthesis Example 29

109 g (0.50 molar equivalent) of pyromellitic dianhydride and 98 g (0.50 molar equivalent) of 1,2,3,4-cyclobutanetetracarboxylic dianhydride as tetracarboxylic dianhydrides and 200 g (1.0 molar equivalent) of 4,4-diaminodiphenyl ether as a diamine were dissolved in 2,290 g of N-methyl-2-pyrrolidone to carry out a reaction at 40° C. for 3 hours, and 1,350 g of N-methyl-2-pyrrolidone was added to obtain about 3,590 g of a solution containing 10 wt % of a polyamic acid (PA-7). The solution viscosity of this polyamic acid solution was 210 mPa·s.

Synthesis of Radiation Sensitive Polyorganosiloxane

Example 185

5.0 g of the polyorganosiloxane EPS-1 having an epoxy group obtained in the above Synthesis Example 1, an amount corresponding to 50 mol % of the epoxy group of the above polyorganosiloxane of the compound (2-23-1) obtained in Example 23 and 0.5 g of tetrabutylammonium bromide were fed to a 200 mL three-necked flask equipped with a reflux tube, methyl isobutyl ketone was added to ensure that the solids content became 20 wt %, and then a reaction was carried out under reflux for 3 hours. After the end of the reaction, methanol was added to form a precipitate, a solution prepared by dissolving the precipitate in ethyl acetate was washed with water 3 times, and the solvent was distilled off to obtain a radiation sensitive polyorganosiloxane S-23 as a white powder. The weight average molecular weight Mw of the radiation sensitive polyorganosiloxane S-23 was 29,900.

Preparation of Liquid Crystal Aligning Agent and Evaluation of Storage Stability Example 186

100 parts by weight of the radiation sensitive polyorganosiloxane S-23 obtained in the above Example 185 and 2,000 parts by weight in terms of PA-7 of the solution containing a polyamic acid PA-7 obtained in the above Synthesis Example 29 as the another polymer were used in combination, and N-methyl-2-pyrrolidone and butyl cellosolve were added to these so as to prepare a solution having a solvent composition of 1-methyl-2-pyrrolidone:butyl cellosolve=50:50 (weight ratio) and a solids content of 3.0 wt %. This solution was filtered with a filter having an opening diameter of 1 µm to prepare a liquid crystal aligning agent A-80.

When the storage stability of this liquid crystal aligning agent A-80 was evaluated in the same manner as in the above Example 6, the storage stability of the liquid crystal aligning agent A-80 was "acceptable".

Manufacture and Evaluation of Liquid Crystal Display Device

Example 187

A homeotropic alignment type liquid crystal display device was manufactured in the same manner as in the above Example 18 except that the liquid crystal aligning agent A-80 prepared in the above Synthesis Example was used.

When the liquid crystal alignability, pretilt angle, voltage holding ratio and burn-in of this liquid crystal display device were evaluated, the liquid crystal display device had "acceptable" liquid crystal alignability, a pretilt angle of 89°, a voltage holding ratio of 98% and a burn-in (residual DC voltage) of 6 mV.

EFFECT OF THE INVENTION

The liquid crystal aligning agent of the present invention can provide a liquid crystal alignment film having excellent liquid crystal alignability and electric properties with a smaller dose of radiation than that of a liquid crystal aligning agent which is conventionally known as a liquid crystal aligning agent to which the optical aligning method can be applied. Therefore, when this liquid crystal alignment film is used in a liquid crystal display device, the liquid crystal display device can be manufactured at a lower cost than in the prior art and has excellent characteristic properties such as display properties and reliability. Therefore, the liquid crystal display device can be effectively and advantageously used in various types of equipment such as desk-top calculators, wristwatches, clocks, counter displays, word processors, personal computers and liquid crystal TVs.

The invention claimed is:

1. A method of forming a liquid crystal alignment film, the method comprising:

applying a liquid crystal aligning agent to a substrate, thereby forming a coating film, and applying radiation to the coating film, wherein the liquid crystal aligning agent comprises a radiation sensitive polyorganosiloxane which is obtained by reacting at least one component selected from the group consisting of a polyorganosiloxane having a recurring unit represented by the following formula (1), a hydrolysate thereof and a condensate of the hydrolysate with a cinnamic acid derivative having at least one group selected from the group consisting of a carboxyl group, a hydroxyl group, —SH, —NCO, —NHR, wherein R is a hydrogen atom or an alkyl group having 1 to 6 carbon atoms, and —SO$_2$Cl:

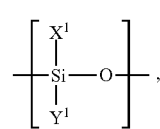

(1)

wherein $X^1$ is a monovalent organic group having an epoxy group, and $Y^1$ is a hydroxyl group, an alkoxyl group having 1 to 10 carbon atoms, an alkyl group having 1 to 20 carbon atoms or an aryl group having 6 to 20 carbon atoms, and wherein when the applied radiation is linearly polarized or partially polarized, the radiation is applied in a direction perpendicular to the surface of the substrate, an oblique direction, or both directions, and wherein when the applied radiation is non-polarized radiation, the radiation is applied in an oblique direction.

2. The method according to claim 1, wherein the cinnamic acid derivative is at least one compound represented by the following formula (2) or a compound represented by the following formula (3):

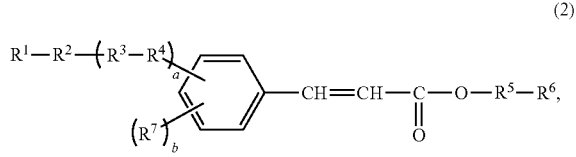
(2)

wherein $R^1$ is an alkyl group having 1 to 40 carbon atoms or a monovalent organic group having 3 to 40 carbon atoms and containing an alicyclic group, with the proviso that some or all of the hydrogen atoms of the alkyl group may be substituted by a fluorine atom, $R^2$ is a single bond, an oxygen atom, —COO— or —OCO—, $R^3$ is a divalent aromatic group, a divalent alicyclic group, a divalent heterocyclic group or a divalent condensed cyclic group, $R^4$ is a single bond, an oxygen atom, —COO— or —OCO—, $R^5$ is a single bond, a methylene group, an alkylene group having 2 to 10 carbon atoms or a divalent aromatic group, when $R^5$ is a single bond, $R^6$ is a hydrogen atom and when $R^5$ is a methylene group, an alkylene group or a divalent aromatic group, $R^6$ is a carboxyl group, a hydroxyl group, —SH, —NCO, —NHR, —SO$_2$Cl, wherein R is a hydrogen atom or an alkyl group having 1 to 6 carbon atoms, $R^7$ is a fluorine atom or a cyano group, "a" is an integer of 0 to 3, and "b" is an integer of 0 to 4:

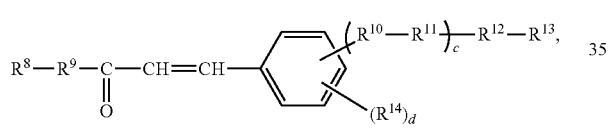
(3)

wherein $R^8$ is an alkyl group having 1 to 40 carbon atoms or a monovalent organic group having 3 to 40 carbon atoms and containing an alicyclic group, with the proviso that some or all of the hydrogen atoms of the alkyl group may be substituted by a fluorine atom, $R^9$ is an oxygen atom or a divalent aromatic group, $R^{10}$ is an oxygen atom, —COO— or —OCO—, $R^{11}$ is a divalent aromatic group, a divalent heterocyclic group or a divalent condensed cyclic group, $R^{12}$ is a single bond, —OCO—(CH$_2$)$_e$— or —O—(CH$_2$)$_g$—, wherein "e" and "g" are each independently an integer of 1 to 10, $R^{13}$ is a carboxyl group, a hydroxyl group, —SH, —NCO, —NHR, or —SO$_2$Cl, wherein R is a hydrogen atom or an alkyl group having 1 to 6 carbon atoms, $R^{14}$ is a fluorine atom or a cyano group, "c" is an integer of 0 to 3, and "d" is an integer of 0 to 4.

3. The method according to claim 1, wherein $X^1$ in the formula (1) is a group represented by the following formula ($X^1$-1) or ($X^1$-2):

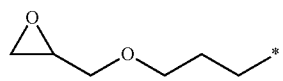
($X^1$-1)

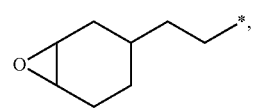
($X^1$-2)

wherein "*" denotes a bond.

4. The method according to claim 1, further comprising at least one polymer selected from the group consisting of a polyamic acid and a polyimide.

5. The method according to claim 1, further comprising at least one component selected from the group consisting of a polyorganosiloxane represented by the following formula (4), a hydrolysate thereof and a condensate of the hydrolysate:

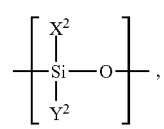
(4)

wherein $X^2$ is a hydroxyl group, a halogen atom, an alkyl group having 1 to 20 carbon atoms, an alkoxyl group having 1 to 6 carbon atoms or an aryl group having 6 to 20 carbon atoms, and $Y^2$ is a hydroxyl group or an alkoxyl group having 1 to 10 carbon atoms.

6. A liquid crystal display device comprising a liquid crystal alignment film formed from a liquid crystal aligning agent, wherein the liquid crystal aligning agent comprises a radiation sensitive polyorganosiloxane which is obtained by reacting at least one component selected from the group consisting of a polyorganosiloxane having a recurring unit represented by the following formula (1), a hydrolysate thereof and a condensate of the hydrolysate with a cinnamic acid derivative having at least one group selected from the group consisting of a carboxyl group, a hydroxyl group, —SH, —NCO, —NHR, wherein R is a hydrogen atom or an alkyl group having 1 to 6 and —SO$_2$Cl:

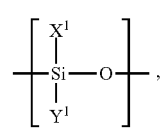
(1)

wherein $X^1$ is a monovalent organic group having an epoxy group, and $Y^1$ is a hydroxyl group, an alkoxyl group having 1 to 10 carbon atoms, an alkyl group having 1 to 20 carbon atoms or an aryl group having 6 to 20 carbon atoms.

7. A liquid crystal aligning agent comprising:
a radiation sensitive polyorganosiloxane which is obtained by reacting at least one component selected from the group consisting of a polyorganosiloxane having a recurring unit represented by the following formula (1), a hydrolysate thereof and a condensate of the hydrolysate with a cinnamic acid derivative having at least one group selected from the group consisting of a carboxyl group, a hydroxyl group, —SH, —NCO, —NHR, wherein R is a hydrogen atom or an alkyl group having 1 to 6 carbon atoms, and —SO$_2$Cl:

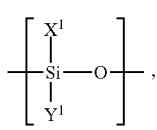
(1)

wherein X$^1$ is a monovalent organic group having an epoxy group, and Y$^1$ is a hydroxyl group, an alkoxyl group having 1 to 10 carbon atoms, an alkyl group having 1 to 20 carbon atoms or an aryl group having 6 to 20 carbon atoms, and at least one polymer selected from the group consisting of a polyamic acid and a polyimide.

8. The liquid crystal aligning agent according to claim 7, wherein the cinnamic acid derivative is at least one compound represented by the following formula (2) or a compound represented by the following formula (3):

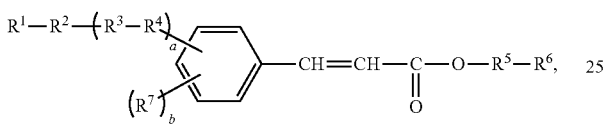
(2)

wherein R$^1$ is an alkyl group having 1 to 40 carbon atoms or a monovalent organic group having 3 to 40 carbon atoms and containing an alicyclic group, with the proviso that some or all of the hydrogen atoms of the alkyl group may be substituted by a fluorine atom, R$^2$ is a single bond, an oxygen atom, —COO— or —OCO—, R$^3$ is a divalent aromatic group, a divalent alicyclic group, a divalent heterocyclic group or a divalent condensed cyclic group, R$^4$ is a single bond, an oxygen atom, —COO— or —OCO—, R$^5$ is a single bond, a methylene group, an alkylene group having 2 to 10 carbon atoms or a divalent aromatic group, when R$^5$ is a single bond, R$^6$ is a hydrogen atom and when R$^5$ is a methylene group, an alkylene group or a divalent aromatic group, R$^6$ is a carboxyl group, a hydroxyl group, —SH, —NCO, —NHR, —SO$_2$Cl, wherein R is a hydrogen atom or an alkyl group having 1 to 6 carbon atoms, R$^7$ is a fluorine atom or a cyano group, "a" is an integer of 0 to 3, and "b" is an integer of 0 to 4:

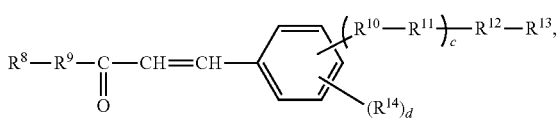
(3)

wherein R$^8$ is an alkyl group having 1 to 40 carbon atoms or a monovalent organic group having 3 to 40 carbon atoms and containing an alicyclic group, with the proviso that some or all of the hydrogen atoms of the alkyl group may be substituted by a fluorine atom, R$^9$ is an oxygen atom or a divalent aromatic group, R$^{10}$ is an oxygen atom, —COO— or —OCO—, R$^{11}$ is a divalent aromatic group, a divalent heterocyclic group or a divalent condensed cyclic group, R$^{12}$ is a single bond, —OCO—(CH$_2$)$_e$— or —O—(CH$_2$)$_g$—, wherein "e" and "g" are each independently an integer of 1 to 10, R$^{13}$ is a carboxyl group, a hydroxyl group, —SH, —NCO, —NHR, or —SO$_2$Cl, wherein R is a hydrogen atom or an alkyl group having 1 to 6 carbon atoms, R$^{14}$ is a fluorine atom or a cyano group, "c" is an integer of 0 to 3, and "d" is an integer of 0 to 4.

9. A liquid crystal aligning agent comprising:
a radiation sensitive polyorganosiloxane which is obtained by reacting at least one component selected from the group consisting of a polyorganosiloxane having a recurring unit represented by the following formula (1), a hydrolysate thereof and a condensate of the hydrolysate with a cinnamic acid derivative having at least one group selected from the group consisting of a carboxyl group, a hydroxyl group, —SH, —NCO, —NHR, wherein R is a hydrogen atom or an alkyl group having 1 to 6 carbon atoms, and —SO$_2$Cl:

(1)

wherein X$^1$ is a monovalent organic group having an epoxy group, and Y$^1$ is a hydroxyl group, an alkoxyl group having 1 to 10 carbon atoms, an alkyl group having 1 to 20 carbon atoms or an aryl group having 6 to 20 carbon atoms, and at least one component selected from the group consisting of a polyorganosiloxane represented by the following formula (4), a hydrolysate thereof and a condensate of the hydrolysate:

(4)

wherein X$^2$ is a hydroxyl group, a halogen atom, an alkyl group having 1 to 20 carbon atoms, an alkoxyl group having 1 to 6 carbon atoms or an aryl group having 6 to 20 carbon atoms, and Y$^2$ is a hydroxyl group or an alkoxyl group having 1 to 10 carbon atoms.

10. The liquid crystal aligning agent according to claim 9, wherein the cinnamic acid derivative is at least one compound represented by the following formula (2) or a compound represented by the following formula (3):

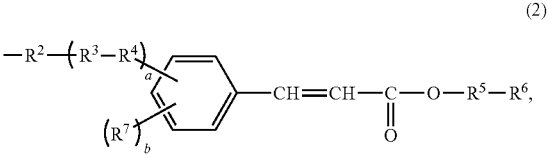
(2)

wherein R$^1$ is an alkyl group having 1 to 40 carbon atoms or a monovalent organic group having 3 to 40 carbon atoms and containing an alicyclic group, with the proviso that some or all of the hydrogen atoms of the alkyl group may be substituted by a fluorine atom, R$^2$ is a single bond, an oxygen atom, —COO— or —OCO—, R$^3$ is a divalent aromatic group, a divalent alicyclic group, a divalent heterocyclic group or a divalent condensed cyclic group, $R^4$ is a single bond, an oxygen atom, —COO— or —OCO—, $R^5$ is a single bond, a methylene group, an alkylene group having 2 to 10 carbon atoms or a divalent aromatic group, when $R^5$ is a single bond, $R^6$ is a hydrogen atom and when $R^5$ is a methylene group, an alkylene group or a divalent aromatic group, $R^6$ is a carboxyl group, a hydroxyl group, —SH, —NCO, —NHR, —SO$_2$Cl, wherein R is a hydrogen atom or an alkyl group having 1 to 6 carbon atoms, $R^7$ is a fluorine atom or a cyano group, "a" is an integer of 0 to 3, and "b" is an integer of 0 to 4:

(3)

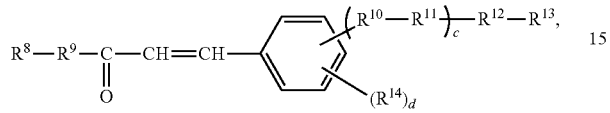

wherein $R^8$ is an alkyl group having 1 to 40 carbon atoms or a monovalent organic group having 3 to 40 carbon atoms and containing an alicyclic group, with the proviso that some or all of the hydrogen atoms of the alkyl group may be substituted by a fluorine atom, $R^9$ is an oxygen atom or a divalent aromatic group, $R^{10}$ is an oxygen atom, —COO— or —OCO—, $R^{11}$ is a divalent aromatic group, a divalent heterocyclic group or a divalent condensed cyclic group, $R^{12}$ is a single bond, —OCO—(CH$_2$)$_e$— or —O—(CH$_2$)$_g$—, wherein "e" and "g" are each independently an integer of 1 to 10, $R^{13}$ is a carboxyl group, a hydroxyl group, —SH, —NCO, —NHR, or —SO$_2$Cl, wherein R is a hydrogen atom or an alkyl group having 1 to 6 carbon atoms, $R^{14}$ is a fluorine atom or a cyano group, "c" is an integer of 0 to 3, and "d" is an integer of 0 to 4.

\* \* \* \* \*